US009781052B2

(12) United States Patent
Narayanasamy et al.

(10) Patent No.: US 9,781,052 B2
(45) Date of Patent: *Oct. 3, 2017

(54) VIRTUAL MACHINE AND APPLICATION MOVEMENT OVER LOCAL AREA NETWORKS AND A WIDE AREA NETWORK

(71) Applicant: Brocade Communications Systems, Inc., San Jose, CA (US)

(72) Inventors: Senthilkumar Narayanasamy, San Jose, CA (US); Indira Radhika Pulla, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/387,167

(22) Filed: Dec. 21, 2016

(65) Prior Publication Data

US 2017/0104689 A1    Apr. 13, 2017

Related U.S. Application Data

(63) Continuation of application No. 14/260,032, filed on Apr. 23, 2014, now Pat. No. 9,565,126, which is a continuation of application No. 13/283,802, filed on Oct. 28, 2011, now Pat. No. 8,756,602.

(60) Provisional application No. 61/413,442, filed on Nov. 14, 2010.

(51) Int. Cl.
| G06F 9/46 | (2006.01) |
|---|---|
| G06F 9/455 | (2006.01) |
| H04L 12/911 | (2013.01) |
| H04L 12/801 | (2013.01) |
| H04L 29/06 | (2006.01) |
| G06F 9/48 | (2006.01) |

(52) U.S. Cl.
CPC ............. *H04L 47/70* (2013.01); *G06F 9/455* (2013.01); *G06F 9/45558* (2013.01); *G06F 9/4856* (2013.01); *H04L 47/15* (2013.01); *H04L 47/193* (2013.01); *H04L 65/1066* (2013.01); *G06F 2009/4557* (2013.01)

(58) Field of Classification Search
None
See application file for complete search history.

(56) References Cited

U.S. PATENT DOCUMENTS

| 6,934,755 B1 | 8/2005 | Saulpaugh et al. |
|---|---|---|
| 7,065,549 B2 | 6/2006 | Sun et al. |
| 7,257,811 B2 | 8/2007 | Hunt |

(Continued)

FOREIGN PATENT DOCUMENTS

WO    WO-2010111142 A1    9/2010

OTHER PUBLICATIONS

EP Search Report filed in co-pending EP App. No. 11839291.9 dated Mar. 31, 2015, 8 pgs.

(Continued)

*Primary Examiner* — Bradley Teets
(74) *Attorney, Agent, or Firm* — Blank Rome, LLP

(57) ABSTRACT

Long distance cloud migration (LDCM) to overcome the limitations faced by the cloud migration techniques over long distance, high speed WAN infrastructures. LDCM overcomes the negative effects of existing TCP/IP mechanisms on the efficient use of available bandwidth. LDCM also acts as an acceleration engine to optimize various hypervisor, storage and security applications.

16 Claims, 102 Drawing Sheets

(56) References Cited

U.S. PATENT DOCUMENTS

| | | |
|---|---|---|
| 8,756,602 B2 | 6/2014 | Narayanasamy |
| 9,565,126 B2 | 2/2017 | Narayanasamy |
| 2007/0079307 A1 | 4/2007 | Dhawan et al. |
| 2007/0180436 A1 | 8/2007 | Travostino et al. |
| 2008/0222633 A1 | 9/2008 | Kami |
| 2009/0296726 A1 | 12/2009 | Snively et al. |
| 2010/0005465 A1 | 1/2010 | Kawato |
| 2011/0208908 A1 | 8/2011 | Chou et al. |
| 2011/0321041 A1 | 12/2011 | Bhat et al. |
| 2012/0304175 A1 | 11/2012 | Damola et al. |

OTHER PUBLICATIONS

Hai Jin, Li Deng, Song Wu, Xuanhua Shi, Xiaodong Pan. "Live Virtual Machine Migration with Adaptive Memory compression" Services Computing Technology and System Lab Cluster and Grid Computing Lab, School of Computer Science and Technology, Huazhong University of Science and Technology, Wuhan, 430074, China, 10 pages.

PCT/US2011/060369 International Search Report and Written Opinion, Mar. 16, 2012.

Vmotion Data Transfer TCP Session

Secondary TCP Session

Receive window limit

Fast retransmission and recovery

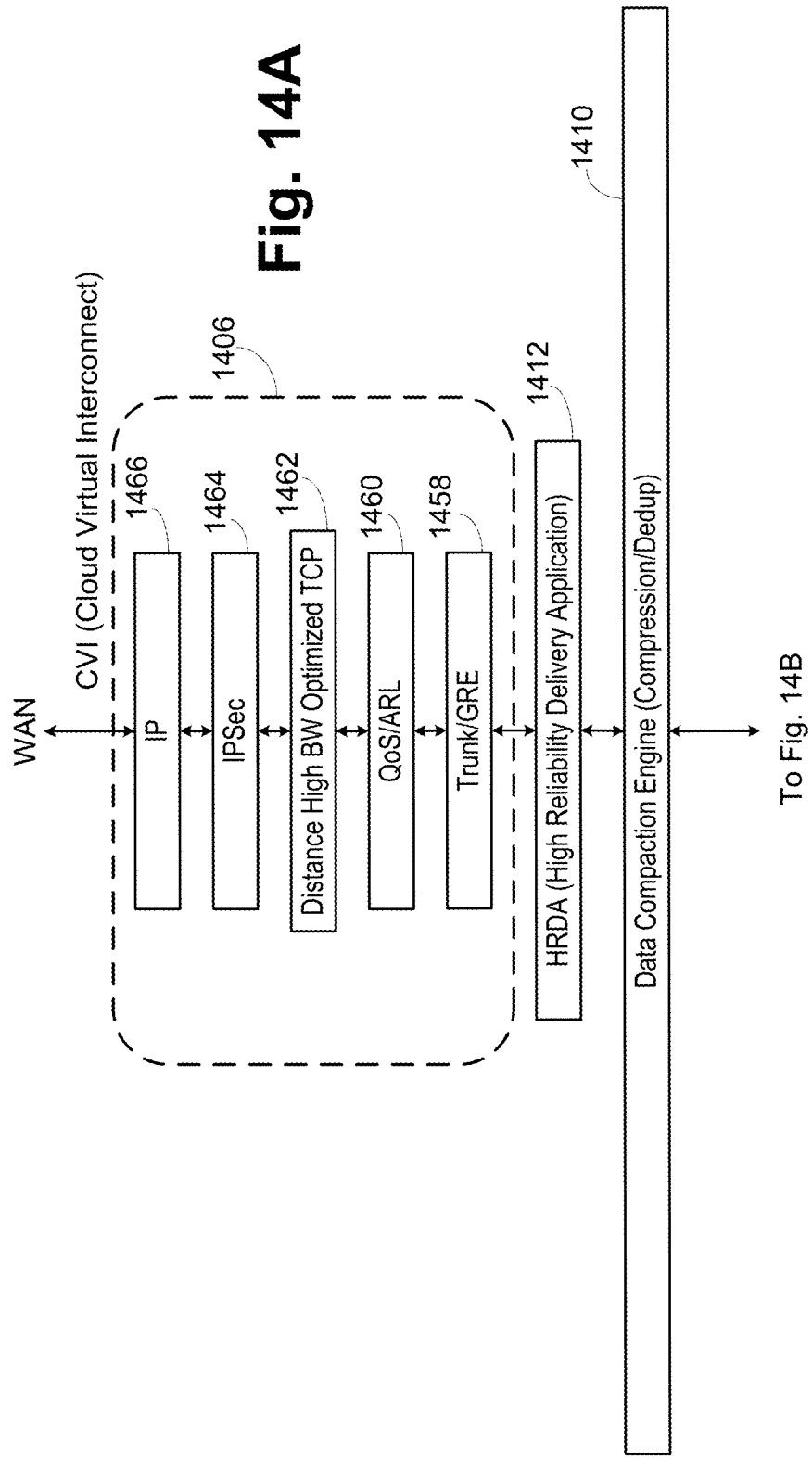

VIRTUAL MACHINE AND APPLICATION MOVEMENT OVER LOCAL AREA NETWORKS AND A WIDE AREA NETWORK

CROSS REFERENCE TO RELATED APPLICATIONS

This application is a continuation of U.S. patent application Ser. No. 14/260,032, now U.S. Pat. No. 9,565,126, entitled "VIRTUAL MACHINE AND APPLICATION MOVEMENT OVER A WIDE AREA NETWORK," filed Apr. 23, 2014, which is a continuation of U.S. patent application Ser. No. 13/283,802, now U.S. Pat. No. 8,756, 602, entitled "VIRTUAL MACHINE AND APPLICATION MOVEMENT OVER A WIDE AREA NETWORK," filed Oct. 28, 2011, which application claims the benefit under 35 U.S.C. §119(e) of U.S. Provisional Patent Application Ser. No. 61/413,442 entitled "LONG DISTANCE CLOUD MIGRATION," filed Nov. 14, 2010, all of which are hereby incorporated by reference.

BACKGROUND OF THE INVENTION

1. Field of the Invention

The invention relates to virtual machines associated with a computer system and movement of those virtual machines between computer systems separated by a wide area network.

2. Description of the Related Art

Businesses are expected to migrate, consolidate and maintain their data centers without any downtime while providing high availability for applications.

Typical data center organization is shown in FIG. 1. Two data centers 100, 150 are illustrated. Each has a series of application server clusters 102, 152 which execute the actual applications, such as in a SaaS (software as a Service) architecture. Data is stored in a storage fabric 104, 154. Access to the application server clusters 102, 152 is shown as being through web server clusters 106, 156, though more direct access at the local area network (LAN) layer is common. A site load balancer 108, 158 distributes incoming requests across the web servers in the web server clusters 106, 156. A global load balancer no is connected to the Internet 112 to balance load between the data centers 100, 150.

VMware's vMotion enables the movement of a live virtual machine (VM) from one server to another without any downtime of the server or the application or impact on the end user. During vMotion, the active memory and an accurate execution state of a virtual machine is transmitted over a high speed network from one physical server to another. Prior to performing the migration, the vMotion application establishes a network connection between the source and the destination servers and various resources like CPU, memory, storage, and network connections are checked for compatibility. In the initial stages of migration, the inactive pages of the VM state are moved, leaving behind a small working set of active pages. VM configuration and the device information are copied to the destination server and worker processes are created. The VM memory is copied into the destination while the server is still running. Memory writes are intercepted and are used to track actions that occur during the migration. After most of the VM's state has been moved, the VM is then paused and transferred to the destination host. The access to the storage is moved from one host to another and the VM is reset in the destination. Two Transmission Control Protocol (TCP) sessions are established during vMotion, as shown in FIG. 2. While one is used for migration of the virtual machine, the other is used to maintain the VM state consistency among the two servers while the VM is in transit.

vMotion imposes strict requirements on the network. These requirements can be broken into:

1) High Bandwidth: VM migration requires a minimum of 1 GB bandwidth.

2) Encryption: VM migration data is usually not encrypted and hence there is a need to support encryption to protect the data.

3) Storage Accessibility: Along with VM migration, the shared storage associated with VM may need to be migrated to allow quicker access.

4) Latency: The migration can only work if the latency is less than 5 ms and low packet loss and packet duplication and other impairments.

5) Application Continuity: There should not be any impact on the end user while the migration is in progress.

There is a need for a technique that can reduce the latency incurred in migrating live services, applications and virtual machines from one data center to another across a wide area network (WAN) infrastructure. This challenge gets more complicated when the migration needs to be done with zero impact on the user and it becomes virtually impossible if the migration has to be performed over long distances. Some of the challenges include overcoming the WAN latency observed by the applications while making efficient use of available bandwidth and also devising a mechanism to accelerate the application migration.

TCP is primarily used as a transport layer protocol for most of the migration applications. Round trip times (RTTs) observed will be very high because of the high end to end network latency. Huge RTT values influence the congestion control mechanism and cause a very long slow startup phase and hence also result in sub optimal bandwidth usage. If a congestion event occurs in such a situation, the connection window size will be dropped to zero and the slow start phase is triggered all over again, causing further reduction in the throughput. Various Transmission Control Protocol/Internet Protocol (TCP/IP) characteristics that contribute toward inefficient use of the available bandwidth and reduction in overall throughput are:

1) Window Size: The TCP window size is a 16 bit field advertised in the TCP header which limits the window size to a maximum value of 64 KB. TCP can only send 64 KB before it receives acknowledgement. Since 64 KB takes 0.5 ms to transmit across a 1 Gbps link, even 1 ms latency could cut the TCP performance by a factor four. To maintain the line rate at 1 Gbps with 1 ms of network latency, a window size of 128 KB is needed. Higher network latencies demand bigger window sizes to maintain the same line rate. For example, at 1 Gbps network speed and 60 ms RTT, a receive window size of 8 MB is needed. The application servers cannot handle such high demand on memory since they handle multiple TCP connections. A realistic window size limit is 3 MB, as shown in FIG. 3.

2) Network Reordering: Dynamically load balancing networks cause excessive false congestion events due to reordering done at the receiver. Due to the dynamic load balancing nature of the network, the packets might arrive out of order with some packets undergoing more delay to reach the receiver than the others. If the receiver performs reordering without waiting for the packets to arrive, it will generate duplicate acknowledgements. This triggers a fast retransmission operation and hence results in unnecessary duplicate packet retransmissions by the sender. A false congestion event is believed to occur and TCP enters the fast recovery stage. The connection window is reduced by half, which brings down the throughput.

3) Retransmission Timer timeouts: Packet loss has a detrimental effect on TCP's performance. If fast retransmission is not triggered, it is required to wait for 500 ms (usually) to act on the congestion in the network, which slows down the recovery and decreases the throughput. The timeout value increases with every timeout, which further slows operations.

4) Slow start and congestion avoidance: Once a timeout event occurs, the connection window (cwnd) is reduced to zero. Now, the rate at which the packets are injected into the network depends on the rate of the acknowledgements received. Although this seems like an exponential increase in the connection window, the growth becomes linear when TCP enters the congestion avoidance stage. The slow start and the congestion avoidance in conjunction with the high retransmission timeout values, slows down the recovery of the TCP from a congestion event, which thoroughly impacts the overall throughput. See FIGS. 4 and 5 for examples of congestion avoidance operations.

An example of vMotion is provided in FIGS. 6A-6O. Two data centers 600, 650 are illustrated having identical configurations. A virtual machine server 602, 652 is connected to a network 604, 654, typically a LAN, with additional servers 606, 656, 608, 658 attached. A storage unit 610, 660 is also attached to the network 604, 654. A router 612, 662 is connected to the network 604, 654 to allow interconnection of the data centers 600, 650 using a Virtual Private LAN Service (VPLS) link. VM server 602 has two VMs, VM1 614 and VM2 616, and data, Data1 618, Data2 620, Data3 622 and Data4 624. For this example all four data blocks 618-624 are associated with VM1 614. In the example VM1 and Data1-Data4 are migrated from VM server 602 to VM server 652. Initially the VM1 614 and Data1 618 are operated on. VM1 614 is replicated and Data1 618 is moved. VM server 652 sends a response (RSP) message 626 back to VM server 602 to indicate the success of that portion of the move. In response, VM server 602 sends Data2 to VM server 652. Similar operations occur to move Data3 622 to VM server 652. VM server 602 receives the related RSP message 628 for Data3 622. Data4 624 is moved to VM server 652 which generates an RSP message 630 back to VM server 602. As this is the last of the data, VM server 602 provides a COMMIT message 632 to VM server 652. VM server 652 replies with a DONE message 634. When VM server 602 receives the DONE message 634, it removes the VM1 614, which results in the VM1 614 being fully migrated or moved.

If the application was migrated and the associated storage is not migrated, the disk/tape access will get very costly as they have to go over the WAN infrastructure for every read/write operation. The storage migration, if performed, will also be affected by the WAN latencies as mentioned above.

SUMMARY OF THE INVENTION

Long distance cloud migration (LDCM) as described here is one embodiment to overcome the limitations faced by the cloud migration techniques over long distance, high speed WAN infrastructures. LDCM is designed to overcome the negative effects of existing TCP/IP mechanisms on the efficient use of available bandwidth. LDCM is also designed to act as an acceleration engine to optimize various hypervisor, storage and security applications. Hypervisor applications like VMware's vMotion, Citrix's Xenmotion and Microsoft Corporation's Hyper-V Live Migration can benefit. LDCM can also be used to accelerate storage applications such as iSCSI, Fibre Channel (FC)-Storage, network attached storage (NAS) and security applications such as L2VPN and L3VPN, though the current primary embodiments are for hypervisor application acceleration and storage migration acceleration.

BRIEF DESCRIPTION OF THE FIGURES

The accompanying drawings, which are incorporated in and constitute a part of this specification, illustrate an implementation of apparatus and methods consistent with the present invention and, together with the detailed description, serve to explain advantages and principles consistent with the invention.

FIGS. 14A and 14B are block diagrams of the functional blocks of the LDCM appliance of FIG. 12.

DETAILED DESCRIPTION OF THE PREFERRED EMBODIMENTS

Figure 7:
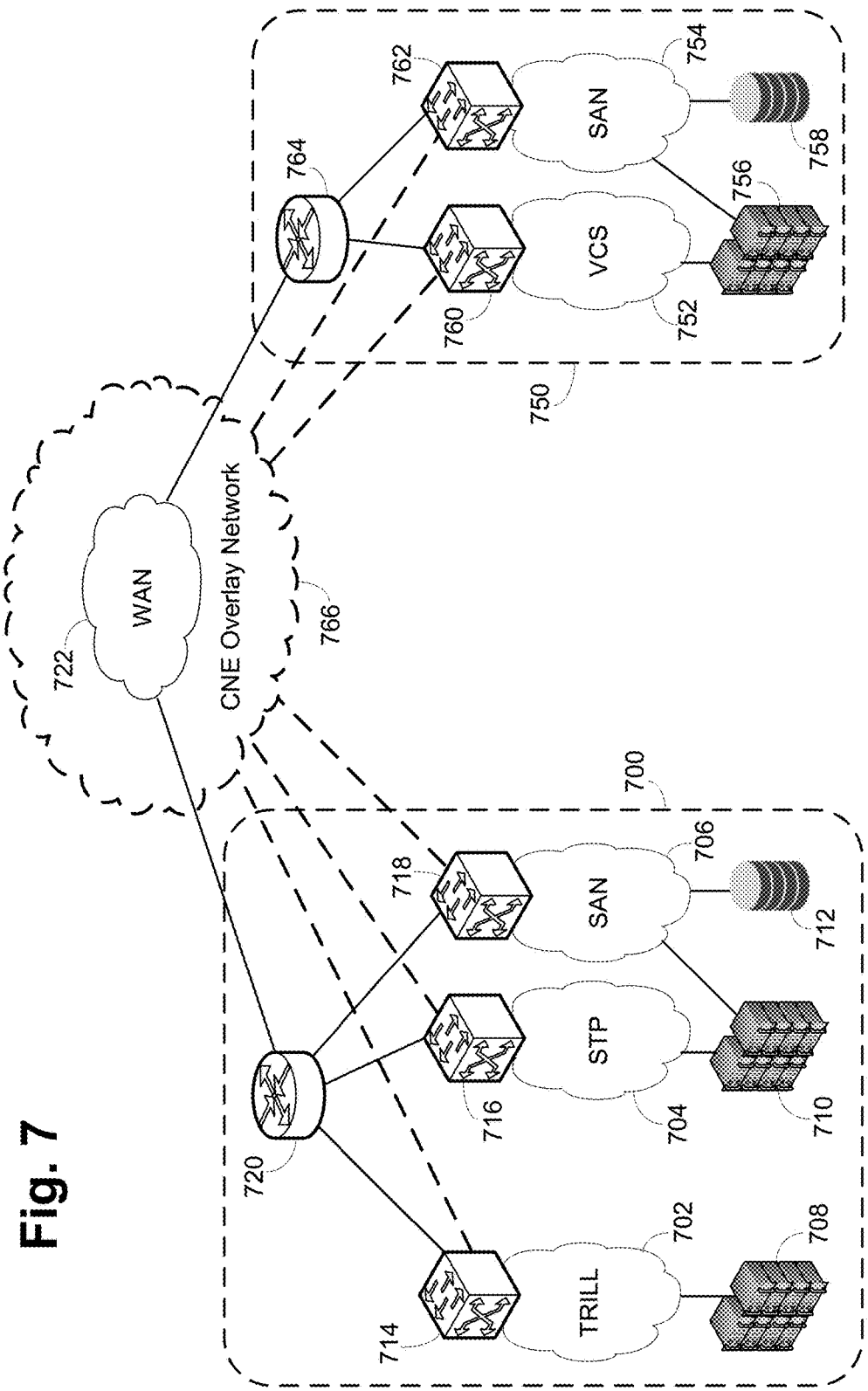
FIG. 7 is a block diagram of an embodiment two connected data centers according to the present invention.

Referring to FIG. 7, a network illustrating portions according to the present invention is shown. A first data center 700 is shown having three separate internal networks, a Transparent Interconnection of Lots of Links (TRILL) network 702, a normal Ethernet spanning tree protocol (STP) network 704 and a storage area network (SAN) 706. Application servers 708 are connected to the TRILL network 702, while application servers 710 are connected to the STP network 704 and the SAN 706. Storage 712 is shown connected to the SAN 706. Each of the networks 702, 704 and 706 has a converged network extension (CNE) device 714, 716, 718 connected. The CNE devices 714, 716, 718 are connected to a router 720, which in turn is connected to a WAN 722. A second data center 750 is similar, having a Virtual Cluster Switch (VCS) Ethernet fabric network 752 and a SAN 754. Application servers 756 are connected to each network 752 and 754, with storage connected to the SAN 754. CNE devices 760, 762 are connected to each network 752, 754 and to a router 764, which is also connected to the WAN 722 to allow the data centers 700, 750 to communicate. The operation of the CNE devices 714-718 and 760-762 result in an effective CNE overlay network 766, with virtual links from each CNE device to the CNE overlay network 766.

One goal of the embodiments of the present invention is to extend a VCS and TRILL network across data centers and meet the scalability requirements needed by the deployments. A CNE device can be implemented in a two-box solution, wherein one box is capable of L2/L3/FCoE switching and is part of the VCS, and the other facilitates the WAN tunneling to transport Ethernet and/or FC traffic over WAN. The CNE device can also be implemented in a one-box solution, wherein a single piece of network equipment combines the functions of L2/L3/FCoE switching and WAN tunneling.

VCS as a layer-2 switch uses TRILL as its inter-switch connectivity and delivers a notion of single logical layer-2 switch. This single logical layer-2 switch delivers a transparent LAN service. All the edge ports of VCS support standard protocols and features like Link Aggregation Control Protocol (LACP), Link Layer Discovery Protocol (LLDP), virtual LANs (VLANs), media access control (MAC) learning, etc. VCS achieves a distributed MAC address database using Ethernet Name Service (eNS) and attempts to avoid flooding as much as possible. VCS also provides various intelligent services, such as virtual link aggregation group (vLAG), advance port profile management (APPM), End-to-End FCoE, Edge-Loop-Detection, etc. More details on VCS are available in U.S. patent application Ser. No. 13/098,360, entitled "Converged Network Extension," filed Apr. 29, 2011; Ser. No. 12/725,249, entitled "Redundant Host Connection in a Routed Network," filed 16 Mar. 2010; Ser. No. 13/087,239, entitled "Virtual Cluster Switching," filed 14 Apr. 2011; Ser. No. 13/092,724, entitled "Fabric Formation for Virtual Cluster Switching," filed 22 Apr. 2011; Ser. No. 13/092,580, entitled "Distributed Configuration Management for Virtual Cluster Switching," filed 22 Apr. 2011; Ser. No. 13/042,259, entitled "Port Profile Management for Virtual Cluster Switching," filed 7 Mar. 2011; Ser. No. 13/092,460, entitled "Advanced Link Tracking for Virtual Cluster Switching," filed 22 Apr. 2011; Ser. No. 13/092,701, entitled "Virtual Port Grouping for Virtual Cluster Switching," filed 22 Apr. 2011; Ser. No. 13/092,752, entitled "Name Services for Virtual Cluster Switching," filed 22 Apr. 2011; Ser. No. 13/092,877, entitled "Traffic Management for Virtual Cluster Switching," filed 22 Apr. 2011; and Ser. No. 13/092,864, entitled "Method and System for Link Aggregation Across Multiple Switches," filed 22 Apr. 2011, all hereby incorporated by reference.

In embodiments of the present invention, for the purpose of cross-data-center communication, each data center is represented as a single logical RBridge. This logical RBridge can be assigned a virtual RBridge ID or use the RBridge ID of the CNE device that performs the WAN tunneling.

Figure 8:
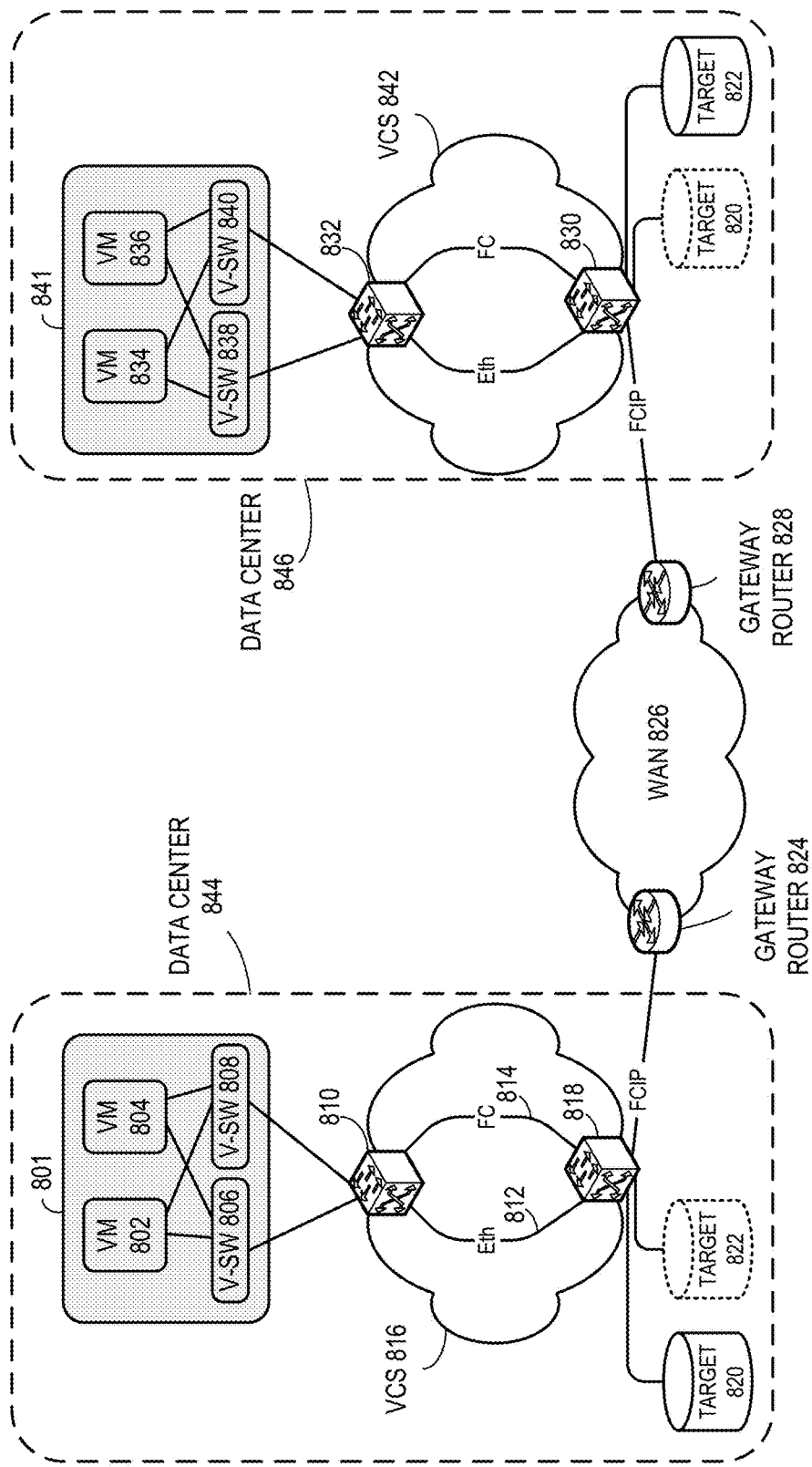
FIG. 8 illustrates an exemplary network architecture which includes CNE devices for facilitate cross-data-center communications, in accordance with one embodiment of the present invention.

FIG. 8 illustrates an exemplary network architecture which includes CNE devices for facilitate cross-data-center communications, in accordance with one embodiment of the present invention. In this example, two data centers 844 and 846 are coupled to a WAN 826 via gateway routers 824 and 828, respectively. Data center 844 includes a VCS 816, which couples to a number of hosts, such as host 801, via its member switches, such as switch 810. Host 801 includes two VMs 802 and 804, which are coupled to virtual switches 806 and 808 in a dual-homing configuration. In one embodiment, virtual switches 806 and 808 reside on two network interface cards on host 801. Virtual switches 806 and 808 are coupled to VCS member switch 810. Also included in VCS 816 is a CNE device 818. CNE device 818 is configured to receive both Ethernet (or TRILL) traffic from member switch 810 via an Ethernet (or TRILL) link 812, and FC traffic via FC link 814. Also coupled to CNE device 818 is a target storage device 820, and a cloned target storage device 822 (denoted by dotted lines). CNE device 818 maintains a Fibre Channel over IP (FCIP) tunnel to data center 846 across WAN 826 via gateway routers 824 and 828.

Similarly, data center 846 includes a VCS 842, which in turn includes a member switch 832. Member switch 832 is coupled to a host 841, which includes VMs 834 and 836, both of which are coupled to virtual switches 838 and 840. Also included in VCS 842 is a CNE device 830. CNE device is coupled to member switch 832 via an Ethernet (TRILL) link and an FC link. CNE device 830 is also coupled to target storage device 822 and a clone of target storage device 820.

During operation, assume that VM 802 needs to move from host 801 to host 841. Note that this movement is previously not possible, because virtual machines are visible only within the same layer-2 network domain. Once the layer-2 network domain is terminated by a layer-3 device, such as gateway router 824, all the identifying information for a particular virtual machine (which is carried in layer-2 headers) is lost. However, in embodiments of the present invention, because CNE device extends the layer-2 domain from VCS 816 to VCS 842, the movement of VM 802 from data center 844 to data center 846 is now possible as that fundamental requirement is met.

When forwarding TRILL frames from data center 844 to data center 846, CNE device 818 modifies the egress TRILL frames' header so that the destination RBridge identifier is the RBridge identifier assigned to data center 846. CNE device 818 then uses the FCIP tunnel to deliver these TRILL frames to CNE device 830, which in turn forwards these TRILL frames to their respective layer-2 destinations.

VCS uses FC control plane to automatically form a fabric and assign RBridge identifiers to each member switch. In one embodiment, the CNE architecture keeps the TRILL and SAN fabrics separate between data centers. From a TRILL point of view, each VCS (which corresponds to a respective data center) is represented as a single virtual RBrdige. In addition, the CNE device can be coupled to a VCS member switch with both a TRILL link and an FC link. The CNE device can join the VCS via a TRILL link. However, since the CNE devices keeps the TRILL VCS fabric and SAN (FC) fabric separate, the FC link between the CNE device and the member switch is configured for FC multi-fabric.

Figure 9:
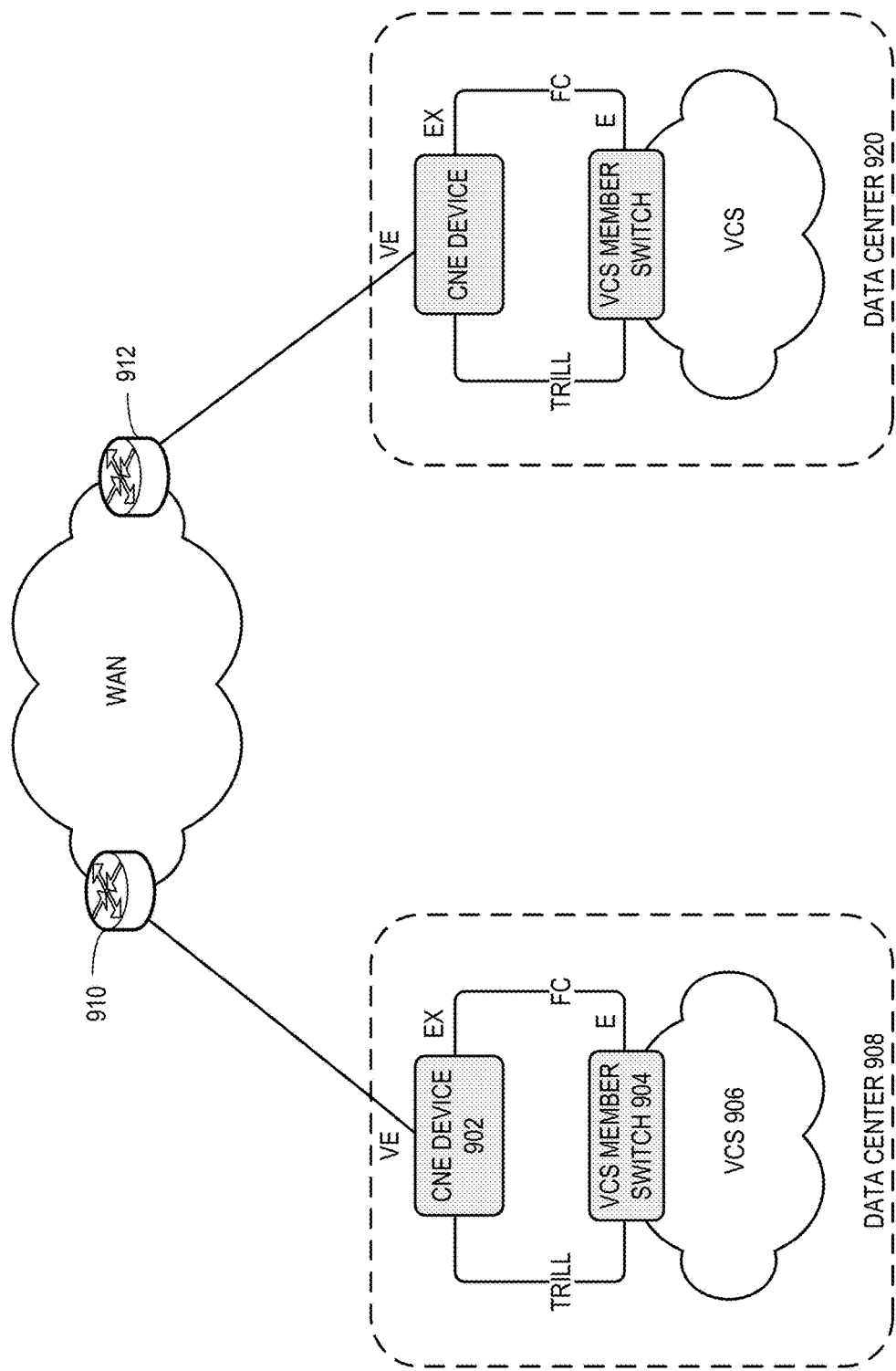
FIG. 9 illustrates an exemplary implementation of CNE-enabled VCSs, in accordance with one embodiment of the present invention.

As illustrated in FIG. 9, a data center 908 is coupled to a WAN via a gateway router 910, and a data center 920 is coupled to the WAN via a gateway router 912. Data center 908 includes a VCS 906, which includes a member switch 904. Also included in data center 908 is a CNE device 902. CNE device 902 is coupled to VCS member switch 904 via a TRILL link and an FC link. CNE device 902 can join the VCS via the TRILL link. However, the FC link allows CNE device 902 to maintain a separate FC fabric with VCS member switch 904 to carry FC traffic. In one embodiment, the FC port on CNE device 902 is an FC EX_port. The corresponding port on member switch 904 is an FC E_port. The port on CNE device 902 on the WAN side (coupling to gateway router 910) is an FCIP VE_port. Data center 920 has a similar configuration.

In one embodiment, each data center's VCS includes a node designated as the ROOT RBridge for multicast purposes. During the initial setup, the CNE devices in the VCSs exchange each VCS's ROOT RBridge identifier. In addition, the CNE devices also exchange each data center's RBridge identifier. Note that this RBridge identifier represents the entire data center. Information related to data-center RBridge identifiers is distributed as a static route to all the nodes in the local VCS.

Figure 10A:
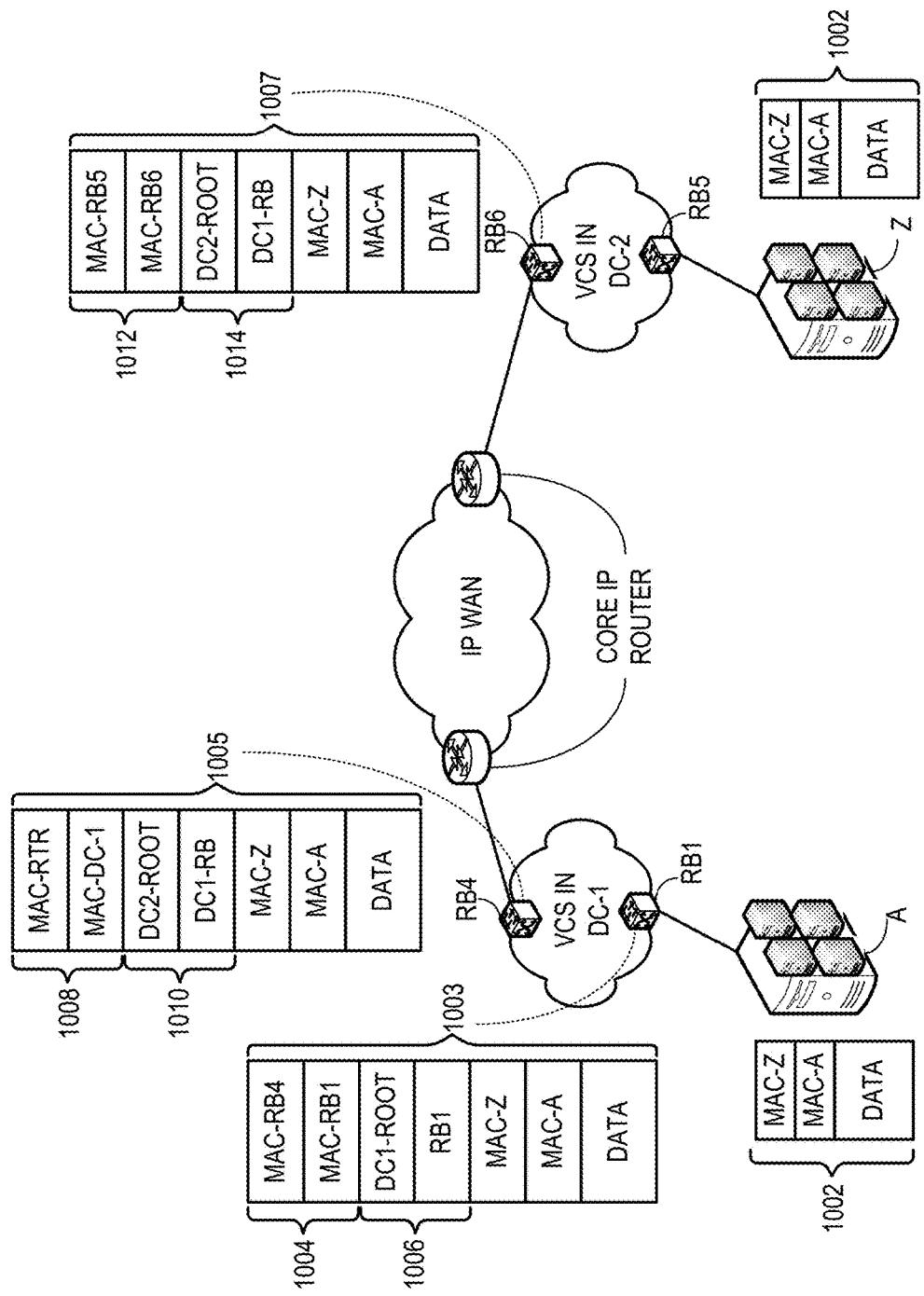
FIG. 10A presents a diagram illustrating how CNE devices handle broadcast, unknown unicast, and multicast (BUM) traffic across data centers, in accordance with one embodiment of the present invention.

FIG. 10A presents a diagram illustrating how CNE devices handle broadcast, unknown unicast, and multicast (BUM) traffic across data centers, in accordance with one embodiment of the present invention. In this example, two data centers, DC-1 and DC-2, are coupled to an IP WAN via core IP routers. The CNE device in DC-1 has an RBridge identifier of RB4, and the CNE device in DC-2 has an RBridge identifier of RB6. Furthermore, in the VCS in DC-1, a member switch RB1 is coupled to host A. In the VCS in DC-2, a member switch RB5 is coupled to host Z.

Assume that host A needs to send multicast traffic to host Z, and that host A already has the knowledge of host Z's MAC address. During operation, host A assembles an Ethernet frame 1002, which has host Z's MAC address (denoted as MAC-Z) as its destination address (DA), and host A's MAC address (denoted as MAC-A) as its source address (SA). Based on frame 1002, member switch RB1 assembles a TRILL frame 1003, whose TRILL header 1006 includes the RBridge identifier of data center DC-1's root RBridge (denoted as "DC1-ROOT") as the destination RBridge, and RB1 as the source RBridge. (That is, within DC-1, the multicast traffic is distributed on the local multicast tree.) The outer Ethernet header 1004 of frame 1003 has CNE device RB4's MAC address (denoted as MAC-RB4) as the DA, and member switch RB1's MAC address (denoted as MAC-RB1) as the SA.

When frame 1003 reaches CNE device RB4, it further modifies the frame's TRILL header to produce frame 1005. CNE device RB4 replaces the destination RBridge identifier in the TRILL header 1010 with data center DC-2's root RBridge identifier DC2-ROOT. The source RBridge identifier is changed to data center DC-1's virtual RBridge identifier, DC1-RB (which allows data center DC-2 to learn data center DC-1's RBridge identifier). Outer Ethernet header 1008 has the core router's MAC address (MAC-RTR) as its DA, and CNE device RB4's MAC address (MAC-DC-1) as its SA.

Frame 1005 is subsequently transported across the IP WAN in an FCIP tunnel and reaches CNE device RB6. Correspondingly, CNE device RB6 updates the header to produce frame 1007. Frame 1007's TRILL header km remains the same as frame 1005. The outer Ethernet header 1012 now has member switch RB5's MAC address, MAC-RB5, as its DA, and CNE device RB6's MAC address, MAC-RB6, as its SA. Once frame 1007 reaches member switch RB5, the TRILL header is removed, and the inner Ethernet frame is delivered to host Z.

In various embodiments, a CNE device can be configured to allow or disallow unknown unicast, broadcast (e.g., Address Resolution Protocol (ARP)), or multicast (e.g., Internet Group Management Protocol (IGMP) snooped) traffic to cross data center boundaries. By having these options, one can limit the amount of BUM traffic across data centers. Note that all TRILL encapsulated BUM traffic between data centers can be sent with the remote data center's root RBridge identifier. This translation is done at the terminating point of the FCIP tunnel.

Additional mechanisms can be implemented to minimize BUM traffic across data centers. For instance, the TRILL ports between the CNE device and any VCS member switch can be configured to not participate in any of the VLAN multicast group IDs (MGIDs). In addition, the eNS on both VCSs can be configured to synchronize their learned MAC address database to minimize traffic with unknown MAC DA. (Note that in one embodiment, before the learned MAC address databases are synchronized in different VCSs, frames with unknown MAC DAs are flooded within the local data center only.)

To further minimize BUM traffic, broadcast traffic such as ARP traffic can be reduced by snooping ARP responses to build ARP databases on VCS member switches. The learned ARP databases are then exchanged and synchronized across different data centers using eNS. Proxy-based ARP is used to respond to all know ARP requests in a VCS. Furthermore, multicast traffic across data centers can be reduced by distributing the multicast group membership across data canters by sharing the IGMP snooping information via eNS.

The process of forwarding unicast traffic between data centers is described as follows. During the FCIP tunnel formation, the logical RBridge identifiers representing data centers are exchanged. When a TRILL frame arrives at the entry node of the FCIP tunnel, wherein the TRILL destination RBridge is set as the RBridge identifier of the remote data center, the source RBridge in the TRILL header is translated to the logical RBridge identifier assigned to the local data center. When the frame exits the FCIP tunnel, the destination RBridge field in the TRILL header is set as the local (i.e., the destination) data center's virtual RBridge identifier. The MAC DA and VLAN ID in the inner Ethernet header is then used to look up the corresponding destination RBridge (i.e., the RBridge identifier of the member switch to which the destination host is attached, and the destination RBridge field in the TRILL header is updated accordingly.

In the destination data center, based on an ingress frame, all the VCS member switches learn the mapping between the MAC SA (in the inner Ethernet header of the frame) and the TRILL source RBridge (which is the virtual RBridge identifier assigned to the source data center). This allows future egress frames destined to that MAC address to be sent to the right remote data center. Note that since the RBridge identifier assigned to a given data center does not correspond to a physical RBridge, in one embodiment, a static route is used to map a remote data-center RBridge identifier to the local CNE device.

Figure 10B:
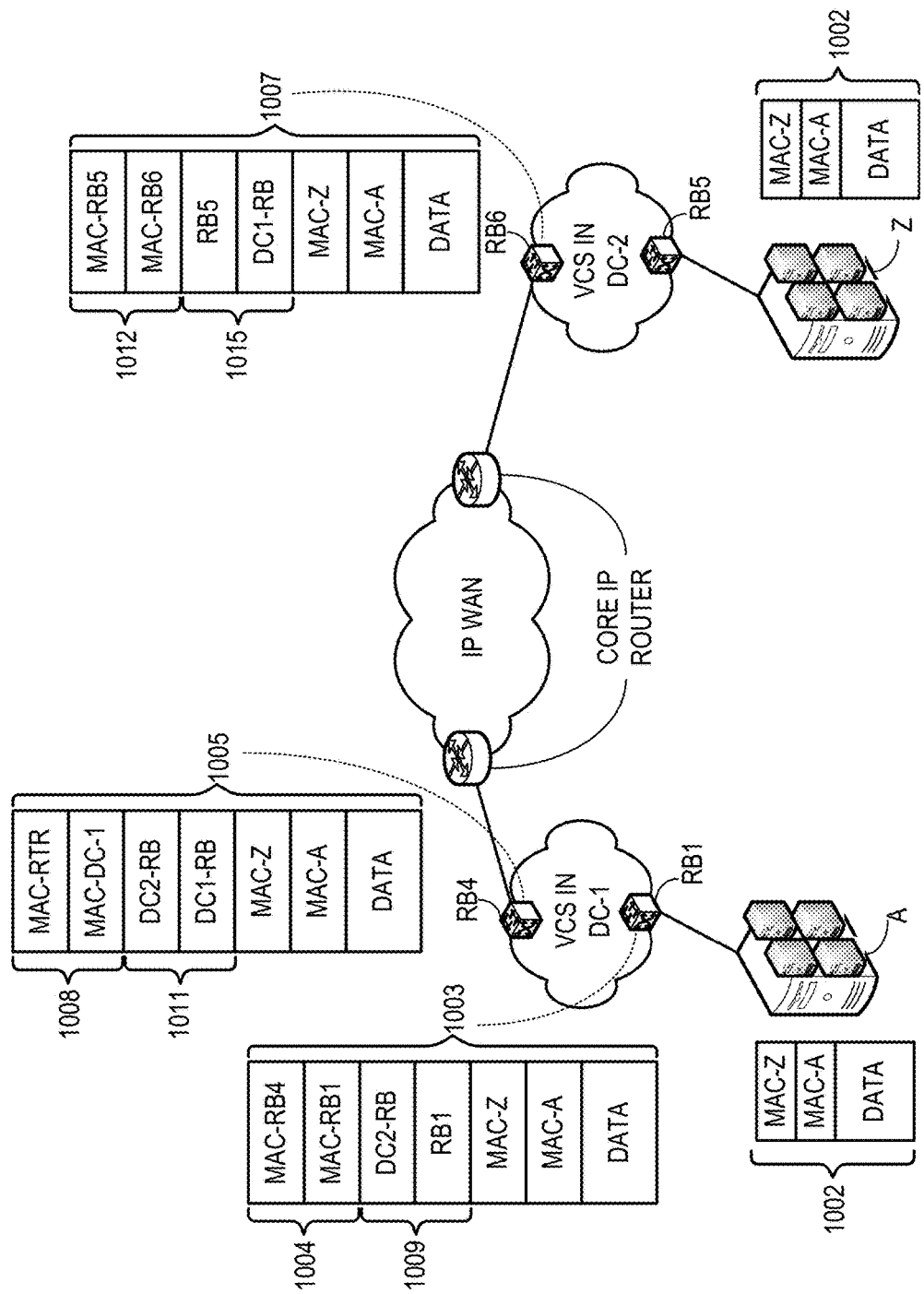
FIG. 10B presents a diagram illustrating how CNE devices handle unicast traffic across data centers, in accordance with one embodiment of the present invention.

FIG. 10B presents a diagram illustrating how CNE devices handle unicast traffic across data centers, in accordance with one embodiment of the present invention. Assume that host A needs to send unicast traffic to host Z, and that host A already has the knowledge of host Z's MAC address. During operation, host A assembles an Ethernet frame 1002, which has host Z's MAC address (MAC-Z) as its DA, and host A's MAC address (MAC-A) as its SA. Based on frame 1002, member switch RB1 assembles a TRILL frame 1003, whose TRILL header 1009 includes the RBridge identifier of data center DC-2's virtual Rbridge (denoted as "DC2-RB") as the destination RBridge, and RB1 as the source RBridge. The outer Ethernet header 1004 of frame 1003 has CNE device RB4's MAC address (MAC-RB4) as the DA, and member switch RB1's MAC address (MAC-RB1) as the SA.

When frame 1003 reaches CNE device RB4, it further modifies the frame's TRILL header to produce frame 1005. CNE device RB4 replaces the source RBridge identifier in the TRILL header 1011 with data center DC-1's virtual RBridge identifier DC1-RB (which allows data center DC-2 to learn data center DC-1's RBridge identifier). Outer Ethernet header 1008 has the core router's MAC address (MAC-RTR) as its DA, and CNE device RB4's MAC address (MAC-DC-1) as its SA.

Frame 1005 is subsequently transported across the IP WAN in an FCIP tunnel and reaches CNE device RB6. Correspondingly, CNE device RB6 updates the header to produce frame 1007. Frame 1007's TRILL header 1015 has an updated destination RBridge identifier, which is RB5, the VCS member switch in DC-2 that couples to host Z. The outer Ethernet header 1012 now has member switch RB5's MAC address, MAC-RB5, as its DA, and CNE device RB6's MAC address, MAC-RB6, as its SA. Once frame 1007 reaches member switch RB5, the TRILL header is removed, and the inner Ethernet frame is delivered to host Z.

Flooding across data centers of frames with unknown MAC DAs is one way for the data centers to learn the MAC address in another data center. All unknown SAs are learned as MACs behind an RBridge and it is no exception for the CNE device. In one embodiment, eNS can be used to distribute learned MAC address database, which reduces the amount of flooding across data centers.

In order to optimize flushes, even though MAC addresses are learned behind RBridges, the actual VCS edge port associated with a MAC address is present in the eNS MAC updates. However, the edge port IDs might no longer be unique across data-centers. To resolve this problem, all eNS updates across data centers will qualify the MAC address entry with the data-center's RBridge identifier. This configuration allows propagation of port flushes across data centers.

In the architecture described herein, VCSs in different data-centers do not join each other; hence the distributed configurations are kept separate. However, in order to allow virtual machines to move across data-centers, there will be some configuration data that needs to be synchronized across data-centers. In one embodiment, a special module (in either software or hardware) is created for CNE purposes. This module is configured to retrieve the configuration information needed to facilitate moving of virtual machines across data centers and it is synchronized between two or more VCSs.

In one embodiment, the learned MAC address databases are distributed across data centers. Also, edge port state change notifications (SCNs) are also distributed across data centers. When a physical RBridge is going down, the SCN is converted to multiple port SCNs on the inter-data-center FCIP link.

In order to protect the inter-data-center connectivity, a VCS can form a vLAG between two or more CNE devices. In this model, the vLAG RBridge identifier is used as the data-center RBridge identifier. The FCIP control plane is configured to be aware of this arrangement and exchange the vLAG RBridge identifers in such cases.

Figure 11:
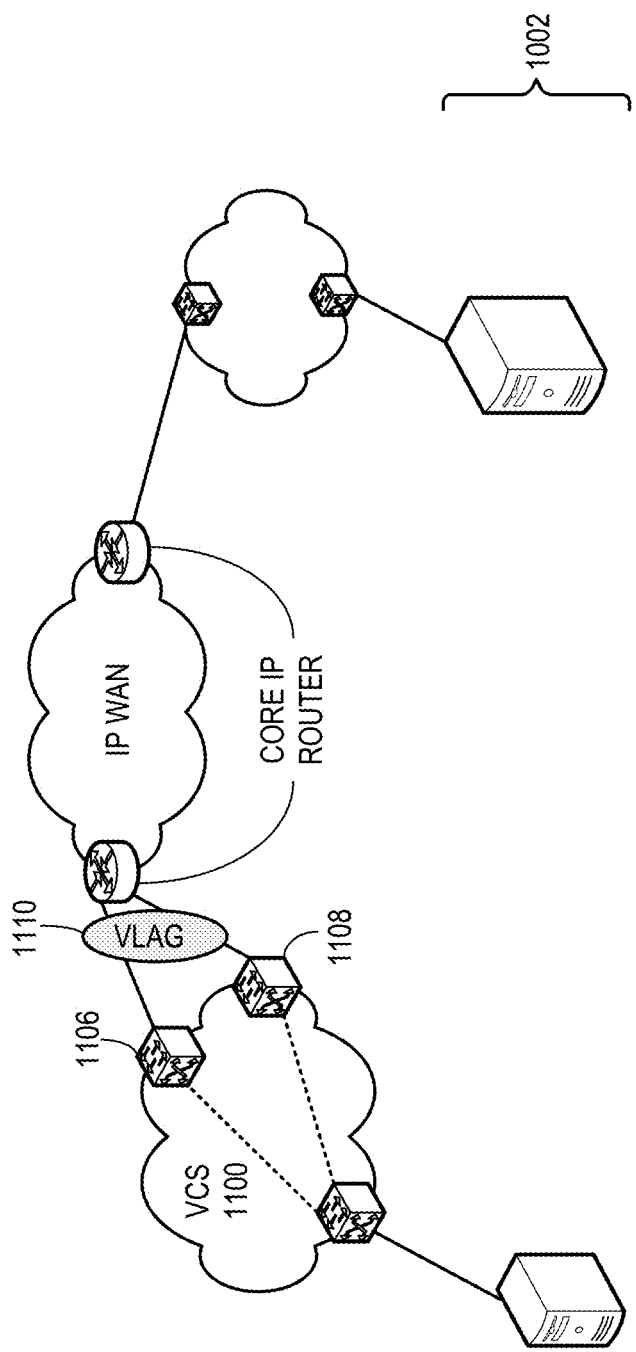
FIG. 11 illustrates an example where two CNE devices are used to construct a vLAG, in accordance with an embodiment of the present invention.

FIG. 11 illustrates an example where two CNE devices are used to construct a vLAG, in accordance with an embodiment of the present invention. In this example, a VCS 1100 includes two CNE devices 1106 and 1108. Both CNE devices 1106 and 1108 forms a vLAG 1110 which is coupled to a core IP router. vLAG 1110 is assigned a virtual RBridge identifier, which is also used as the data-center RBridge identifier for VCS 1100. Furthermore, vLAG 1110 can facilitate both ingress and egress load balancing (e.g., based on equal-cost multi-pathing (ECMP)) for any member switch within VCS 1100.

Figure 12:
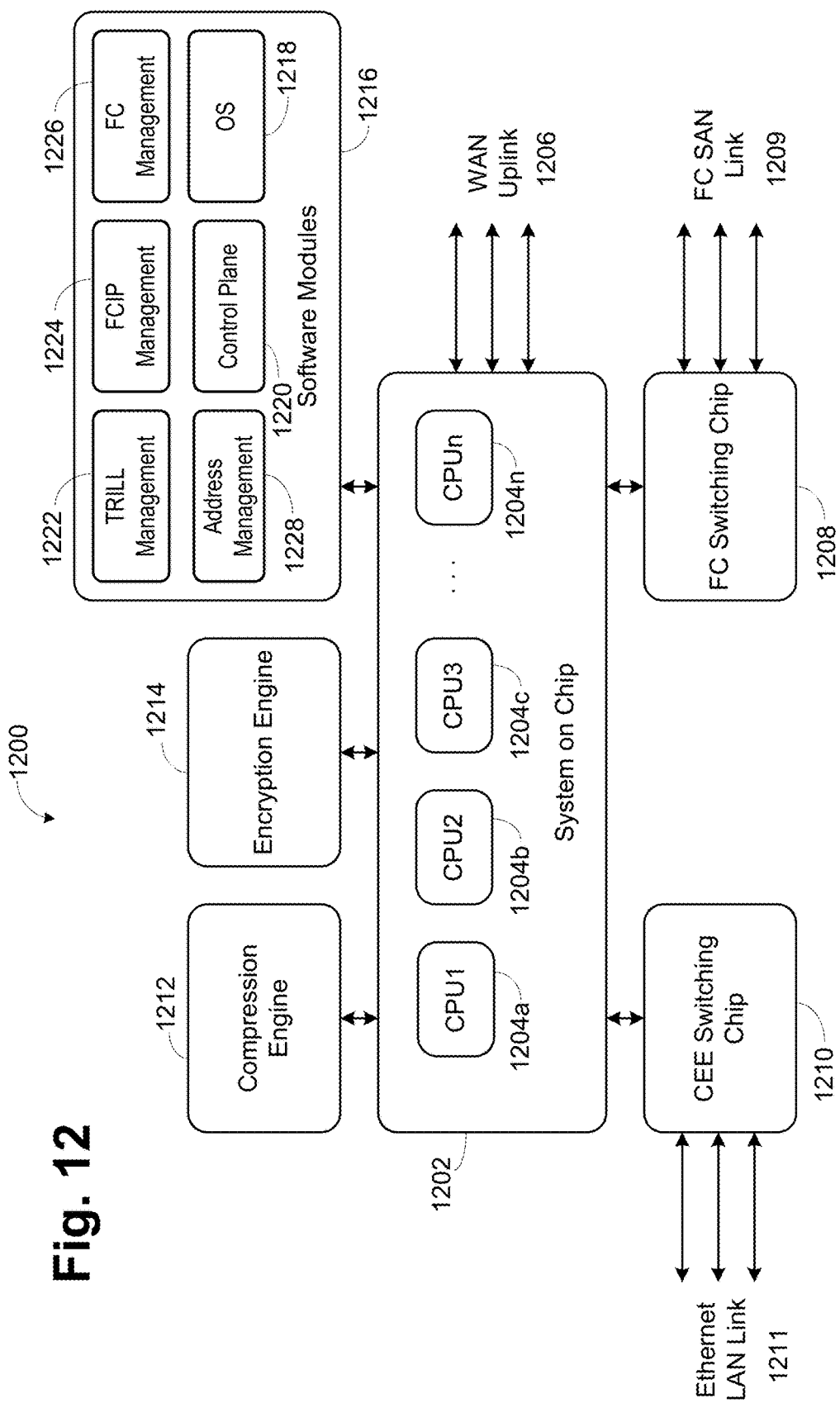
FIG. 12 is a block diagram of an embodiment of an LDCM appliance according to the present invention.

FIG. 12 illustrates a CNE/LDCM device 1200, the LDCM features preferably being added to a CNE device to create a single device. A system on chip (SOC) 1202 provides the primary processing capabilities, having a plurality of CPUs 1204. A number of Ethernet connections 1206 are preferably included on the SOC 1202 to act as the WAN link, though a separate Ethernet device could be used if desired. An FC switching chip 1208 is connected to the SOC 1202 to provide connections to FC SANs. A CEE switching chip 1210 is connected to the SOC 1202 to allow attachment to the VCS or to an Ethernet LAN. A compression engine 1212 is provided with the SOC 1202 to provide compression and dedup capabilities to reduce traffic over the WAN links. An encryption engine 1214 is provided for security purposes, as preferably the FLIP tunnel is encrypted for security.

Various software modules 1216 are present in the CNE/LDCM device 1200. These include an underlying operating system 1218, a control plane module 1220 to manage interaction with the VCS, a TRILL management module 1222 for TRILL functions above the control plane, an FCIP management module 1224 to manage the FCIP tunnels over the WAN, an FC management module 1226 to interact with the FC SAN and an address management module 1228.

Figure 1:
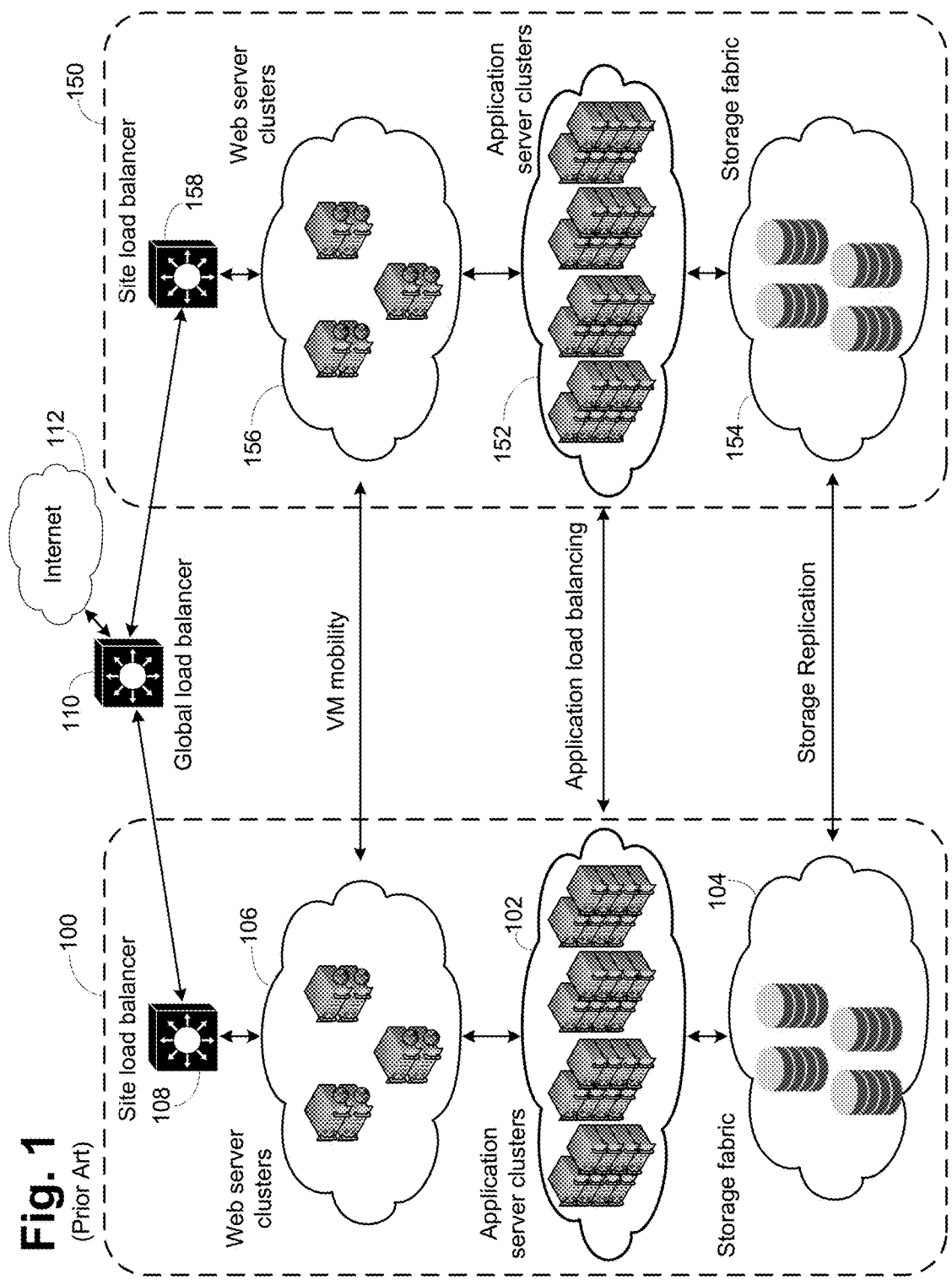
FIG. 1 is a block diagram of data centers according to the prior art.
Figure 2:
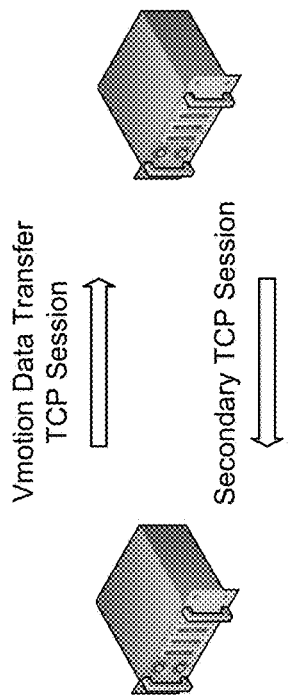
FIG. 2 illustrates TCP channels in a vMotion operation according to the prior art.
Figure 5:
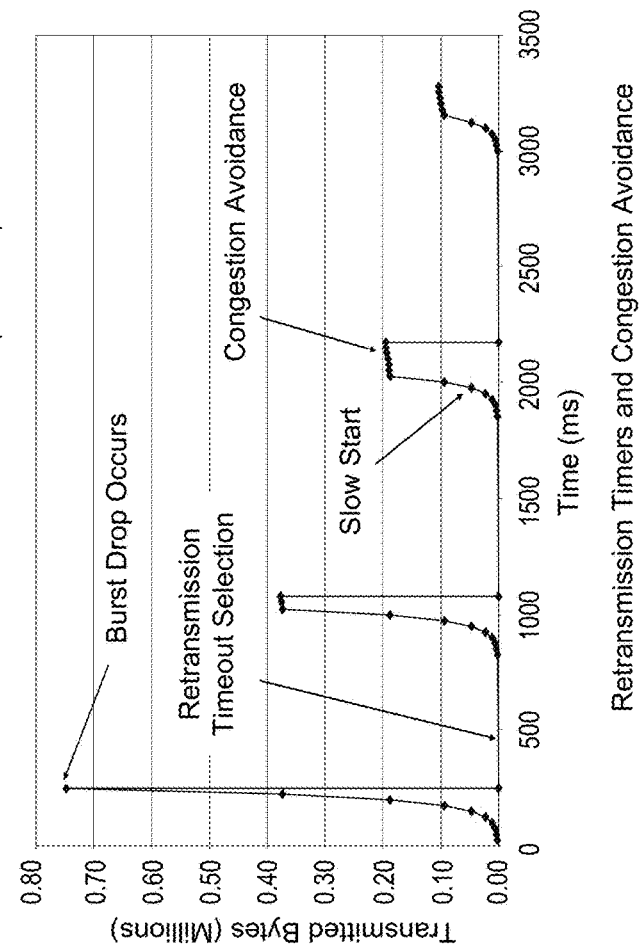
FIGS. 3-5 are graphs of TCP operations.
Figure 3:
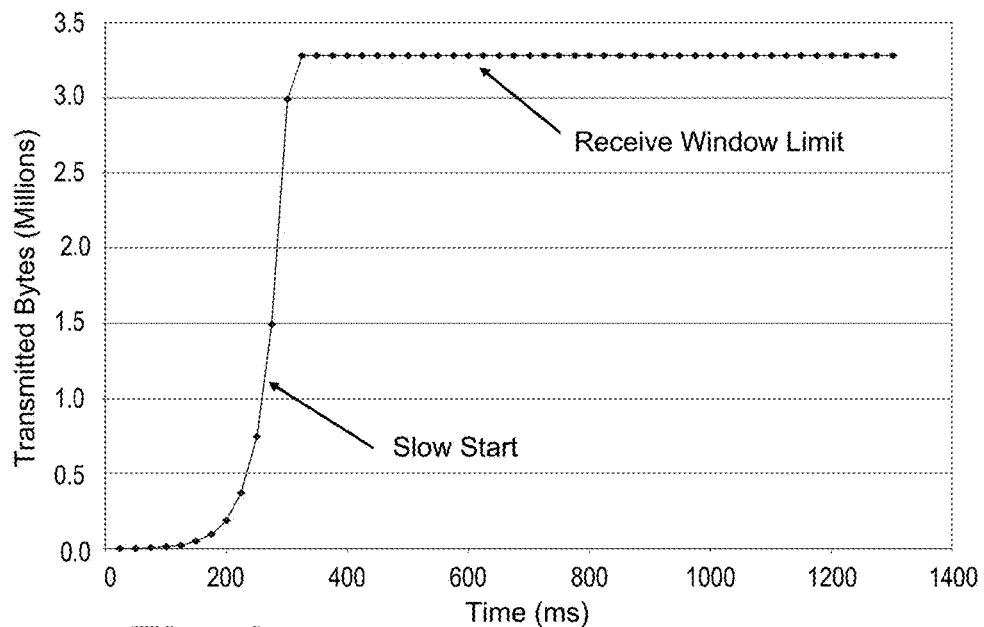
Figure 4:
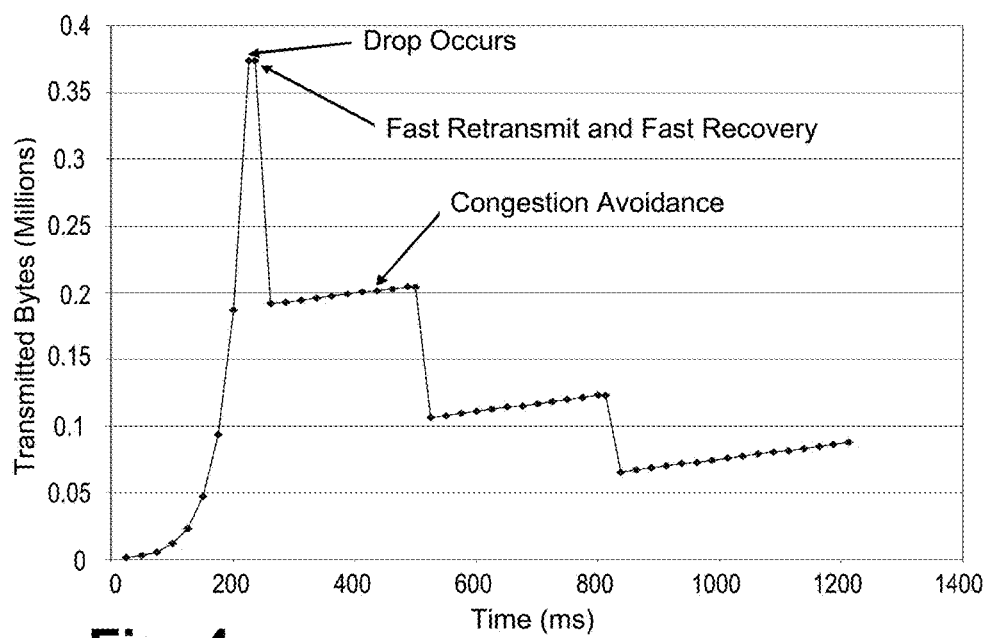
Figure 6A:
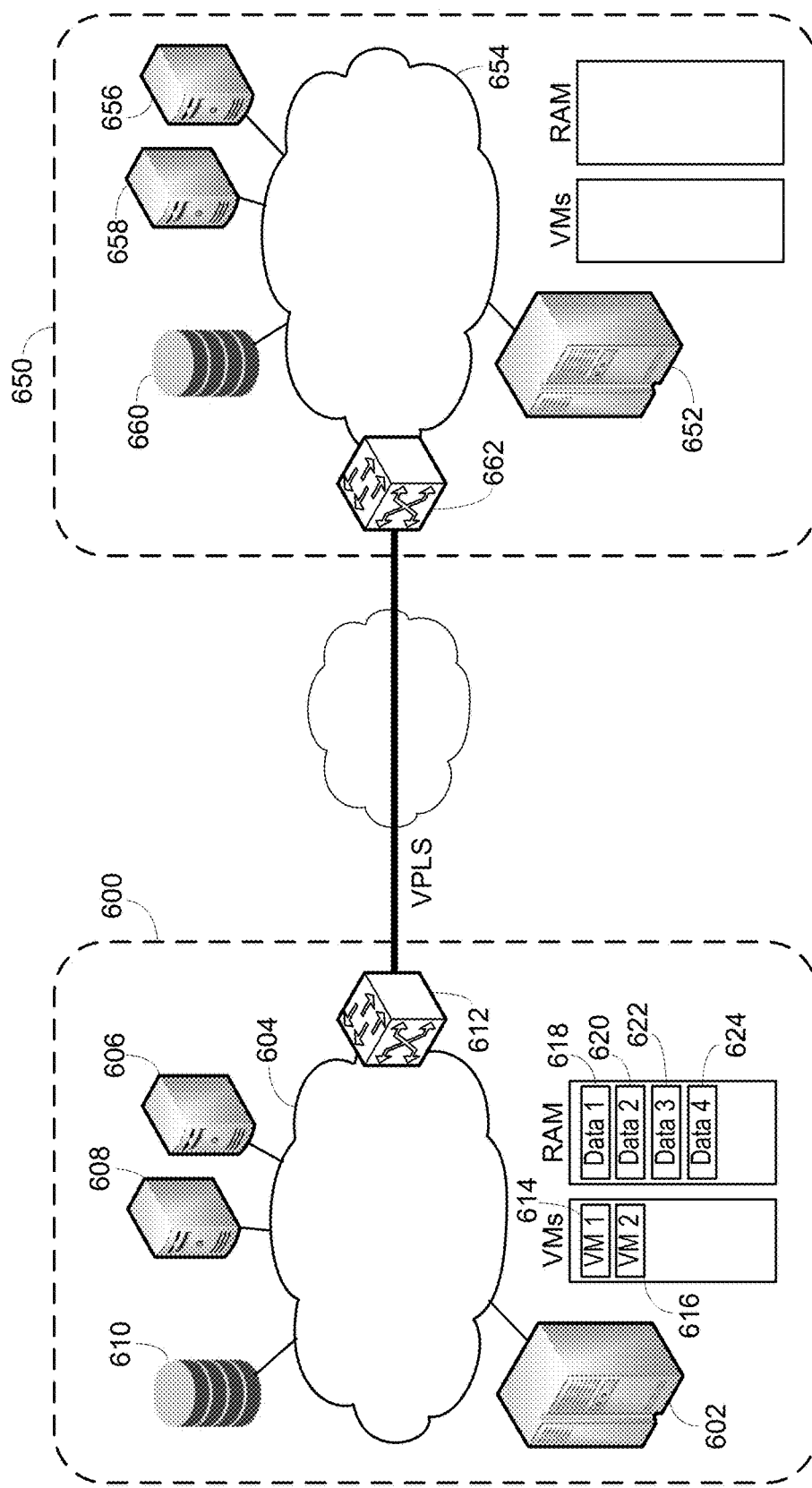
FIGS. 6A-6O are blocks diagrams illustrating a vMotion operation according to the prior art.
Figure 6B:
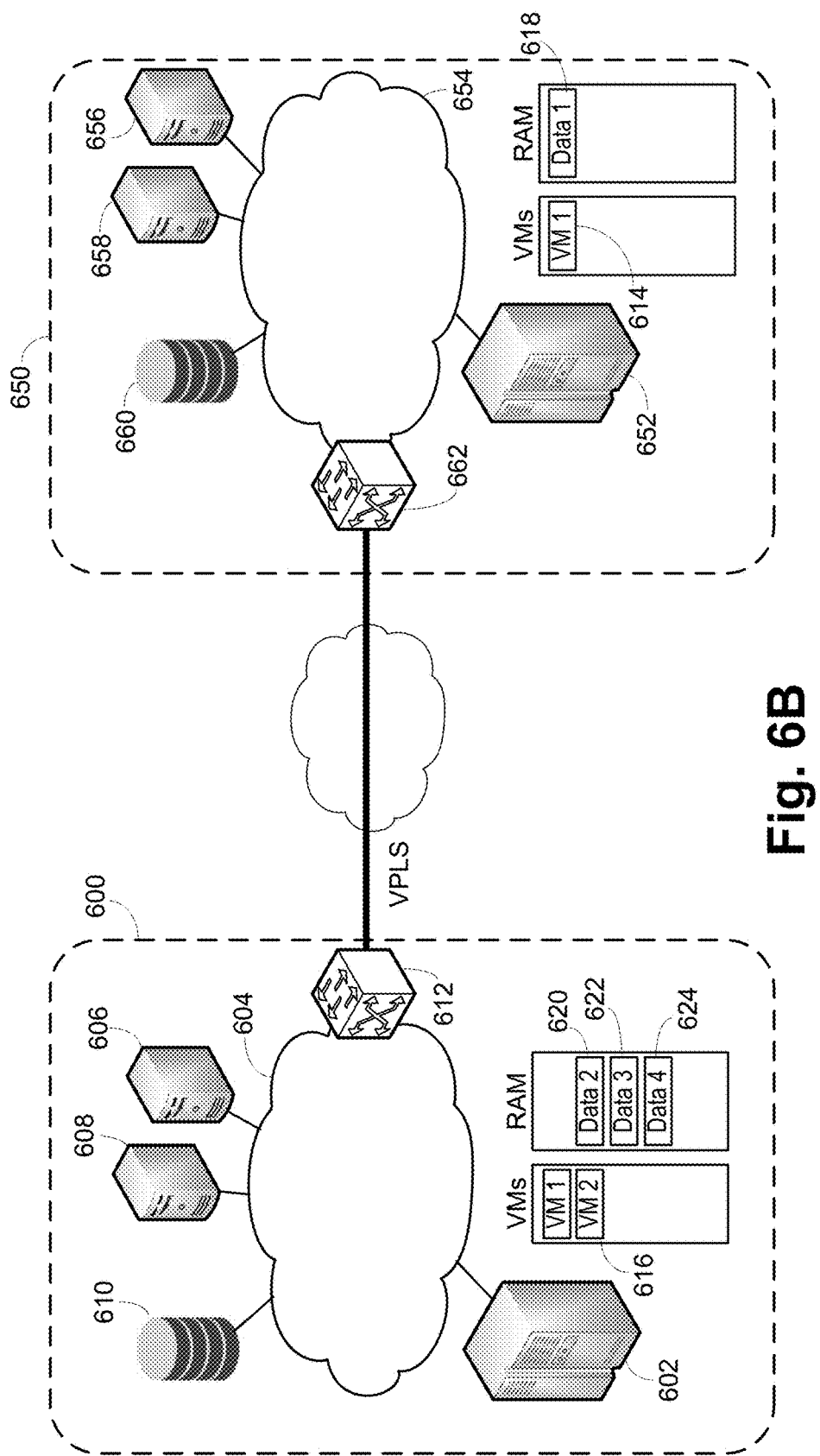
Figure 6C:
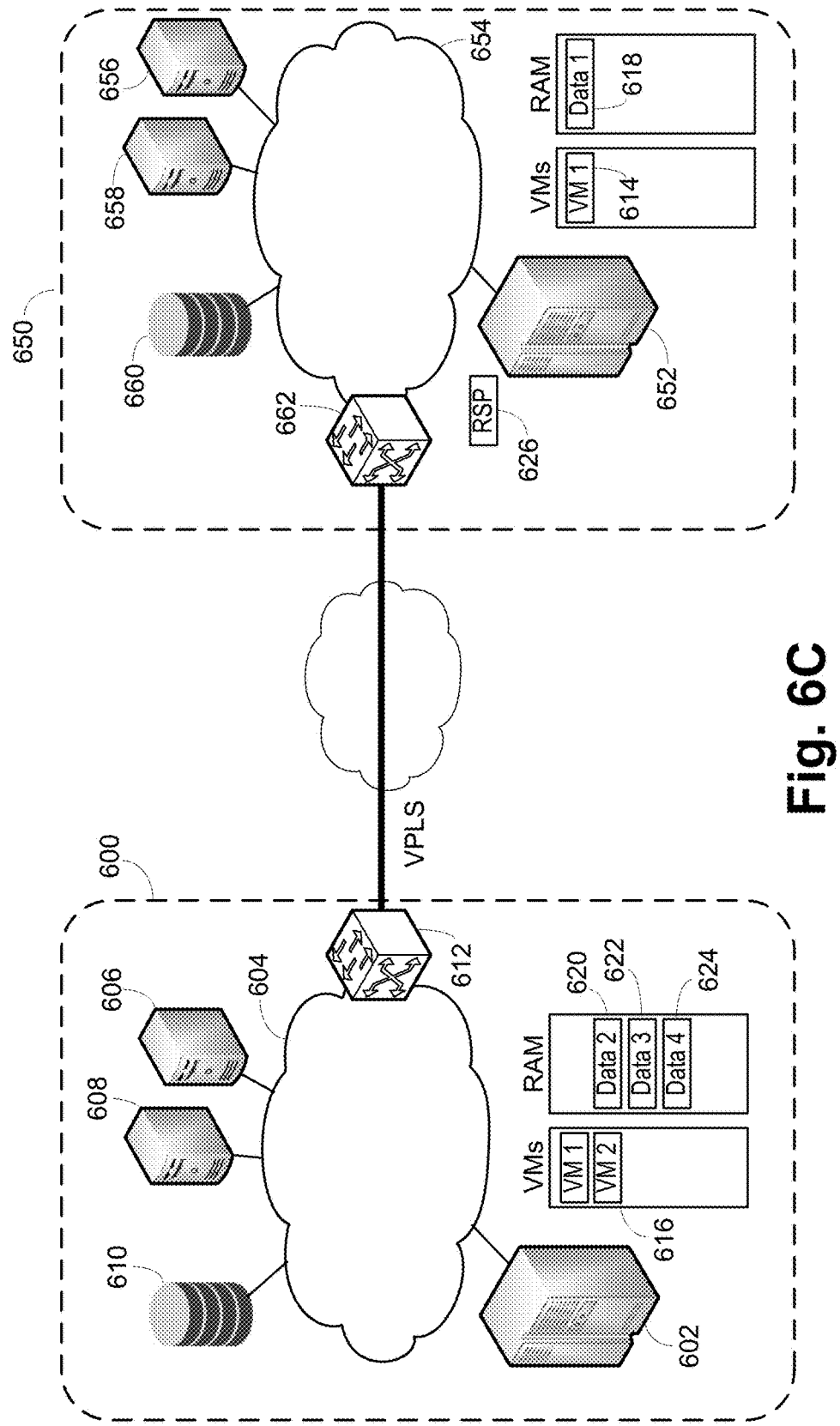
Figure 6D:
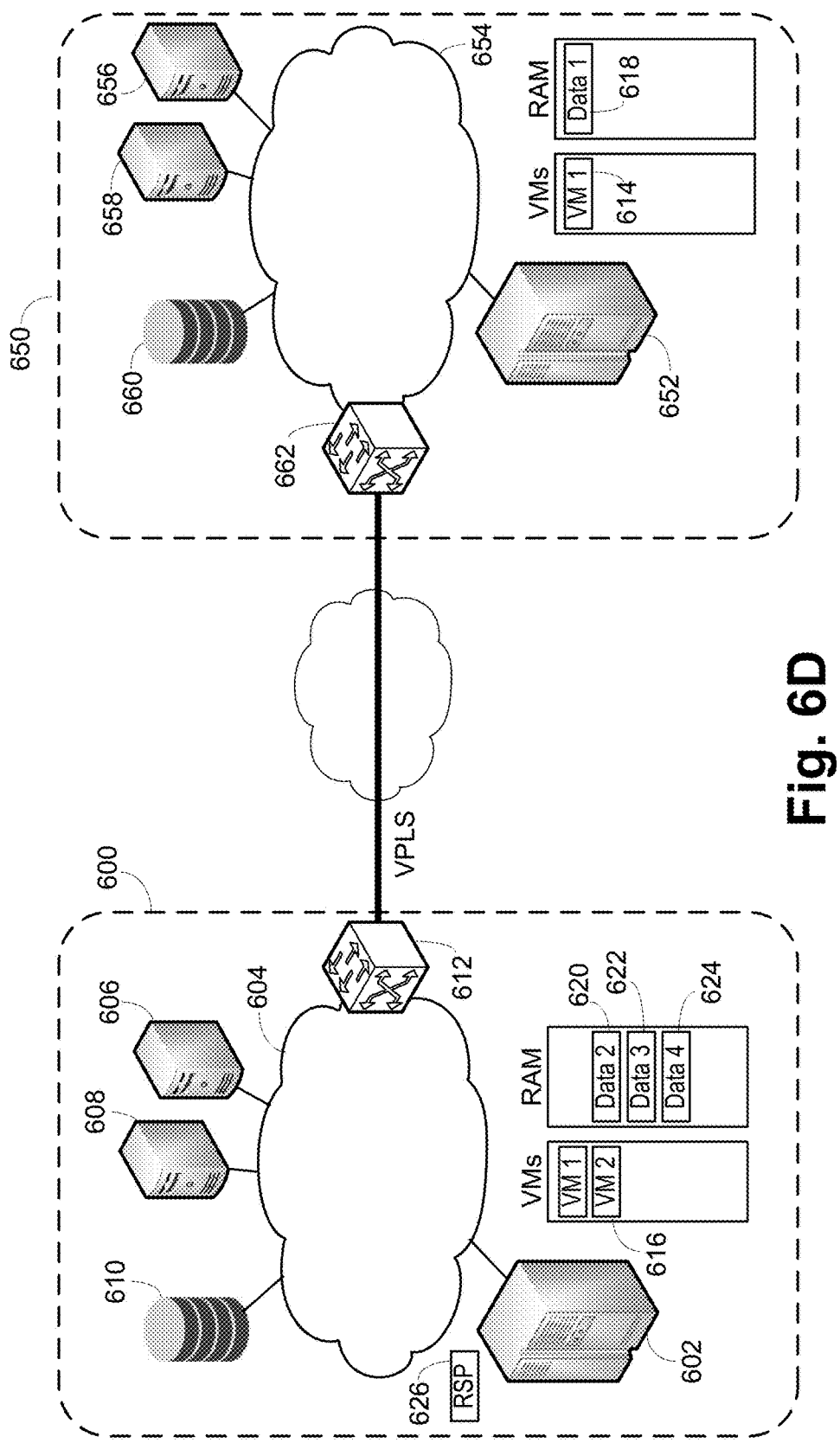
Figure 6E:
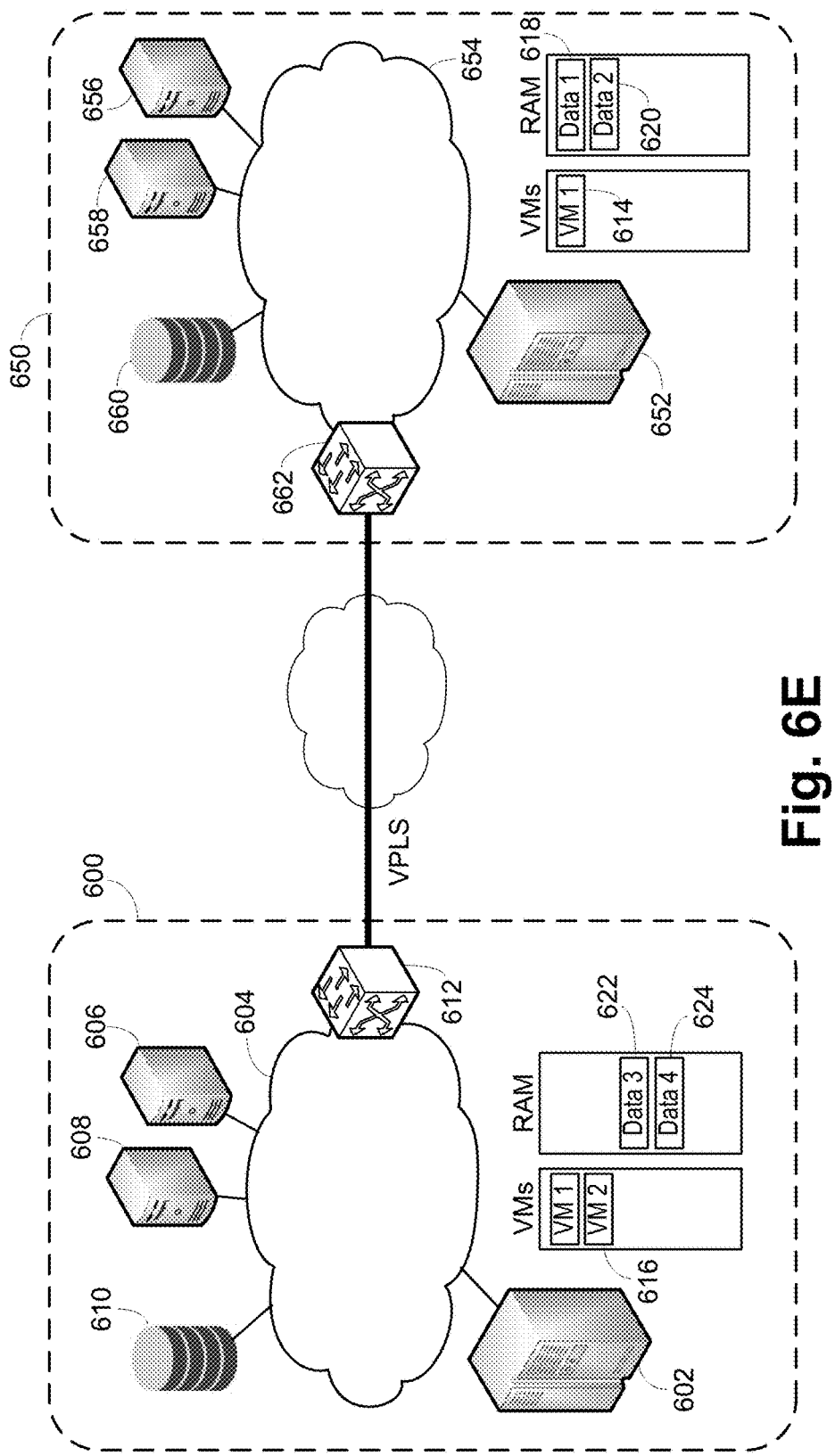
Figure 6F:
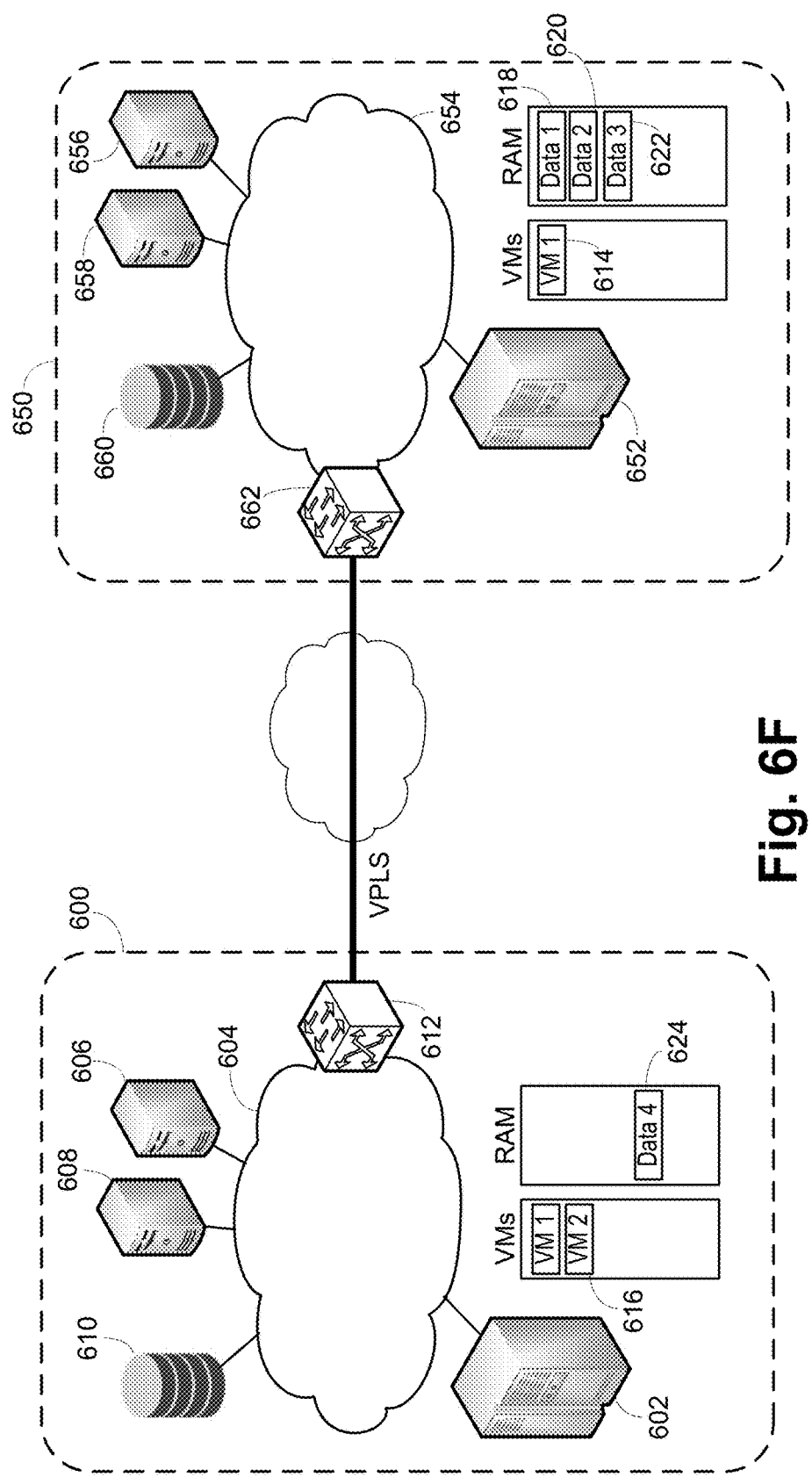
Figure 6G:
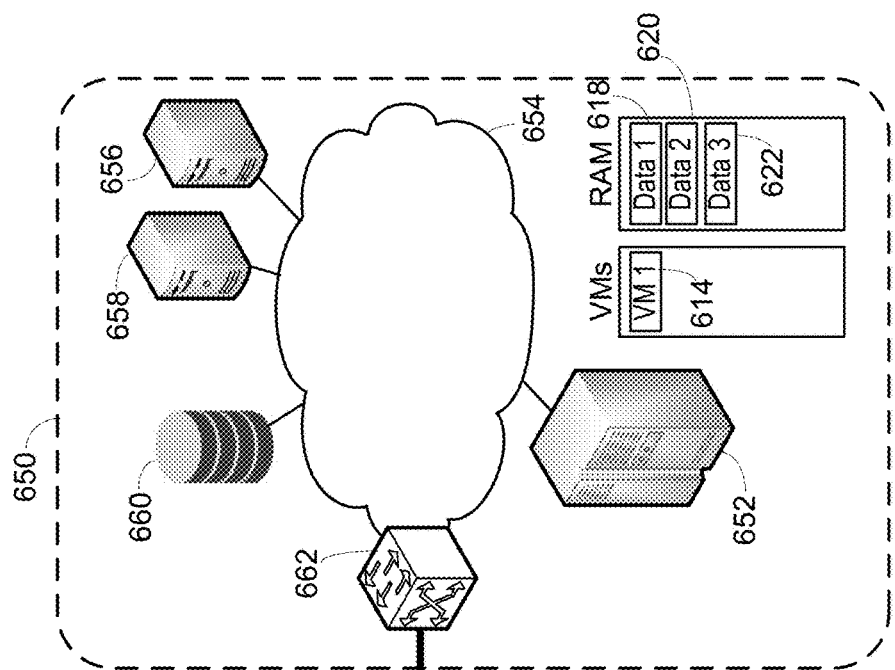
Figure 6G:
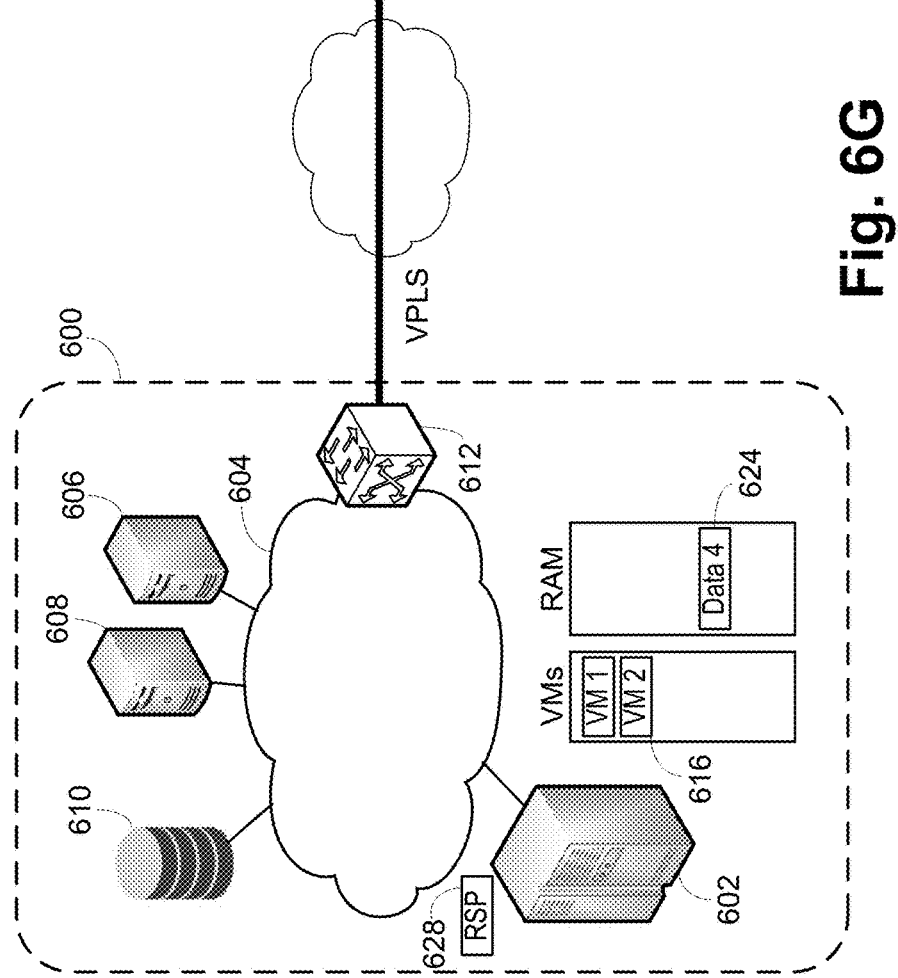
Figure 6H:
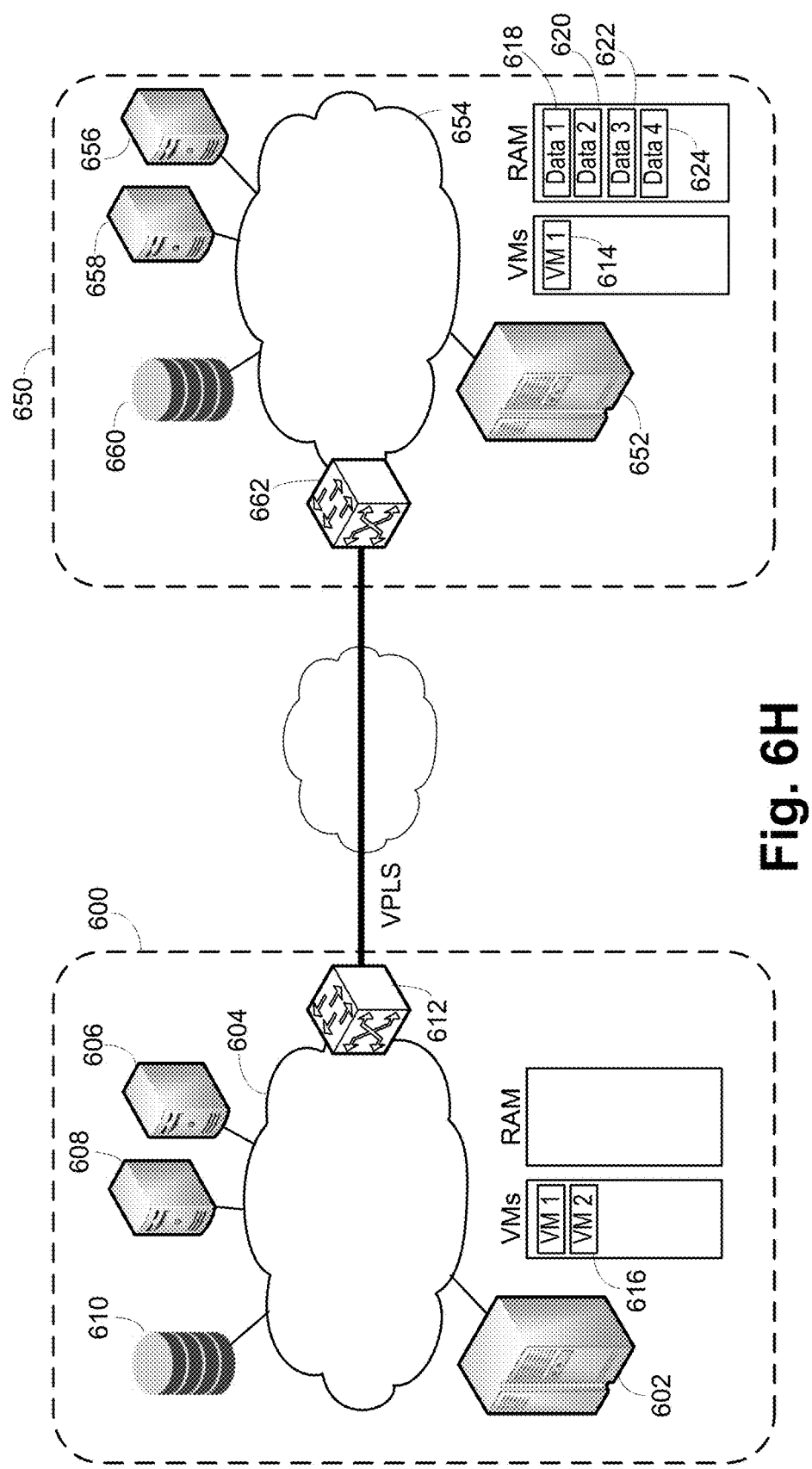
Figure 6I:
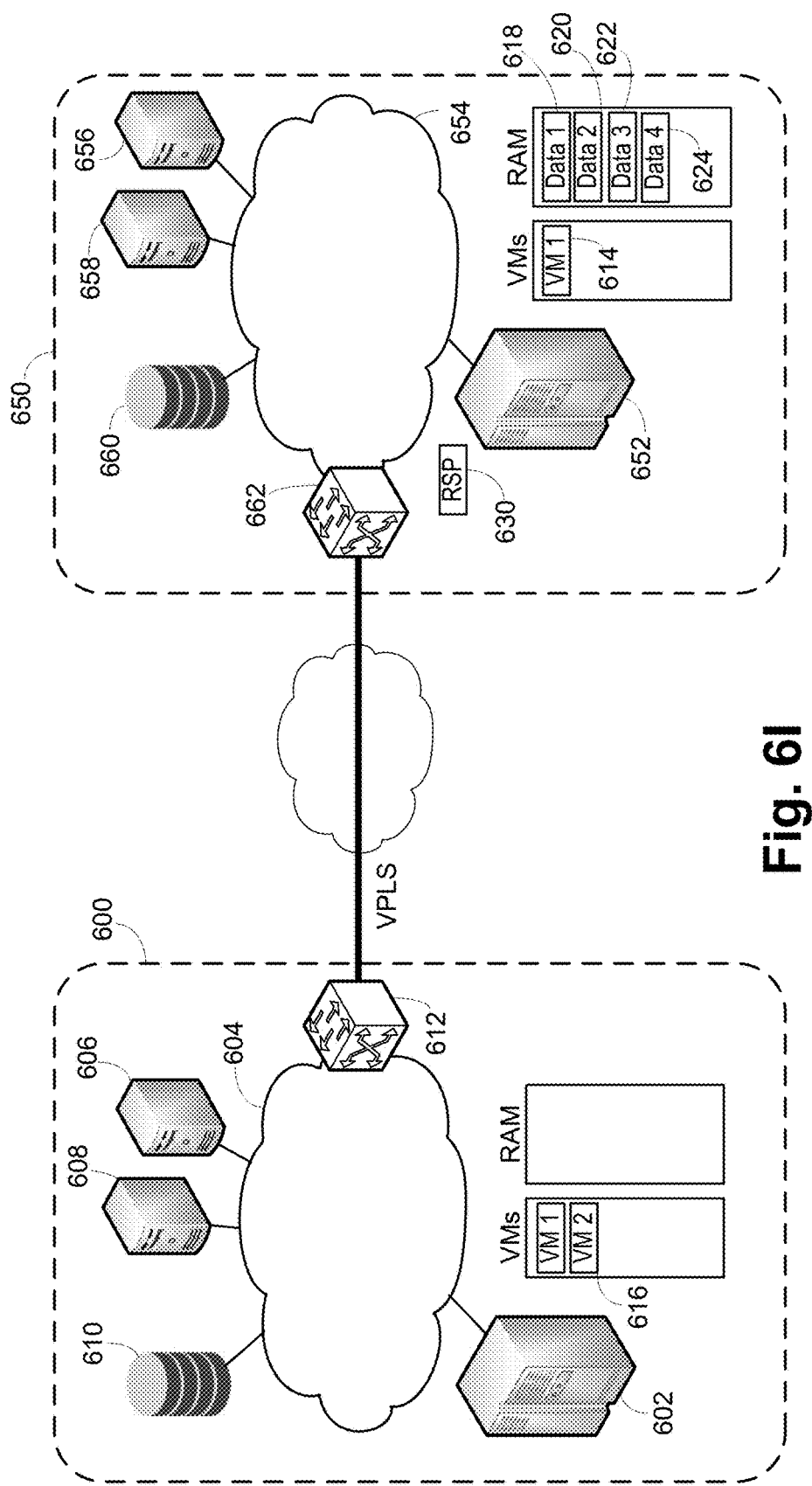
Figure 6J:
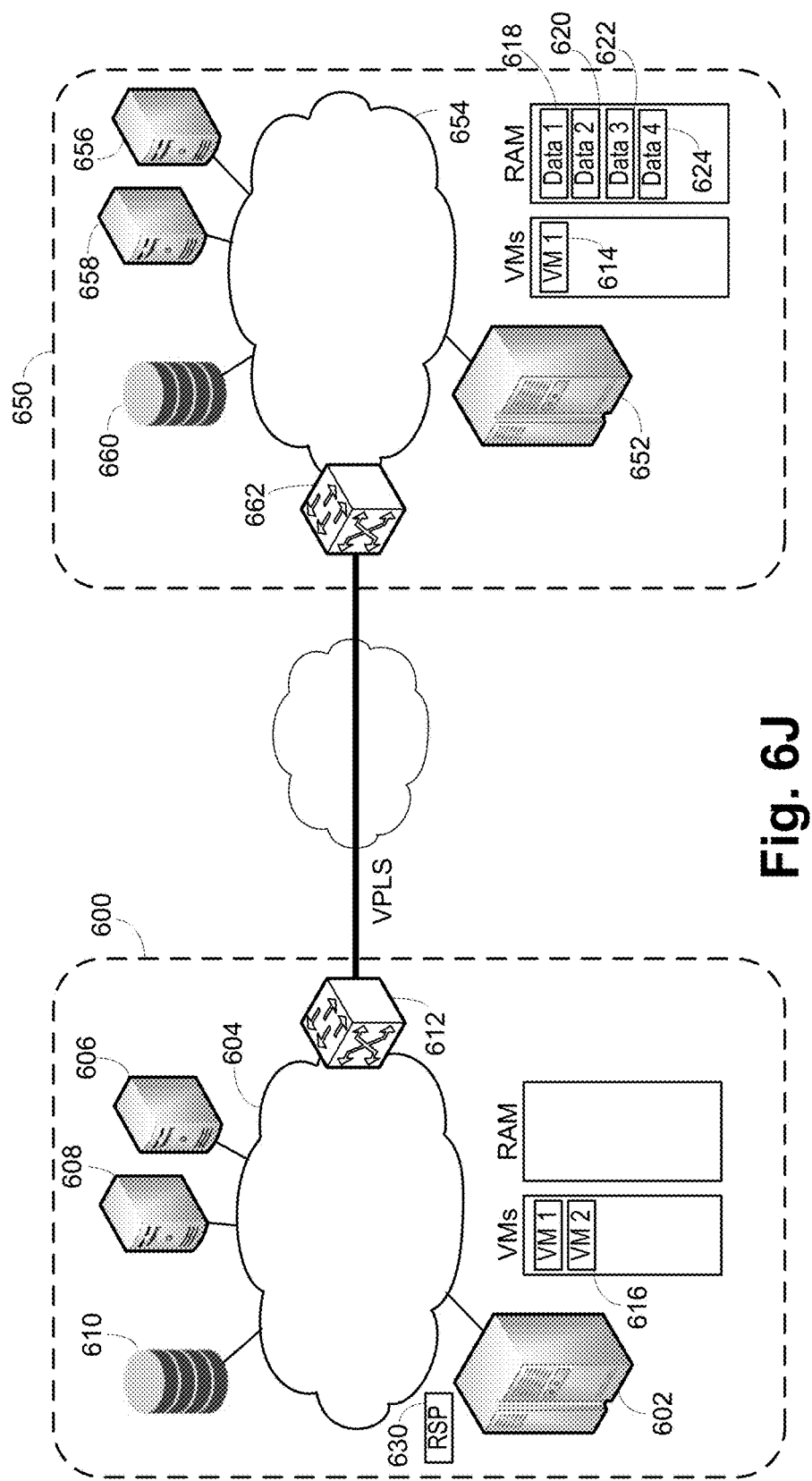
Figure 6K:
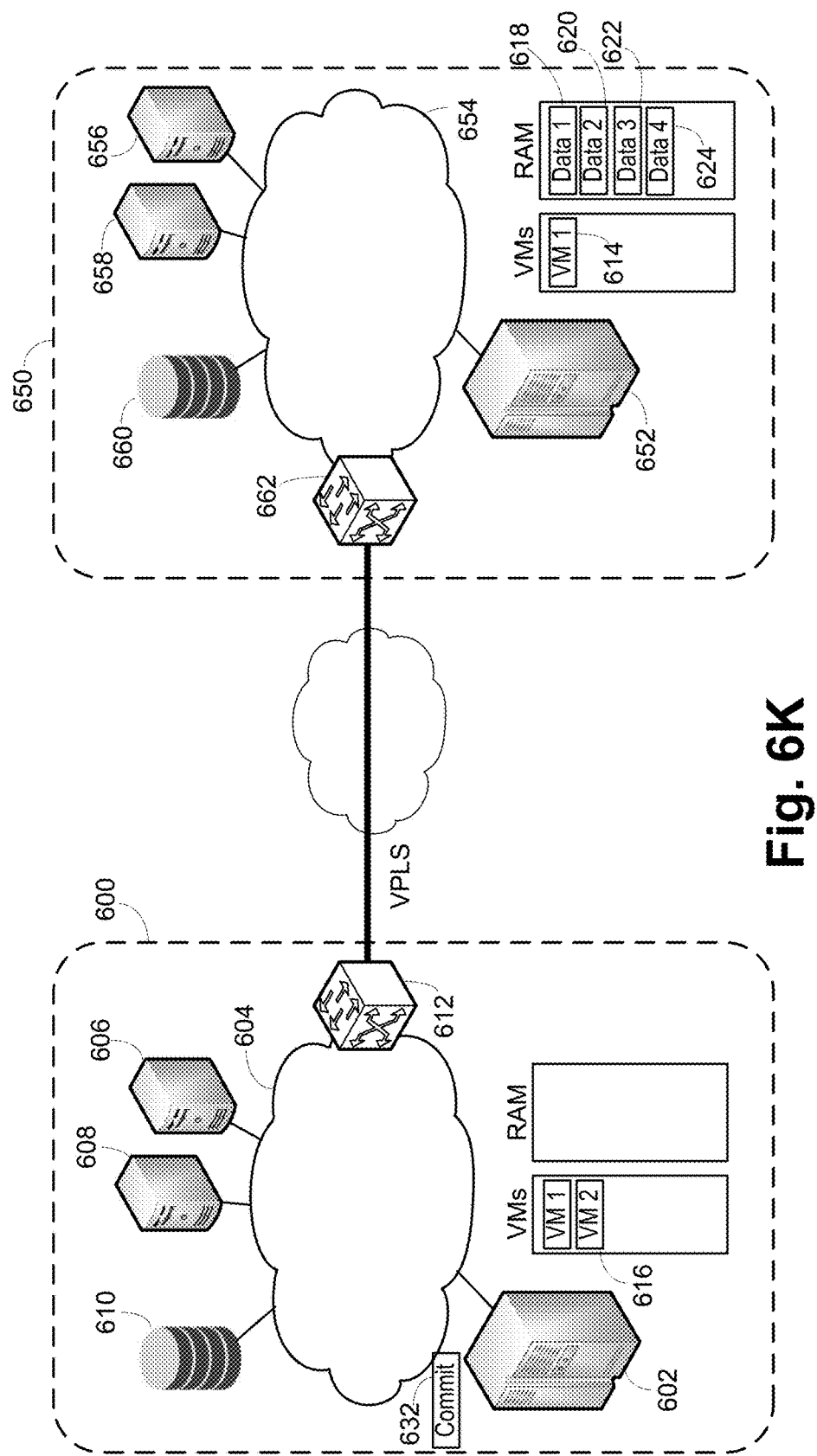
Figure 6L:
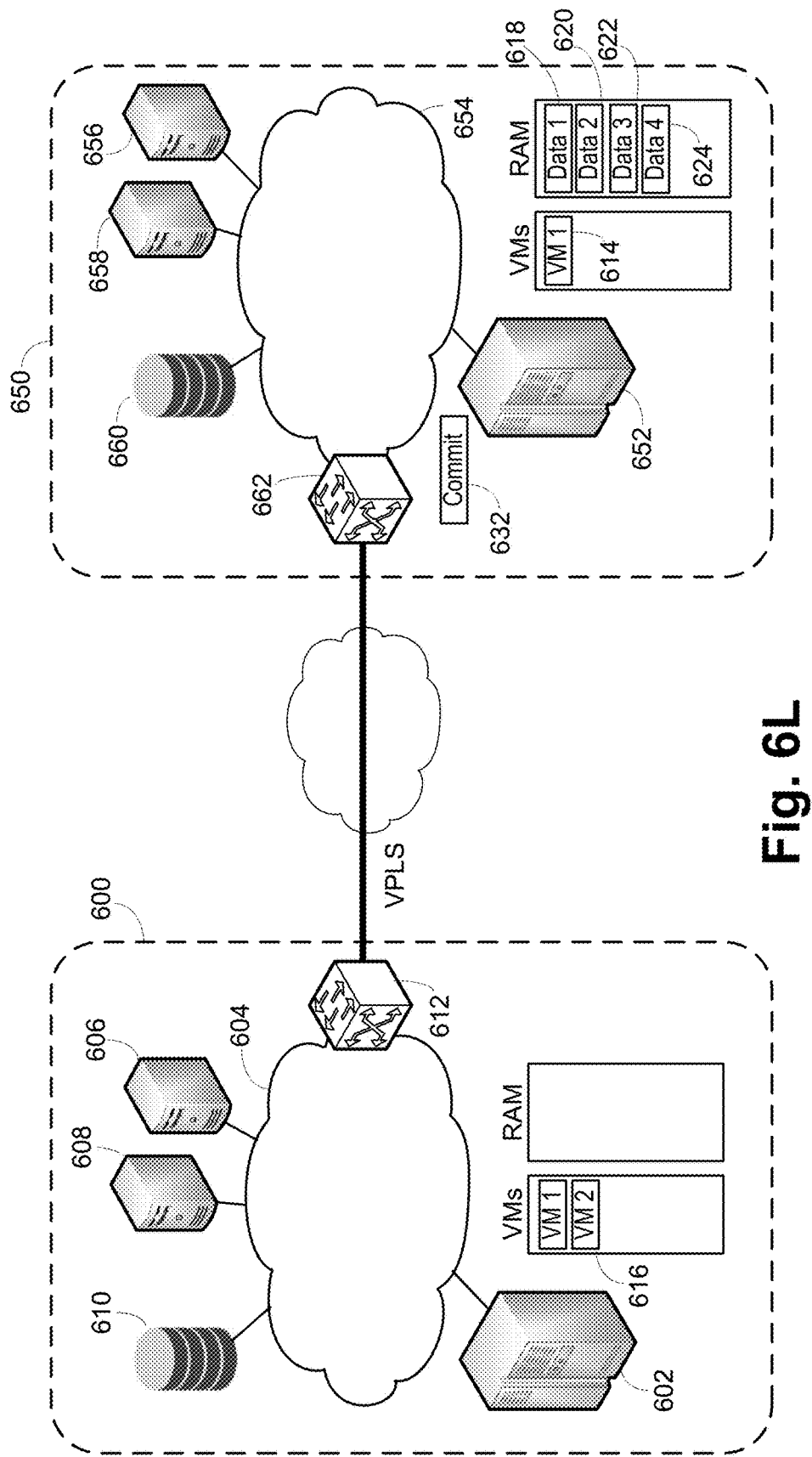
Figure 6M:
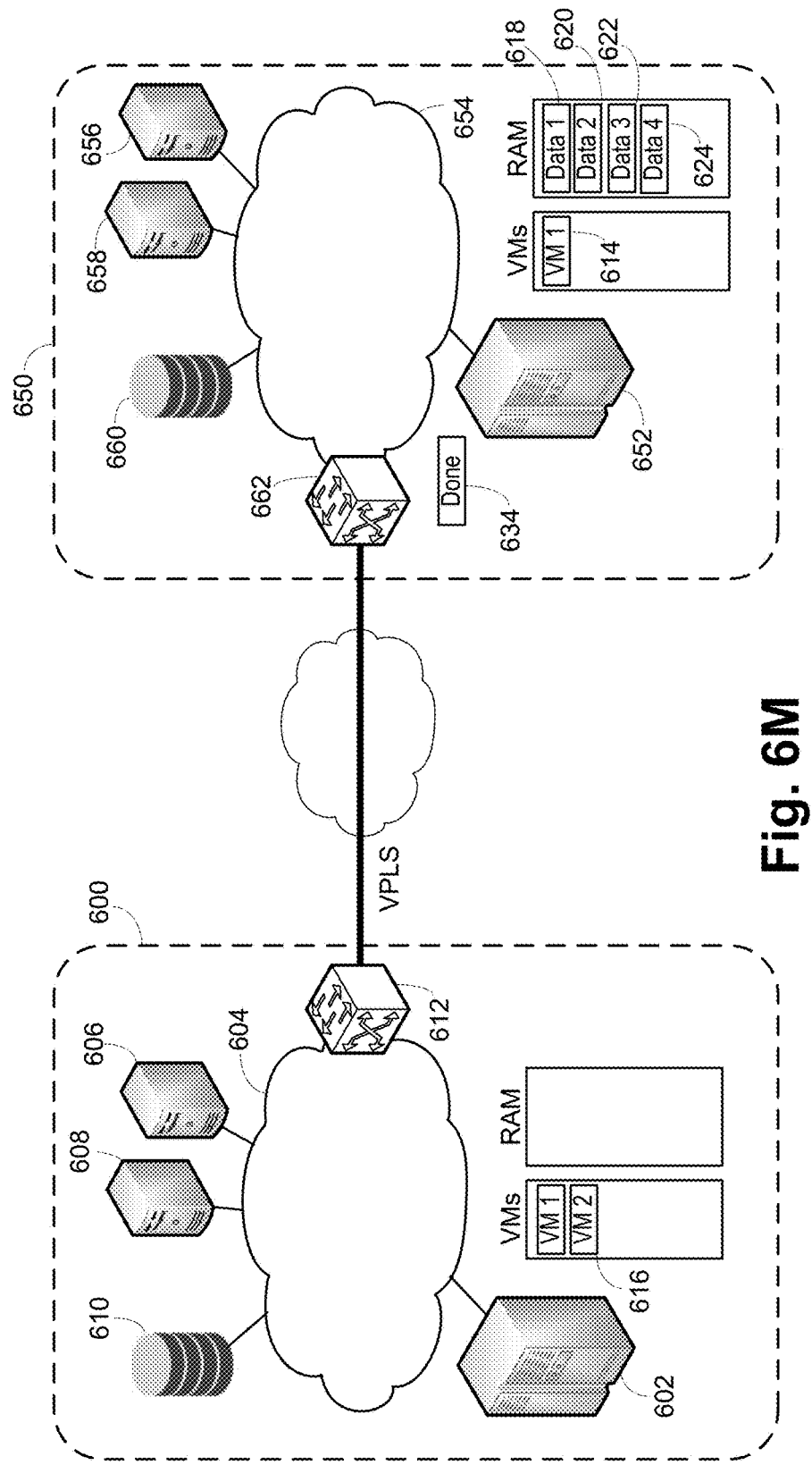
Figure 6N:
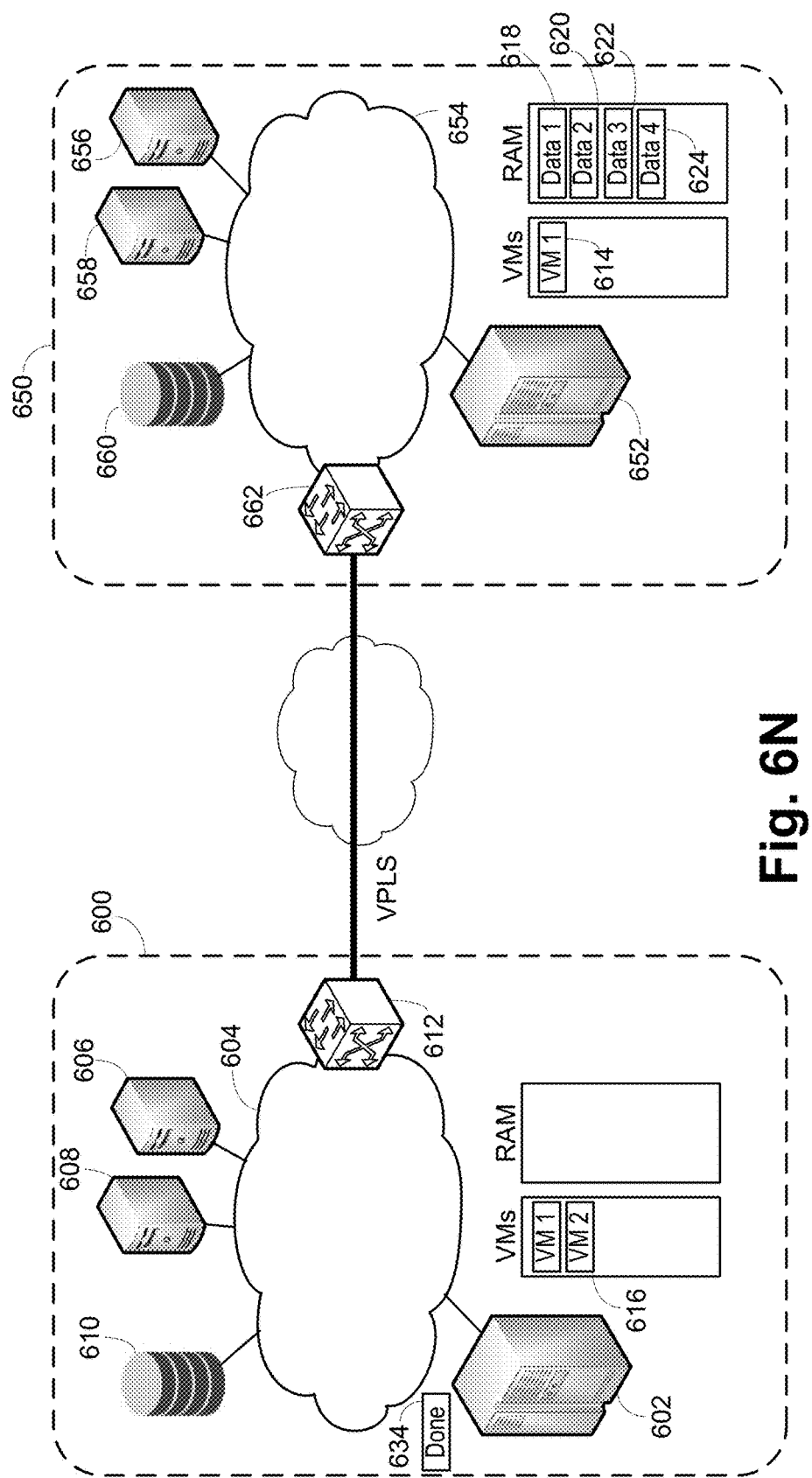
Figure 6O:
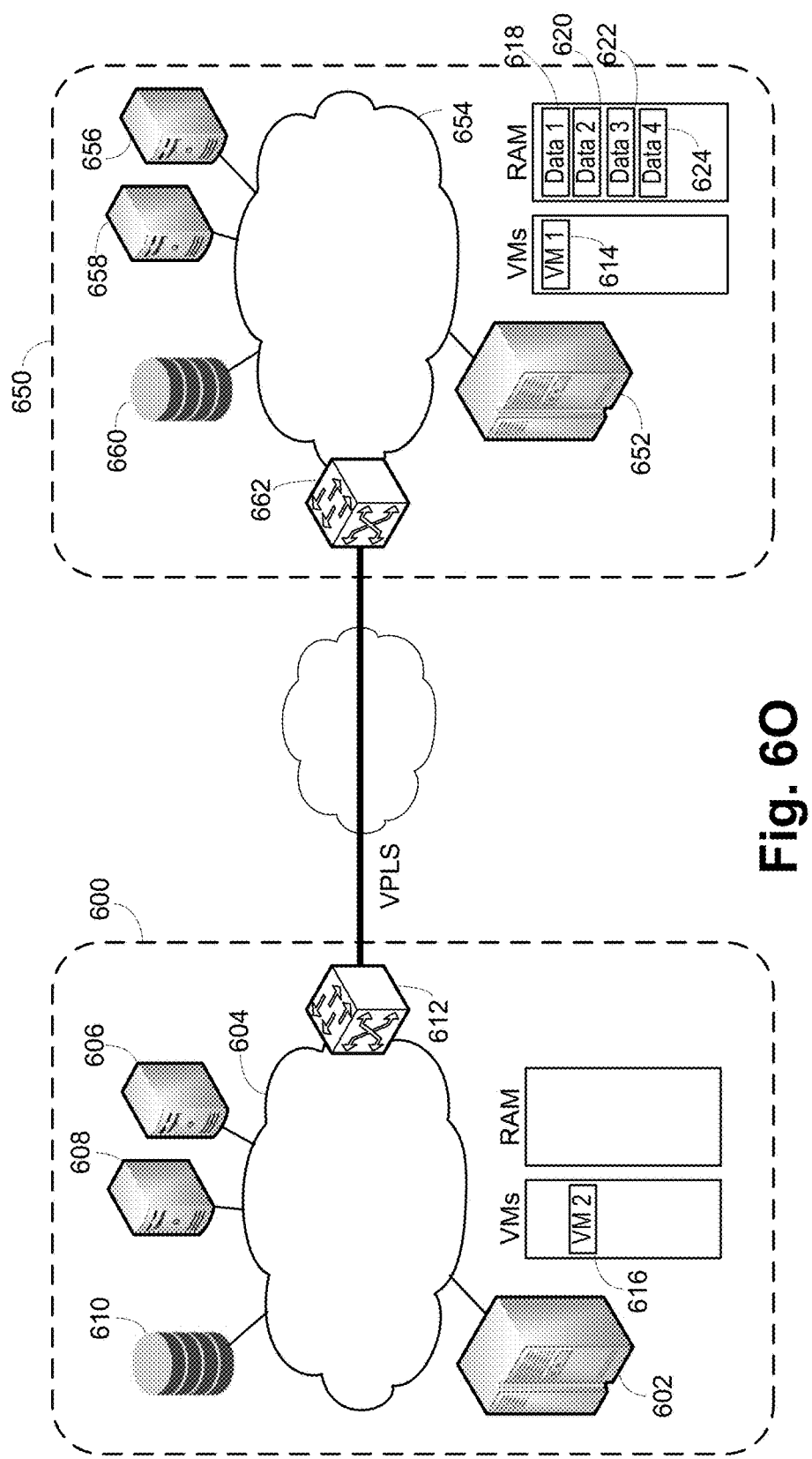
Figure 13:
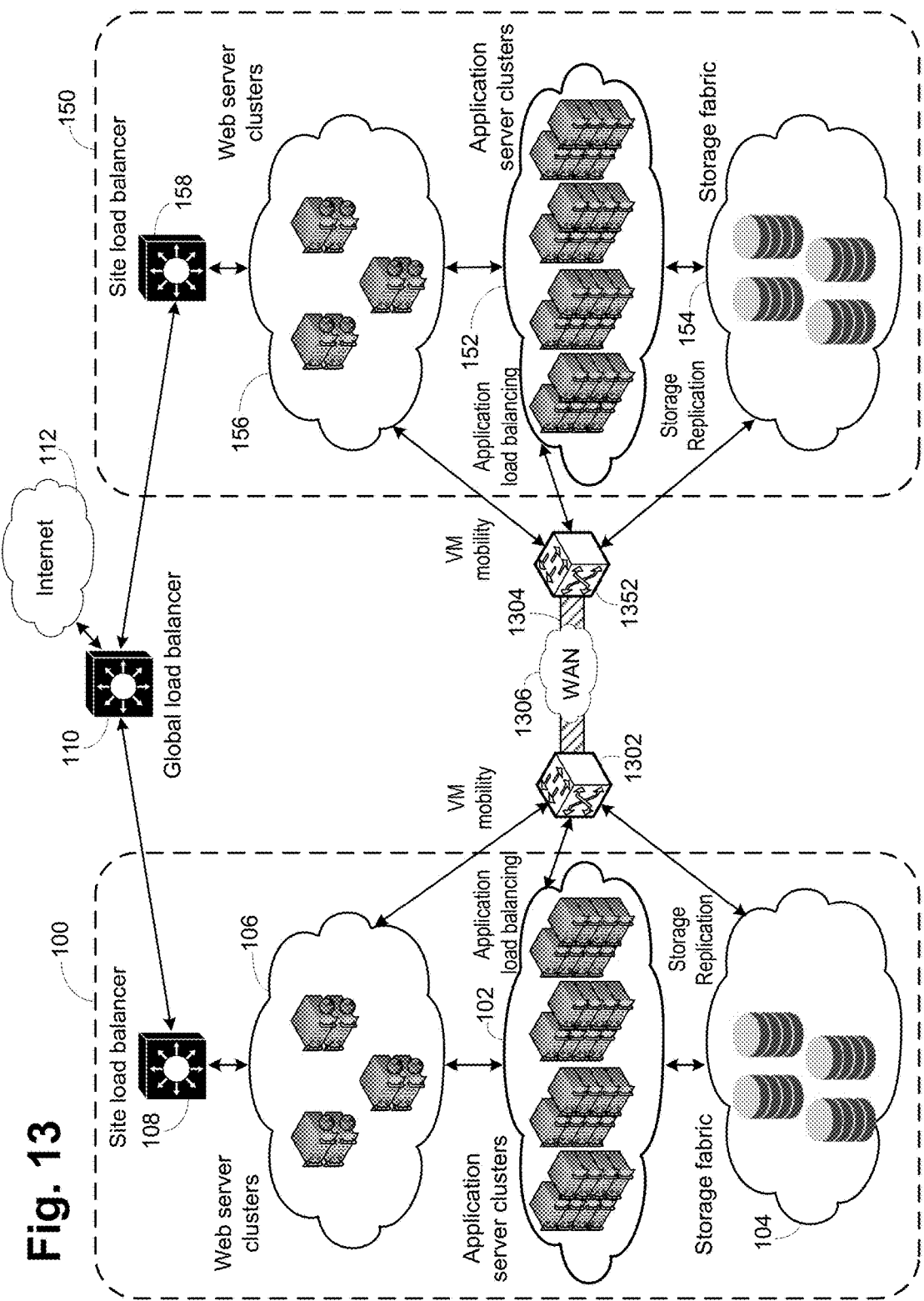
FIG. 13 is a block diagram of the data centers of FIG. 1 modified to operate according to the present invention.

FIG. 13 illustrates the data centers of FIG. 1 with the addition of CNE/LDCM devices 1302, 1352. The CNE/LDCM devices 1302 and 1352 create a cloud virtual interconnect (CVI) 1304 between themselves, effectively an FCIP tunnel through the WAN 1306. The CVI 1304 is used for VM mobility, application load balancing and storage replication between the data centers 100, 150.

The cloud virtual interconnect 1304 preferably includes the following components. An FCIP trunk, as more fully described in U.S. patent application Ser. No. 12/880,495, entitled "FCIP Communications with Load Sharing and Failover", filed Sep. 13, 2010, which is hereby incorporated by reference, aggregates multiple TCP connections to support wide WAN bandwidth ranges from 100 Mbps up to 20 Gbps. It also supports multi-homing and enables transparent failover between redundant network paths.

Adaptive rate limiting (ARL) is performed on the TCP connections to change the rate at which data is transmitted through the TCP connections. ARL uses the information from the TCP connections to determine and adjust the rate limit for the TCP connections dynamically. This will allow the TCP connections to utilize the maximum available bandwidth. It also provides a flexible number of priorities for defining policies and the users are provisioned to define the priorities needed.

High bandwidth TCP (HBTCP) is designed to be used for high throughput applications, such as virtual machine and storage migration, over long fat networks. It overcomes the challenge of the negative effect of traditional TCP/IP in WAN. In order to optimize the performance the following changes have been made.

1) Scaled Windows: In HBTCP, scaled windows are used to support WAN latencies of up to 350 ms or more. Maximum consumable memory will be allocated per session to maintain the line rate.

2) Optimized reorder resistance: HBTCP has more resistance to duplicate acknowledgements and requires more duplicate ACK's to trigger the fast retransmit.

3) Optimized fast recovery: In HBTCP, instead of reducing the cwnd by half, it is reduced by substantially less than 50% in order to make provision for the cases where extensive network reordering is done.

4) Quick Start: The slow start phase is modified to quick start where the initial throughput is set to a substantial value and throughput is only minimally reduced when compared to the throughput before the congestion event.

5) Congestion Avoidance: By carefully matching the amount of data sent to the network speed, congestion is avoided instead of pumping more traffic and causing a congestion event so that congestion avoidance can be disabled.

6) Optimized slow recovery: The retransmission timer in HBTCP (iso ms) expires much quicker than in traditional TCP and is used when fast retransmit cannot provide recovery. This triggers the slow start phase earlier when a congestion event occurs.

7) Lost packet continuous retry: Instead of waiting on an ACK for a selective acknowledgment (SACK) retransmitted packet, continuously retransmit the packet to improve the slow recovery, as described in more detail in U.S. patent application Ser. No. 12/972,713, entitled "Repeated Lost Packet Retransmission in a TCP/IP Network", filed Dec. 20, 2010, which is hereby incorporated by reference.

The vMotion migration data used in VM mobility for VMware systems enters the CNE/LDCM device 1302 through the LAN Ethernet links of the CEE switching chip 1210 and the compressed, encrypted data is sent over the WAN infrastructure using the WAN uplink using the Ethernet ports 1206 of the SOC 1202. Similarly for storage migration, the data from the SAN FC link provided by the FC switching chip 1208 is migrated using the WAN uplink to migrate storage. The control plane module 1220 takes care of establishing, maintaining and terminating TCP sessions with the application servers and the destination LDCM servers.

Figure 14B:
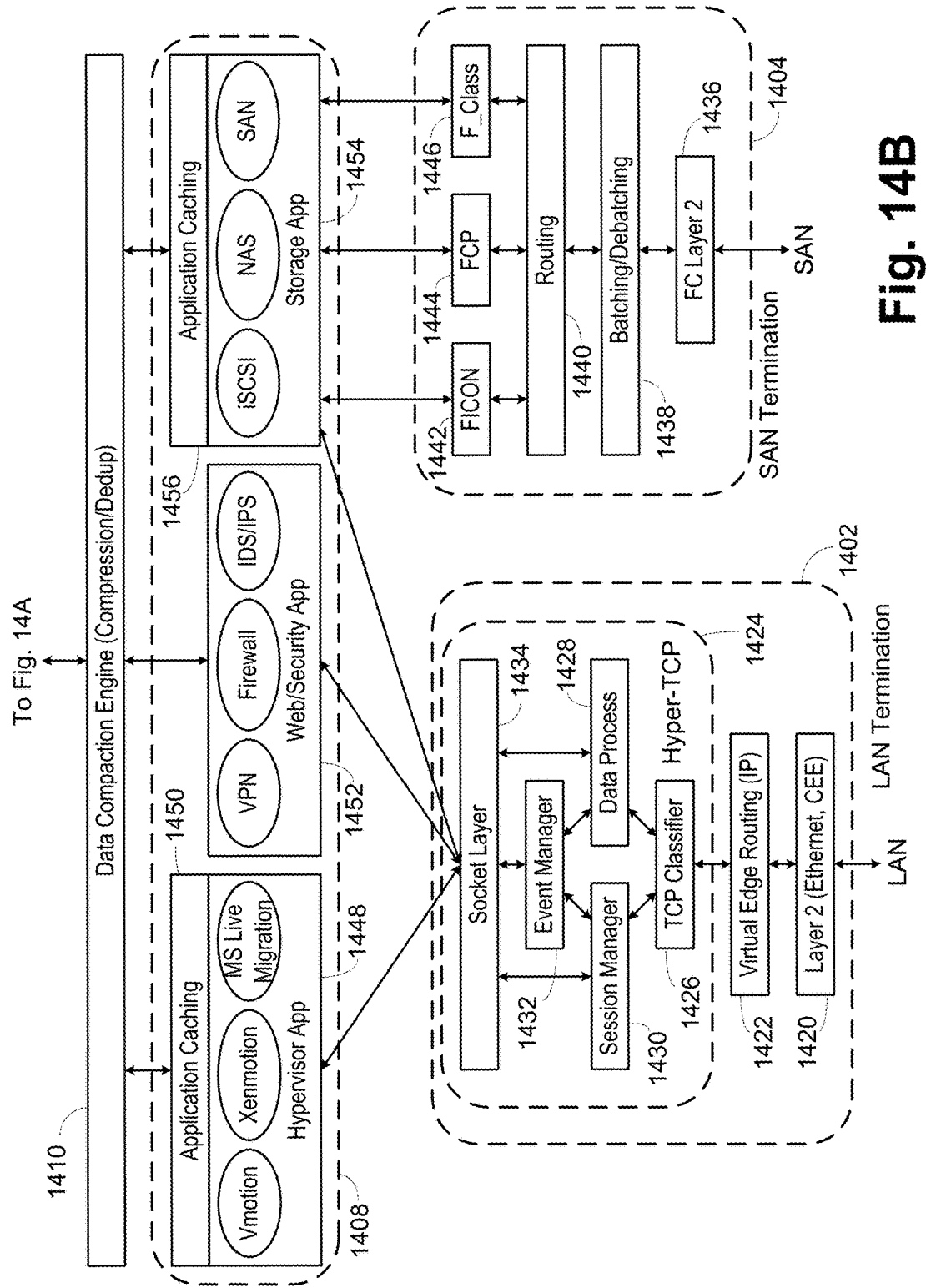

FIGS. 14A and 14B illustrate the functional blocks and modules of the CNE/LDCM device. LAN termination 1402 and SAN termination 1404 are interconnected to the CVI 1406 by an application module 1408, the data compaction engine 1410 and a high reliability delivery application (HRDA) layer 1412.

LAN termination 1402 has a layer 2, Ethernet or Converged Enhanced Ethernet (CEE), module 1420 connected to the LAN ports. An IP virtual edge routing module 1422 connects the layer 2 module 1420 to a Hyper-TCP module 1424. The Hyper-TCP module 1424 operation is described in more detail below and includes a TCP classifier 1426 connected to the virtual edge routing module 1422. The TCP classifier 1426 is connected to a data process module 1428 and a session manager 1430. An event manager 1432 is connected to the data process module 1428 and the session manager 1430. The event manager 1432, the data process module 1428 and the session manager 1430 are all connected to a socket layer 1434, which acts as the interface for the Hyper-TCP module 1424 and the LAN termination 1402 to the application module 1408.

SAN termination 1404 has an FC layer 2 module 1436 connected to the SAN ports. A batching/debatching module 1438 connects the FC layer 2 module 1436 to a routing module 1440. Separate modules are provided for Fibre connection (FICON) traffic 1442, FCP traffic 1444 and F_Class traffic 1446, with each module connected to the routing module 1440 and acting as interfaces between the SAN termination 1404 and the application module 1408.

The application module 1408 has three primary applications, hypervisor 1448, web/security 1452 and storage 1454. The hypervisor application 1448 cooperates with the various hypervisor motion functions, such vMotion, Xenmotion and MS Live Migration. A caching subsystem 1450 is provided with the hypervisor application 1448 for caching of data during the motion operations. The web/security application 1452 cooperates with VPNs, firewalls and intrusion systems. The storage application 1454 handles iSCSI, NAS and SAN traffic and has an accompanying cache 1456.

The data compaction engine 1410 uses the compression engine 1212 to handle compression/decompression and dedup operations to allow improved efficiency of the WAN links.

The main function of the HRDA layer 1412 is to ensure the communication reliability at the network level and also at the transport level. As shown, the data centers are consolidated by extending the L2 TRILL network over IP through the WAN infrastructure. The redundant links are provisioned to act as back up paths. The HRDA layer 1412 performs a seamless switchover to the backup path in case the primary path fails. HBTCP sessions running over the primary path are prevented from experiencing any congestion event by retransmitting any unacknowledged segments over the backup path. The acknowledgements for the unacknowledged segments and the unacknowledged segments themselves are assumed to be lost. The HRDA layer 1412 also ensures reliability for TCP sessions within a single path. In case a HBTCP session fails, any migration application using the HBTCP session will also fail. In order to prevent the applications from failing, the HRDA layer 1412 transparently switches to a backup HBTCP session.

The CVI 1406 includes an IP module 1466 connected to the WAN links. An IPSEC module 1464 is provided for link security. A HBTCP module 1462 is provided to allow the HBTCP operations as described above. A quality of service (QoS)/ARL module 1460 handles the QoS and ARL functions described above. A trunk module 1458 handles the trunking described above.

Hyper-TCP is a component in accelerating the migration of live services and applications over long distance networks. Simply, a TCP session between the application client and server is locally terminated and by leveraging the high bandwidth transmission techniques between the data centers, application migration is accelerated.

Hyper-TCP primarily supports two modes of operation:

1) Data Termination Mode (DTM): In data termination mode, the end device TCP sessions are not altered but the data is locally acknowledged and data sequence integrity is maintained.

2) Complete Termination Mode (CTM): In the complete termination mode, end device TCP sessions are completely terminated by the LDCM. Data sequence is not maintained between end devices but data integrity is guaranteed.

There are primarily three phases in Hyper-TCP. They are Session Establishment, Data Transfer and Session Termination. These three phases are explained below.

1) Session Establishment: During this phase, the connection establishment packets are snooped and the TCP session data, like connection end points, Window size, MTU and sequence numbers, are cached. The Layer 2 information like the MAC addresses is also cached. The TCP session state on the Hyper-TCP server is same as that of the application server and the TCP session state of the Hyper-TCP client is same as application client. With the cached TCP state information, the Hyper-TCP devices can locally terminate the TCP connection between the application client and server and locally acknowledge the receipt of data packets. Hence, the RTT's calculated by the application will be masked from including the WAN latency, which results in better performance.

Figure 15:
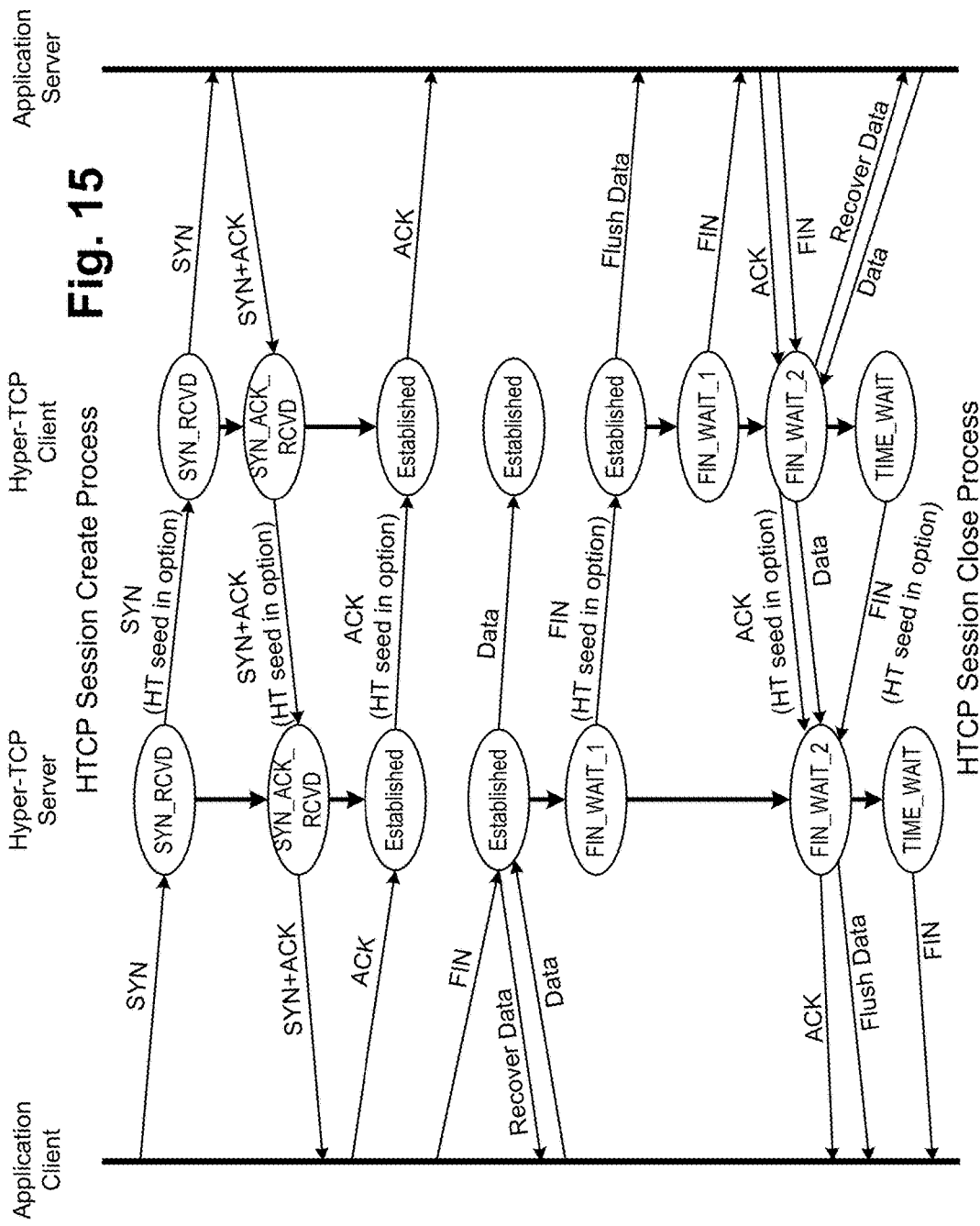
FIG. 15 is a ladder diagram of Hyper-TCP session create and close processes according to the present invention.

The session create process is illustrated in FIG. 15. The application client transmits a SYN, which is snooped by the Hyper-TCP server. The Hyper-TCP server forwards the SYN to the Hyper-TCP client, potentially with a seed value in the TCP header options field. The seed value can indicate whether this is a Hyper-TCP session, a termination mode, the Hyper-TCP version and the like. The seed value is used by the various modules, such as the data compaction engine 1410 and the CVI 1406, to determine the need for and level of acceleration of the session. The Hyper-TCP client snoops and forwards the SYN to the application server. The application server responds with a SYN+ACK, which the Hyper-TCP client snoops and forwards to the Hyper-TCP server. The Hyper-TCP server snoops the SYN+ACK and forwards it to the application client. The application client responds with an ACK, which the Hyper-TCP server forwards to the Hyper-TCP client, which in turn provides it to the application server. This results in a created TCP session.

2) Data Transfer Process: Once the session has been established, the data transfer is always locally handled between a Hyper-TCP device and the end device. A Hyper-TCP server acting as a proxy destination server for the application client locally acknowledges the data packets and the TCP session state is updated. The data is handed over to the HBTCP session between the Hyper-TCP client and server. HBTCP session compresses and forwards the data to the Hyper-TCP client. This reduces the RTT's seen by the application client and the source as it masks the latencies incurred on the network. The data received at the Hyper-TCP client is treated as if the data has been generated by the Hyper-TCP client and the data is handed to the Hyper-TCP process running between the Hyper-TCP client and the application server. Upon congestion in the network, the amount of data fetched from the Hyper-TCP sockets is controlled.

Figure 16:
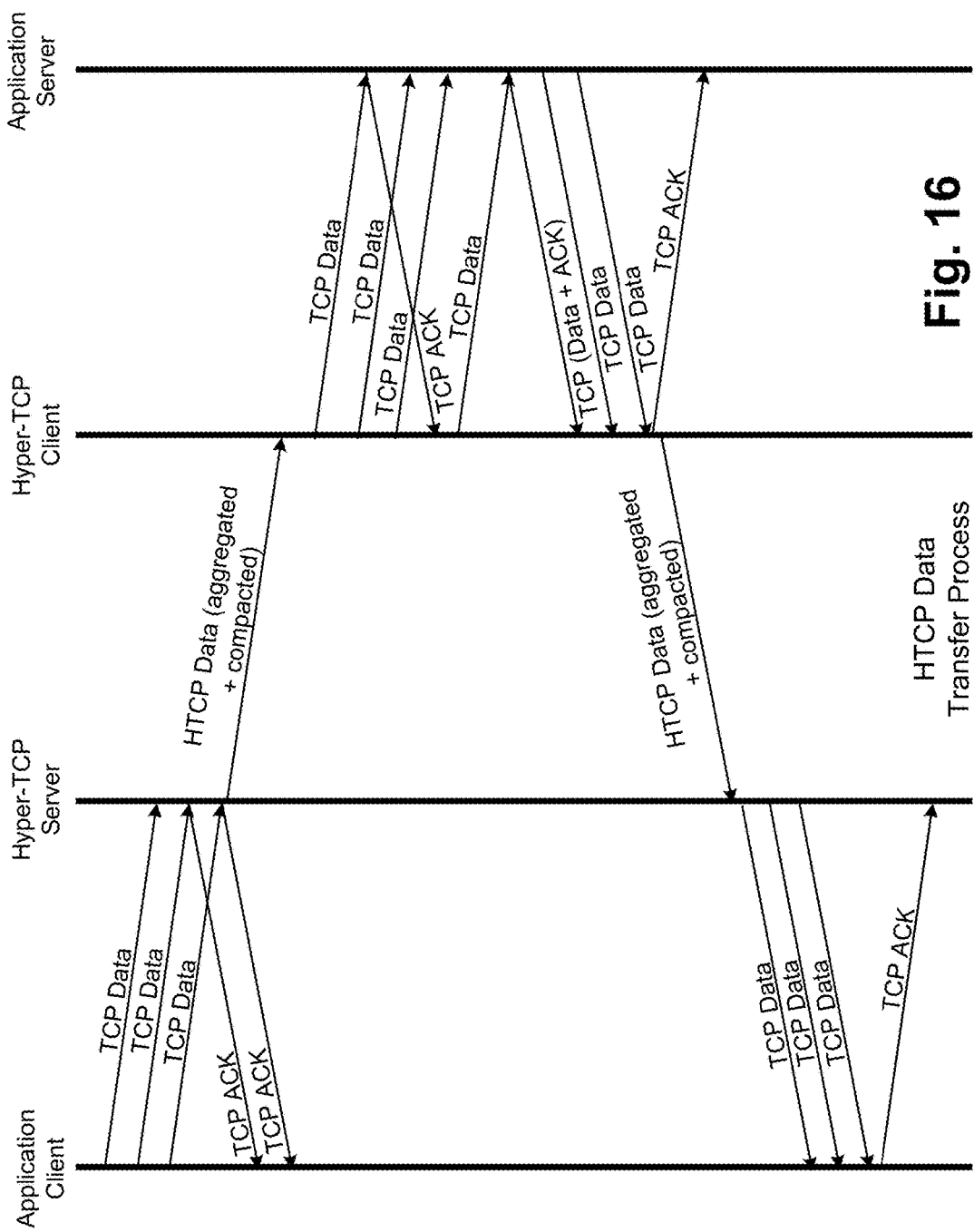
FIG. 16 is a ladder diagram of Hyper-TCP data transfer operations according to the present invention.

This process is illustrated in FIG. 16. Data is provided from the application client to the Hyper-TCP server, with the Hyper-TCP server ACKing the data as desired, thus terminating the connection locally at the Hyper-TCP server. The LDCM device aggregates and compacts the received data to reduce WAN traffic and sends it to the Hyper-TCP client in the other LDCM device. The receiving LDCM device uncompacts and deaggregates the data and provides it to the Hyper-TCP client, which in turn provides it to the application server, which periodically ACKs the data. Should the application server need to send data to the application client, the process is essentially reversed. By having the Hyper-TCP server and client locally respond to the received data, thus locally terminating the connections, the application server and client are not aware of the delays resulting from the WAN link between the Hyper-TCP server and client.

3) Session Termination: A received FIN/RST is transparently sent across like the session establishment packets. This is done to ensure the data integrity and consistency between the two end devices. The FIN/RST received at the Hyper-TCP server will be transparently sent across only when all the packets received prior to receiving a FIN have been locally acknowledged and sent to the Hyper-TCP client. If a FIN/RST packet has been received on the Hyper-TCP client, the packet will be transparently forwarded after all the enqueued data has been sent and acknowledged by the application server. In either direction, once the FIN has been received and forwarded, the further transfer of packets is done transparently and is not locally terminated.

This is shown in more detail in FIG. 15. The application client provides a FIN to the Hyper-TCP server. If any data has not been received by the Hyper-TCP server, the Hyper-TCP server will recover the data from the application client and provide it to the Hyper-TCP client. The Hyper-TCP server then forwards the FIN to the Hyper-TCP client, which flushes any remaining data in the Hyper-TCP client and then forwards the FIN to the application server. The application server replies with an ACK for the flushed data and then a FIN. The Hyper-TCP client then receives any outstanding data from the application server and recovers data to the application server. The ACK and the data are forwarded to the Hyper-TCP server. After the data is transferred, the Hyper-TCP client forwards the FIN to the Hyper-TCP server. The Hyper-TCP server forwards the ACK when received and flushes any remaining data to the application client. After those are complete, the Hyper-TCP server forwards the FIN and the session is closed.

Figure 17:
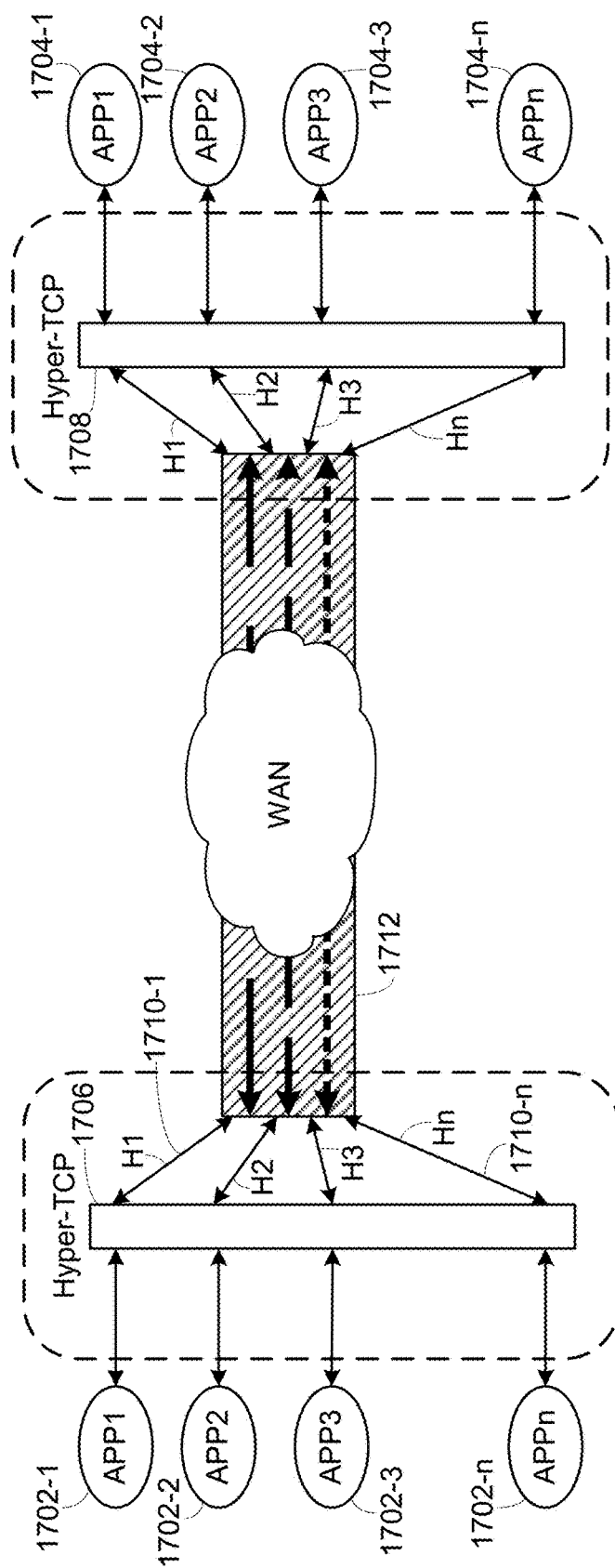
FIG. 17 is a block diagram illustrating the operation of Hyper-TCP according to the present invention.

FIG. 17 illustrates the effective operation of the Hyper-TCP server and client over the CVI 1712. A series of applications 1702-1 to 1702-*n* are communicating with applications 1704-1 to 1704-*n*, respectively. The Hyper-TCP server agent 1706 cooperates with the applications 1702 while the Hyper-TCP agent 1708 cooperates with the applications 1704. In the illustration, four different Hyper-TCP sessions are shown, H1, H2, H3 and Hn 1710-1 to 1710-*n*, which traverse the WAN using the CVI 1712.

Figure 18:
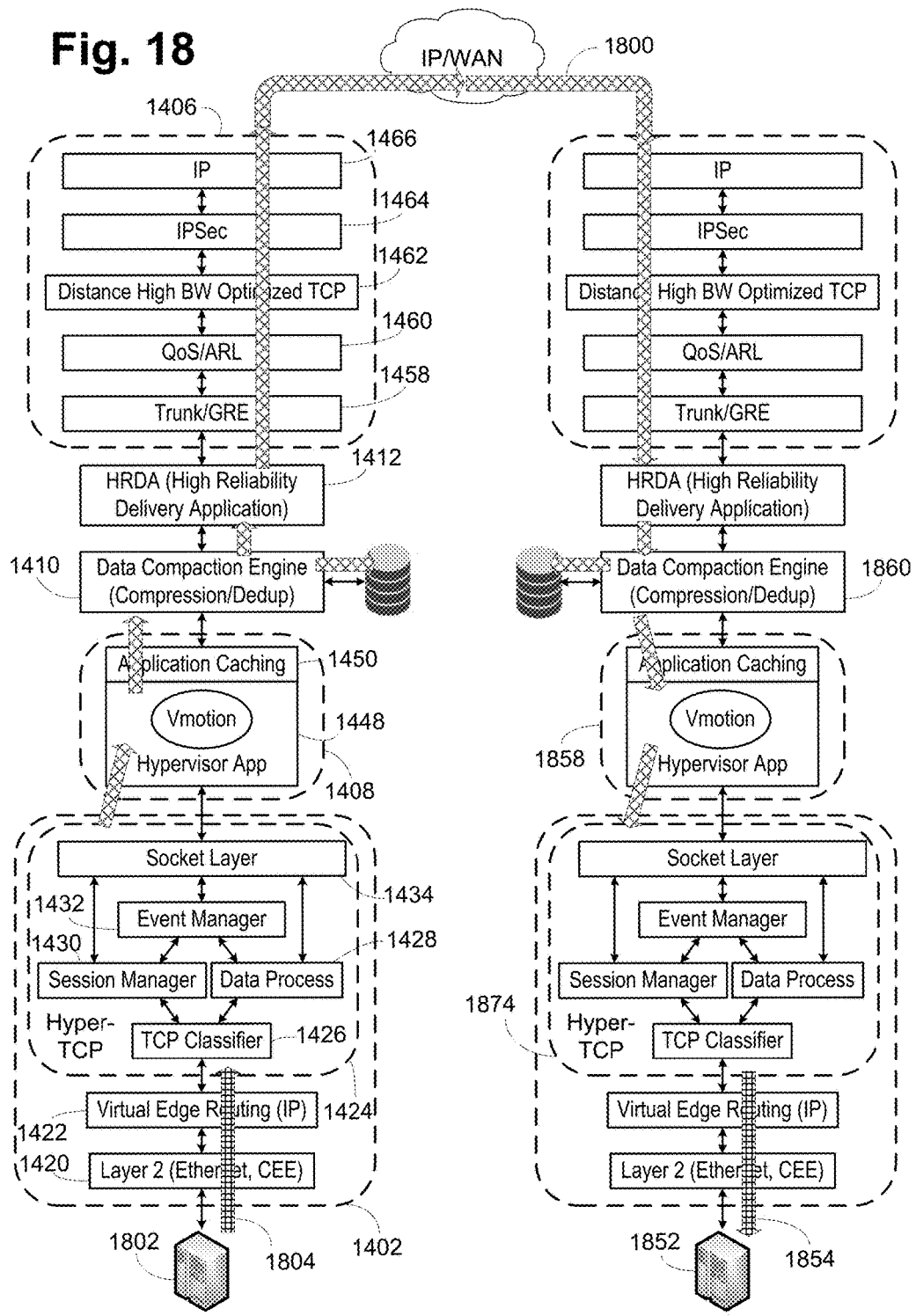
FIG. 18 is the block diagram of FIG. 13 with overlaid migration operations according to the present invention.

FIG. 18 illustrates how LDCM performs a vMotion migration event between two ESX® servers 1802, 1852. A HBTCP session 1800 is established between the Hyper-TCP server 1424 and client 1874. The filtering of the sessions that need acceleration are done based on the user configuration. Once a TCP session is established between the two ESX servers 1802, 1852, the Hyper-TCP client/server locally terminates the TCP session 1804. The packets from the source ESX server 1802 are locally acknowledged by the Hyper-TCP proxy server 1424. The data is then handed to HBTCP operations. HBTCP sends compressed and encrypted data to the HBTCP running with the Hyper-TCP proxy client 1874. The data transferred is finally handed over to the Hyper-TCP session between the Hyper-TCP client 1874 and the destination ESX server 1852 in TCP session 1854. This mechanism enables parallel transfer of data between the two ESX servers 1802, 1852 and completely unaffected by the WAN latency.

The migration is further improved through application caching, wherein application caching modules such as 1450 cache the data being transferred from the ESX server 1802. The application data caching module 1450 caches the already acknowledged data at the destination node (Hyper-TCP client 1874). The destination node updates the caching and storage status to the source node (Hyper-TCP server 1424), which is used to control the sessions that are being accelerated. A session manager uses the application credentials provided by the administrator to terminate the application's TCP sessions by using the Hyper-TCP modules 1424, 1874. If caching storage is over utilized, the session manager filters the low priority application flows from the acceleration/optimization by using a cache storage consumption control signal with the destination node. In general the session manager allocates maximum consumable memory storage based on the bandwidth policy and the WAN latency. The destination device consumption rate is determined by monitoring the egress data flow. This device consumption rate is passed to the application source which is used to control the ingress data from the source device.

The TCP session between the ESX servers 1802, 1852 is locally terminated by the Hyper-TCP modules 1424, 1874. The vMotion application in the application module 1408 dequeues the socket data and sends the data to the data compaction engine 1410. The data block, if not previously seen, is cached and then compressed. An existing HBTCP session through the path picked up by the HRDA layer 1412 is used to send the compressed data to the destination server 1852. On the destination side, the application module 1858 is signaled and the data received is sent to the data compaction engine 1860 to be decompressed. The data is then sent to the application caching module to be cached. The vMotion application in the application module 1858 picks up the uncompressed data and enqueues the data in the socket buffer of the Hyper-TCP session. The data is then dequeued and is finally sent to the destination ESX server 1852. If the data block had a hit at the application caching module in the source LCDM, instead of sending the whole data block, only a signal is sent. This signal is decoded at the destination LCDM and the data is fetched from the cache locally and is sent to the destination ESX server 1852.

This caching, in conjunction with the local TCP termination makes it appear to the ESX server 1802 that the vMotion operation is happening well within the limitations. Likewise, the caching and local TCP termination at the ESX server 1854 end makes it appear to the ESX server 1854 that the vMotion operation is occurring within the limitations as well. The CVI/HBTCP recovers any packet drop in the WAN and provides seamless and parallel transfer of the data. In essence, the Hyper-TCP working in conjunction with the High Bandwidth TCP effectively mask the network latencies experienced by the ESX servers 1802, 1852 during the migration, resulting in high migration performance.

Figure 19A:
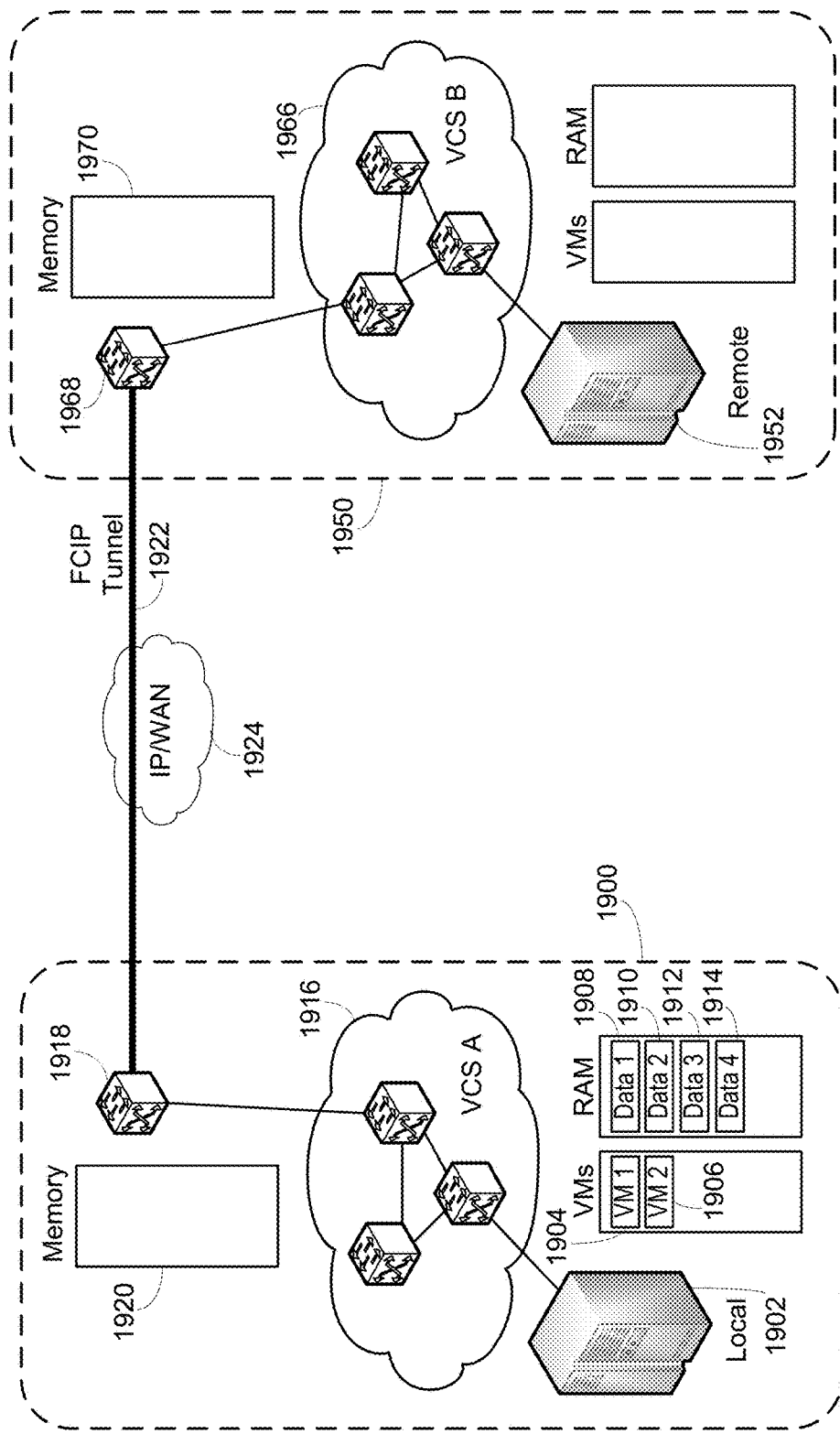
FIGS. 19A-19AK are block diagrams illustrating a vMotion operation according to the present invention.

FIGS. 19A-19AK illustrate how a migration happens between two ESX servers. Referring to FIG. 19A, two data centers 1900 and 1950 as shown. The local data center 1900 includes a local ESX server 1902, which has two VMs 1904, 1906 and data 1908-1914. The local ESX server 1902 is connected to a VCS fabric 1916. A CNE/LDCM device 1918 is connected to the VCS fabric 1916 and to the IP WAN 1924. An FCIP tunnel 1922, a CVI, is created with CNE/LDCM device 1968 in remote data center 1950. The CNE/LDCM device 1968 includes cache memory 1970 and is connected to a VCS fabric 1966. The VCS fabric 1966 also has a connection to a remote ESX server 1952. The remote ESX server 1952 is shown as not having any VMs or data.

Figure 19B:
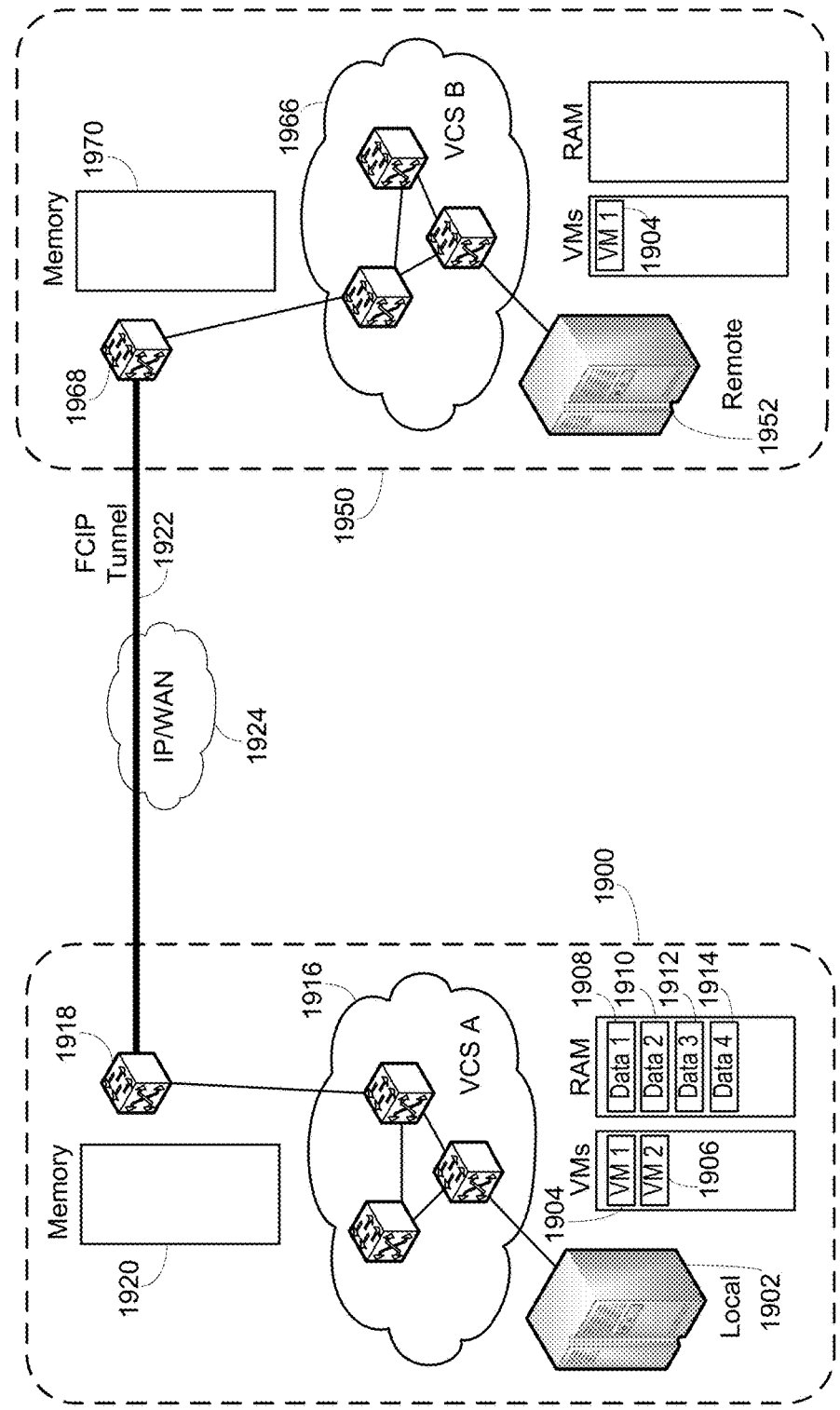

Prior to actually starting the migration, a few pre-flight operations must occur. First, a network connection between the local and remote ESX servers 1902, 1952 is established. Then, a check of the various resources (CPU, RAM and storage) of the servers 1902, 1952 is done to assure that the migration can actually be accomplished. The first phase of the actual VM transfer is to move the VM state (inactive pages) in order to reduce the active VM as much as possible, leaving behind a small working set of the VM. Next is to copy the VM configuration and device information to the destination and create the worker process. This is illustrated in FIG. 19B as the VM1 1904 in both ESX servers 1902, 1952.

Figure 19C:
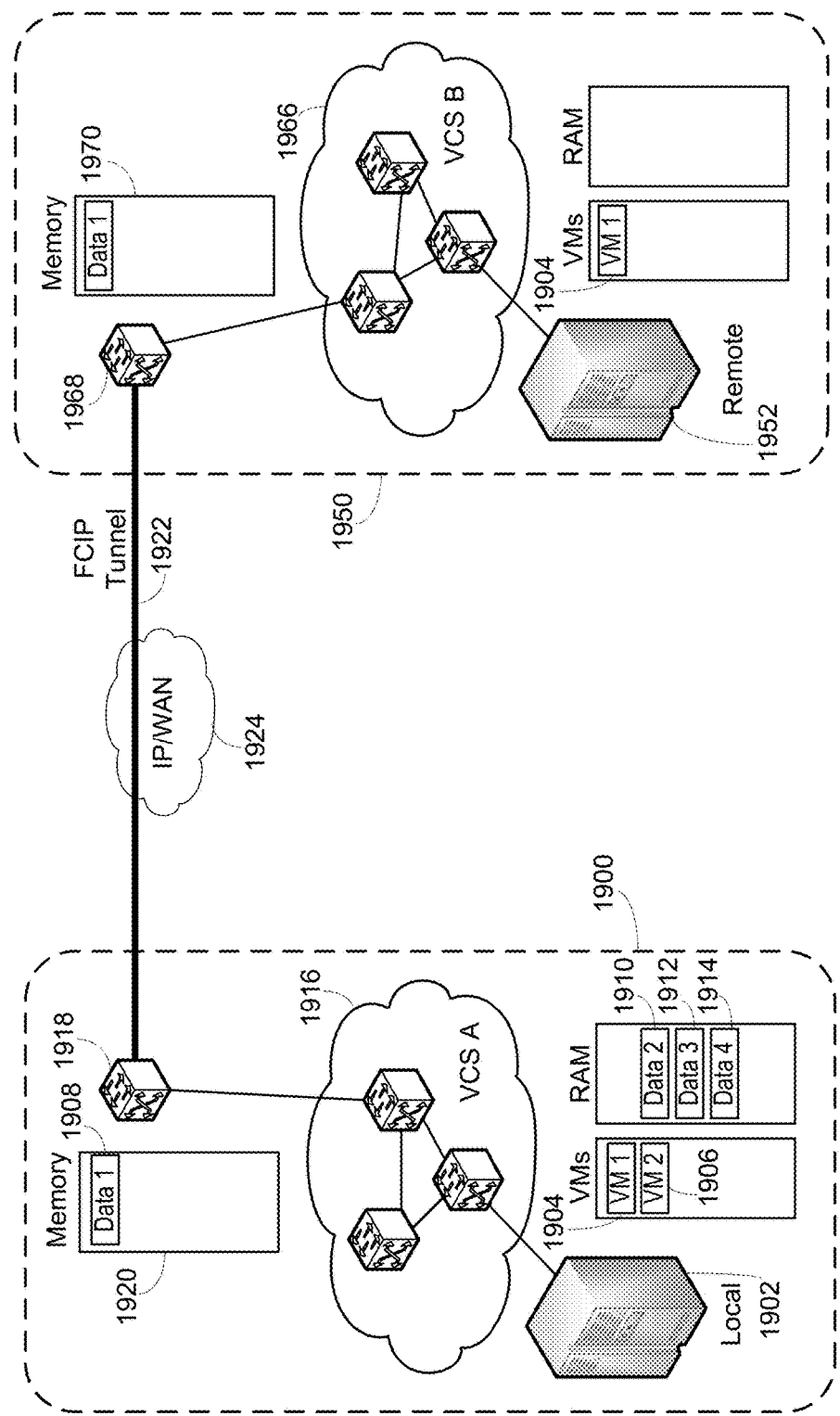
Figure 19D:
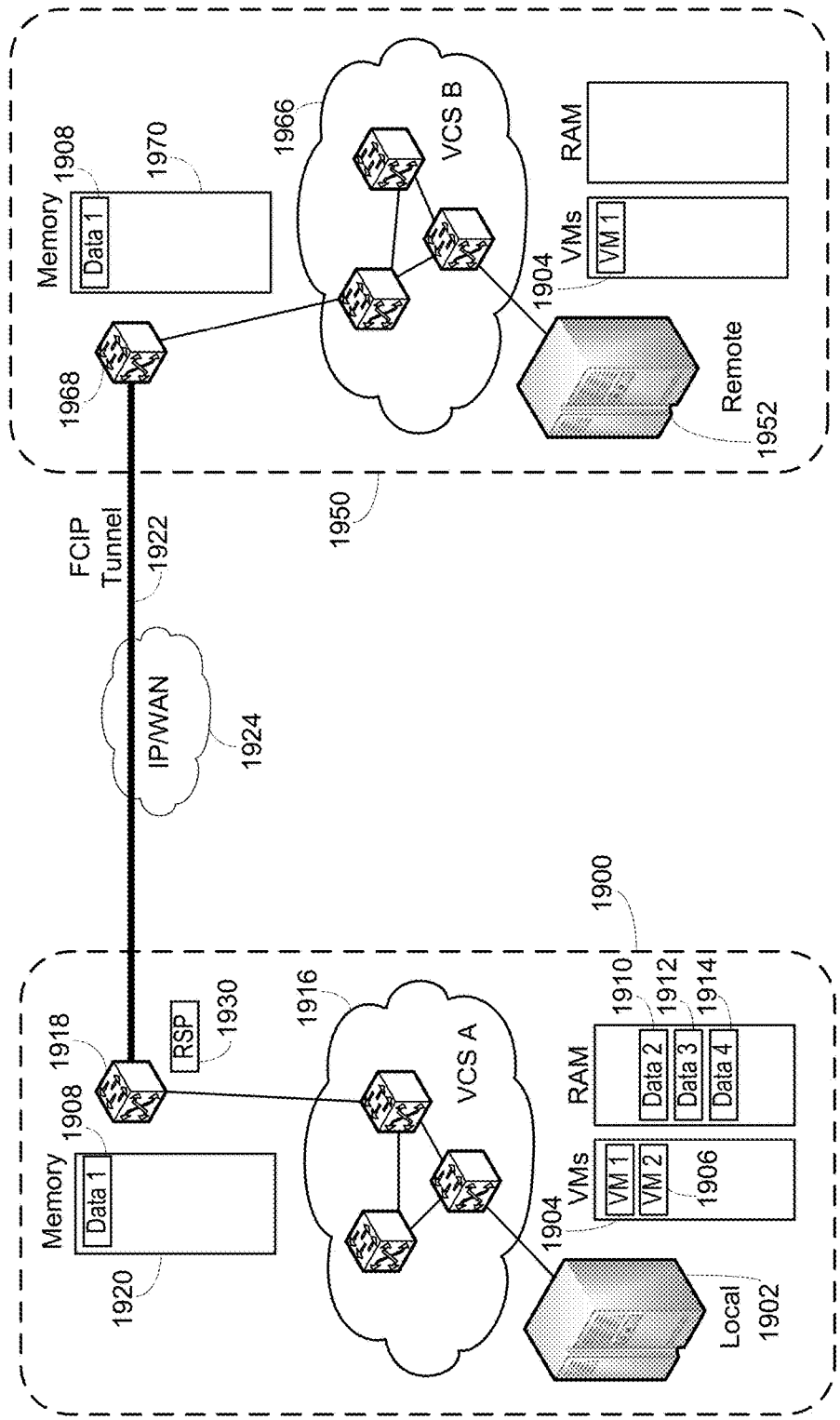
Figure 19E:
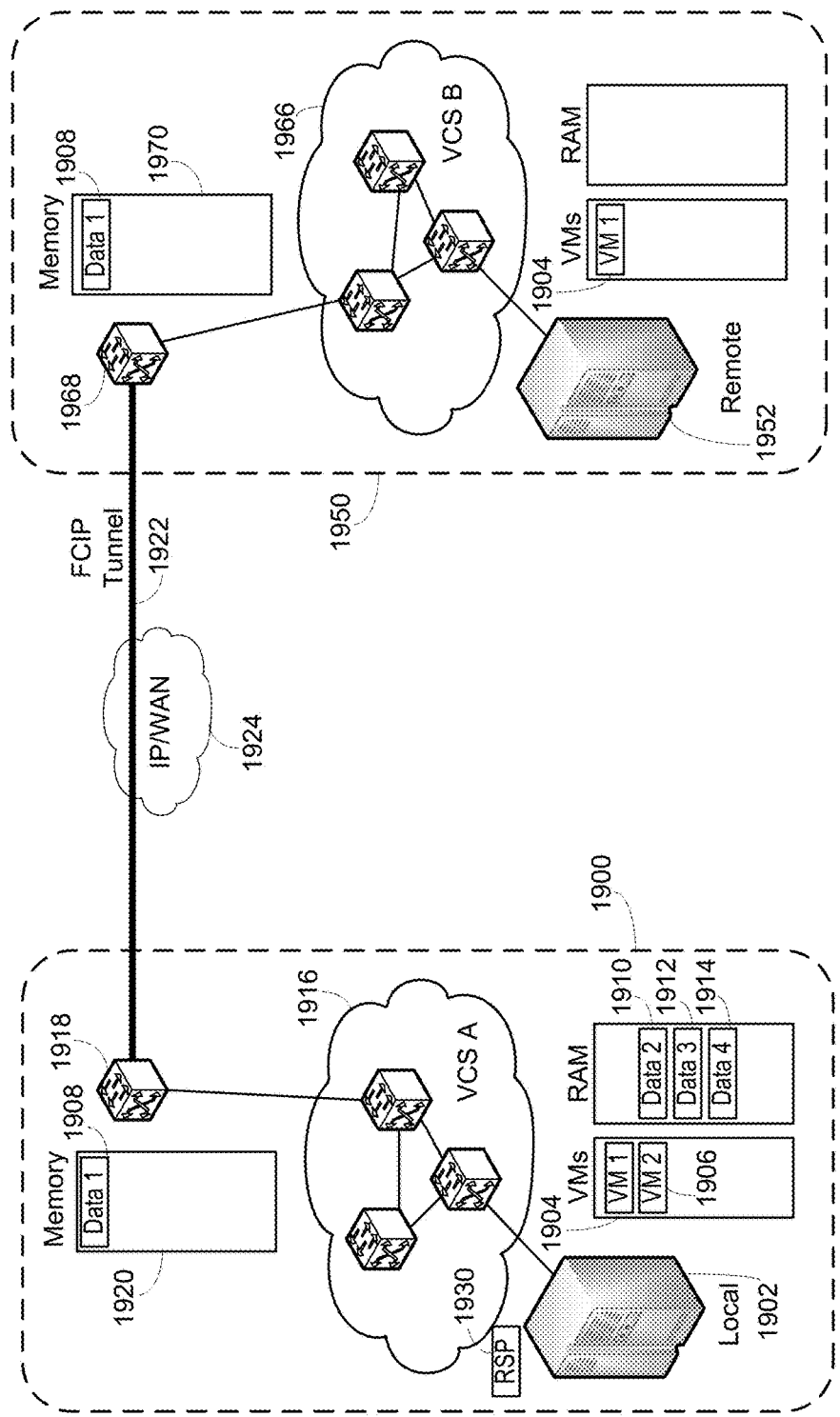
Figure 19F:
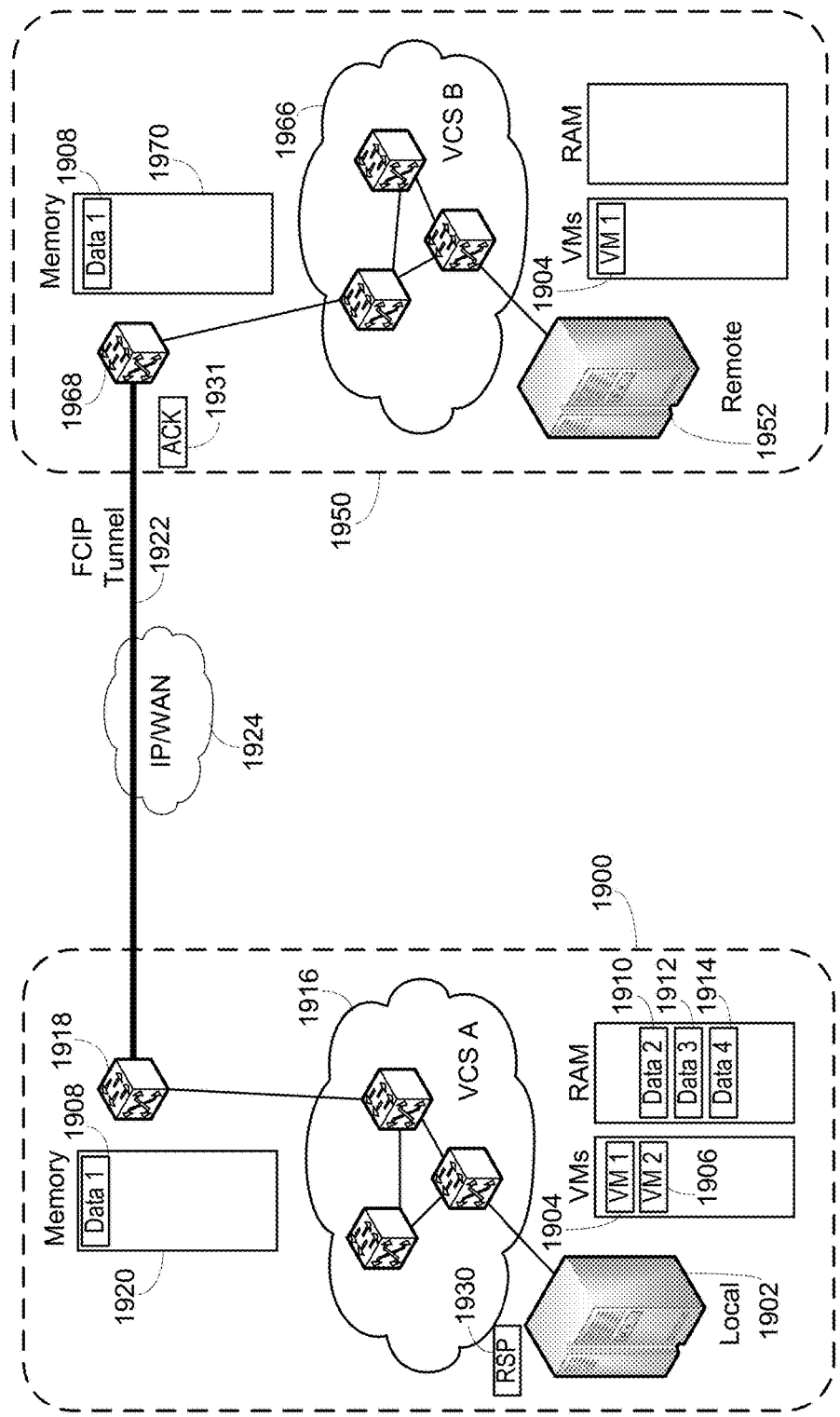
Figure 19G:
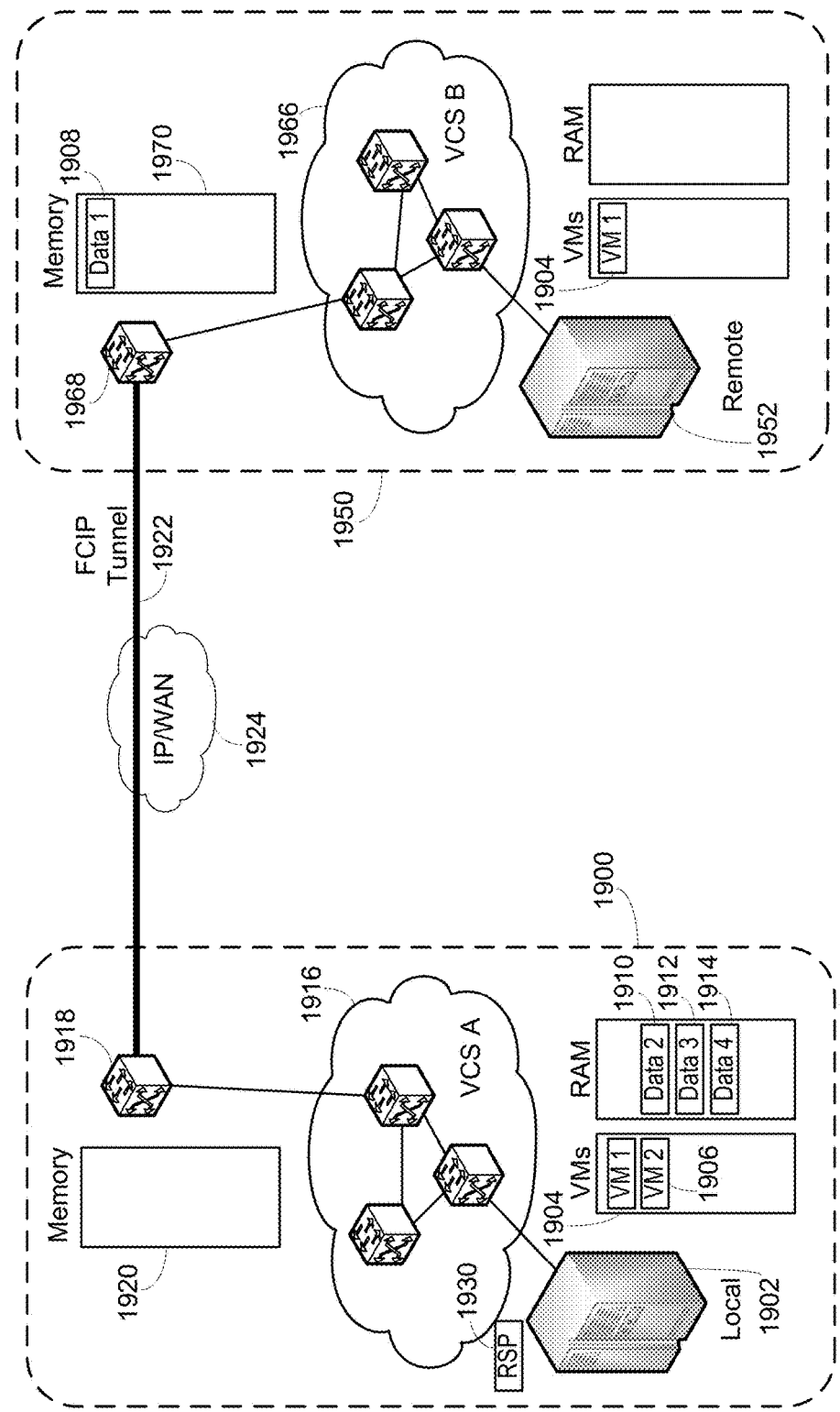

Next the actual transfer of the VM memory to the destination while the VM is still running occurs. Any memory writes are intercepted and used to track actions that occur during migration. The relevant pages will be re-transmitted later. The first step in the process is the transfer of data1 1908 to the CNE/LDCM device 1918 as shown in FIG. 19C. A copy of data1 1908 is transferred through the FCIP tunnel 1922 to the memory 1970 of the CNE/LDCM device 1968 as shown in FIG. 19D, where two copies are illustrated as the cache in the CNE/LDCM device 1918 is not yet cleared. At the same time the CNE/LDCM device 1918 sends an RSP packet 1930 to the local ESX server 1902 as part of the local TCP termination process. The RSP packet is received by the ESX server 1902 as shown in FIG. 19E. In FIG. 19F, the CNE/LDCM device 1968 provides an ACK 1931 to the CNE/LDCM 1918 for data1 1908. In FIG. 19G the CNE/LDCM device 1918 removes data1 1908 from its memory 1920.

Figure 19H:
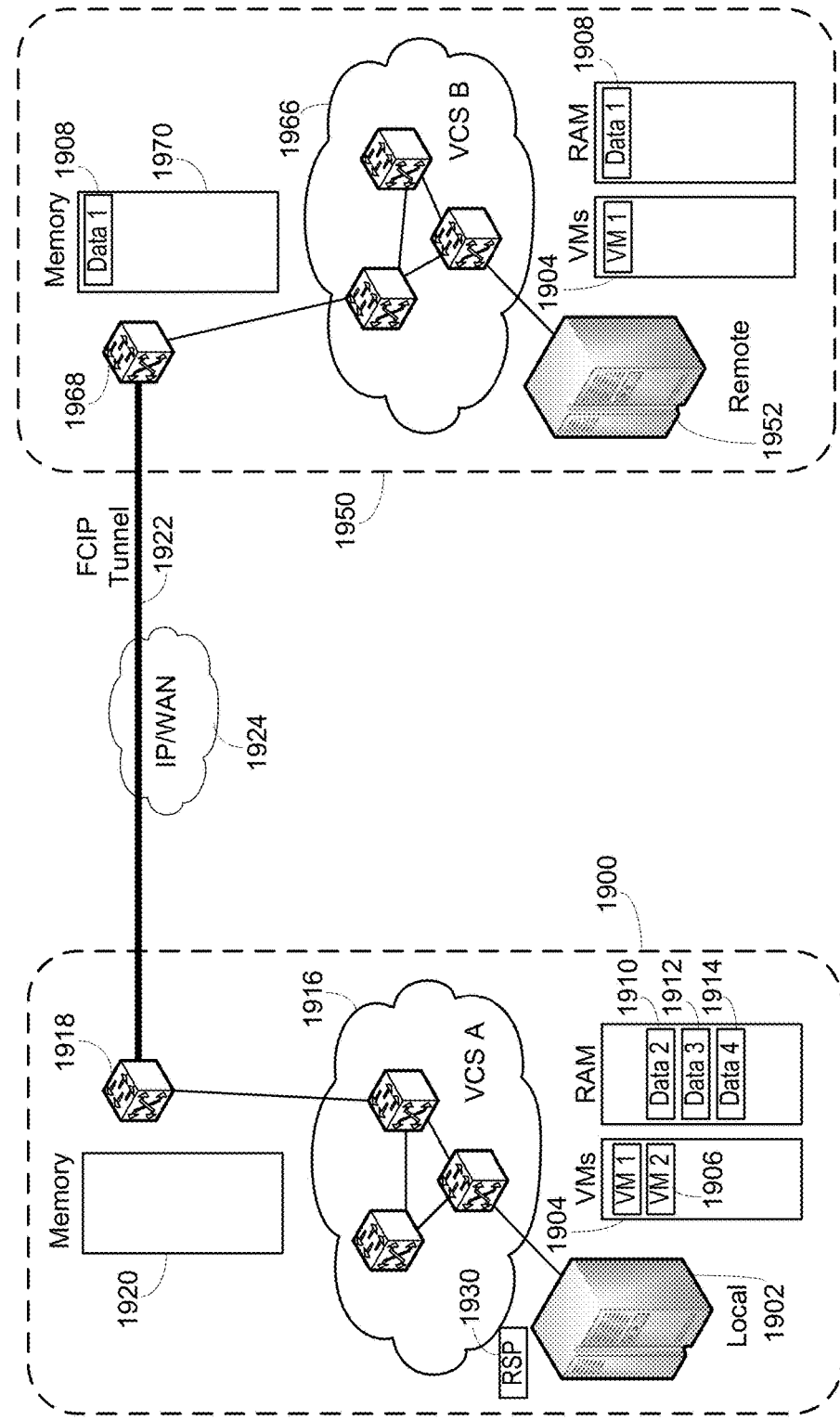
Figure 19I:
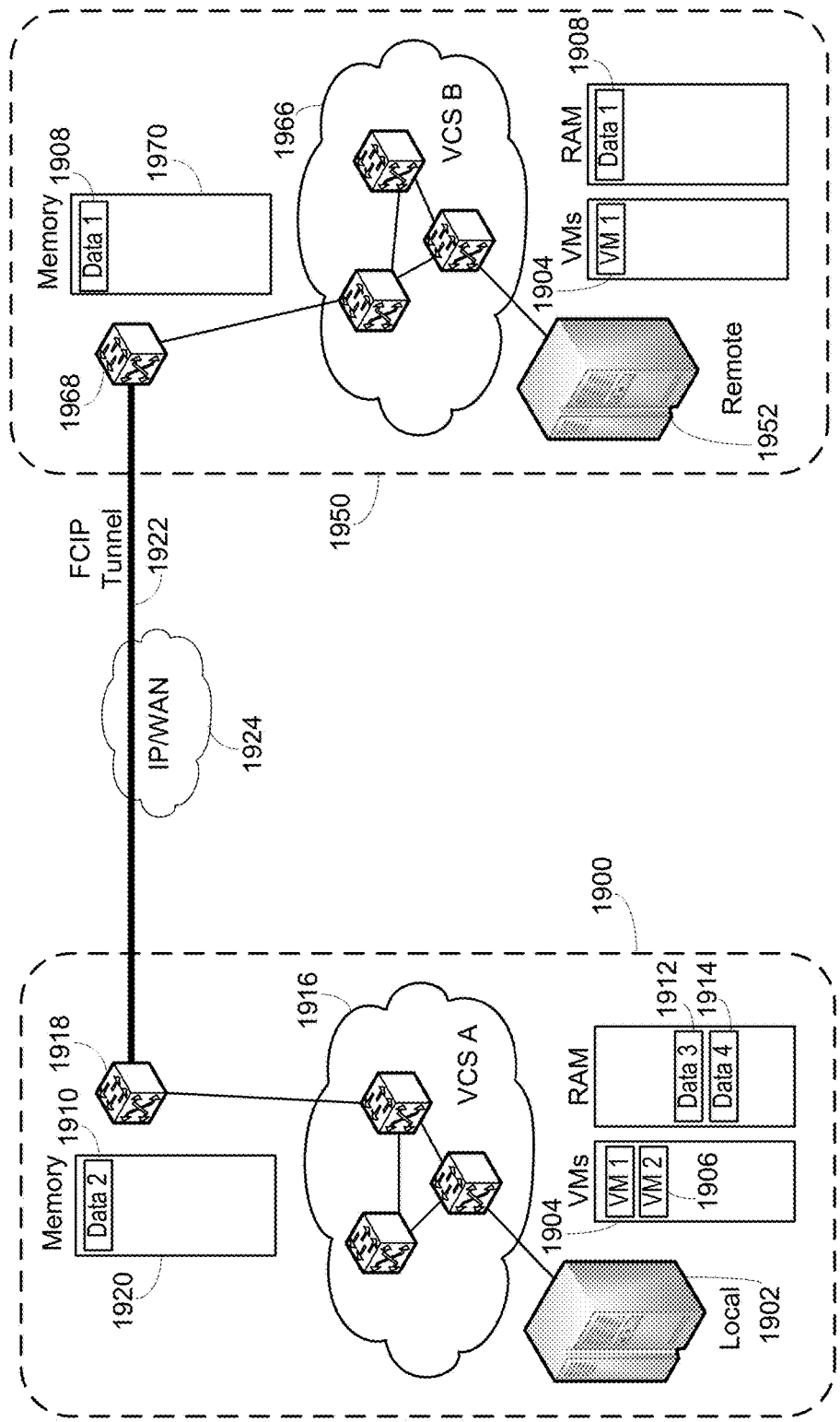
Figure 19J:
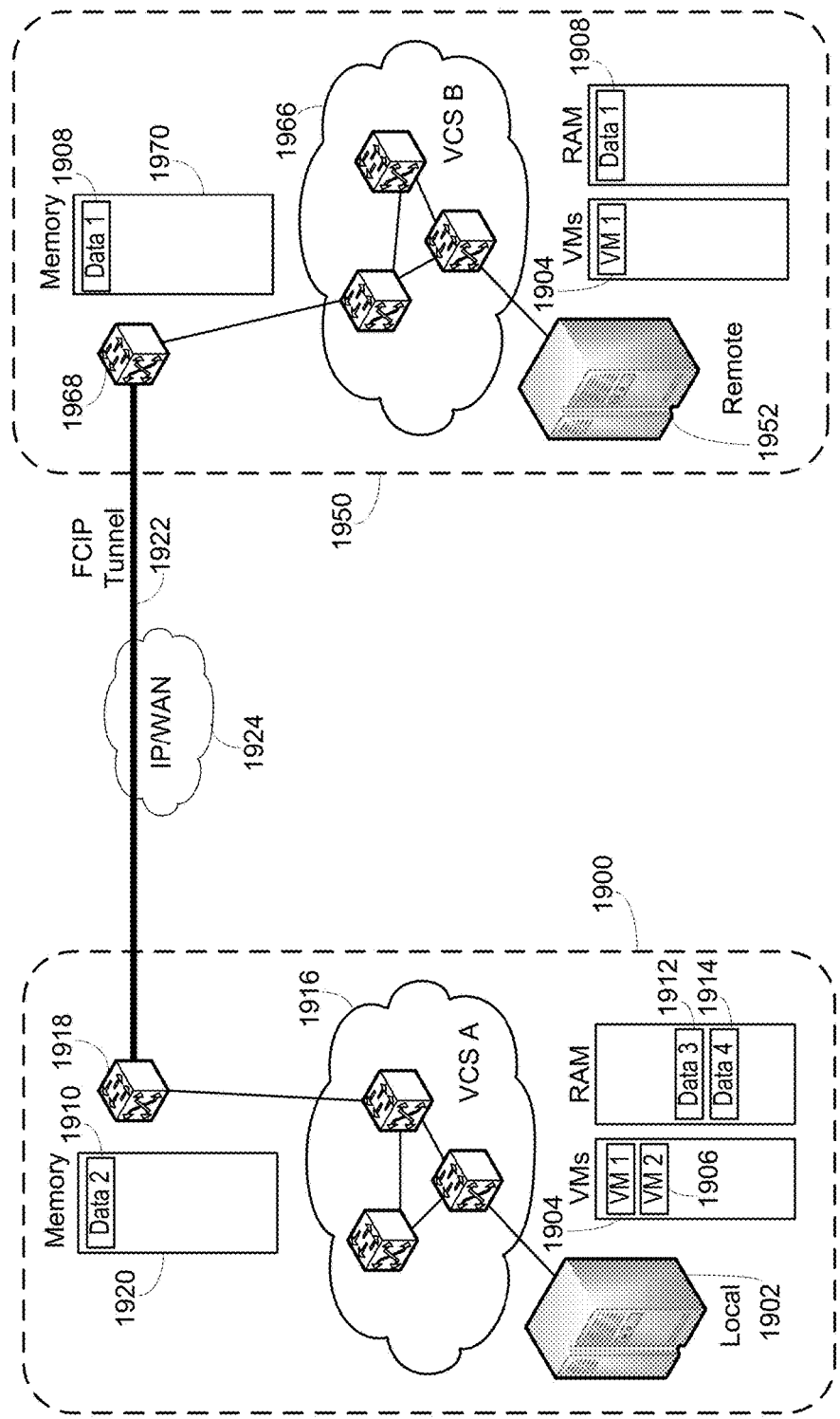
Figure 19K:
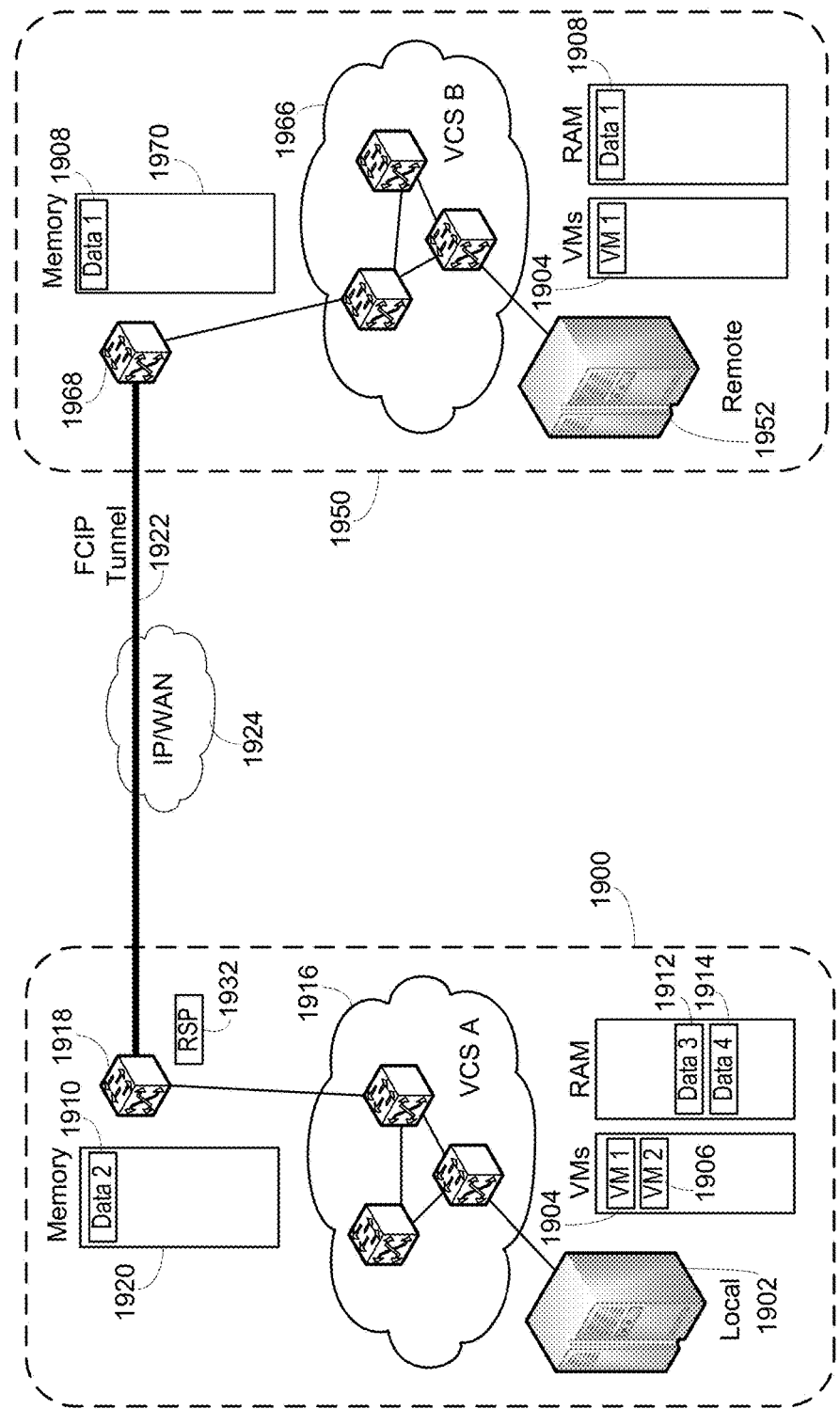
Figure 19L:
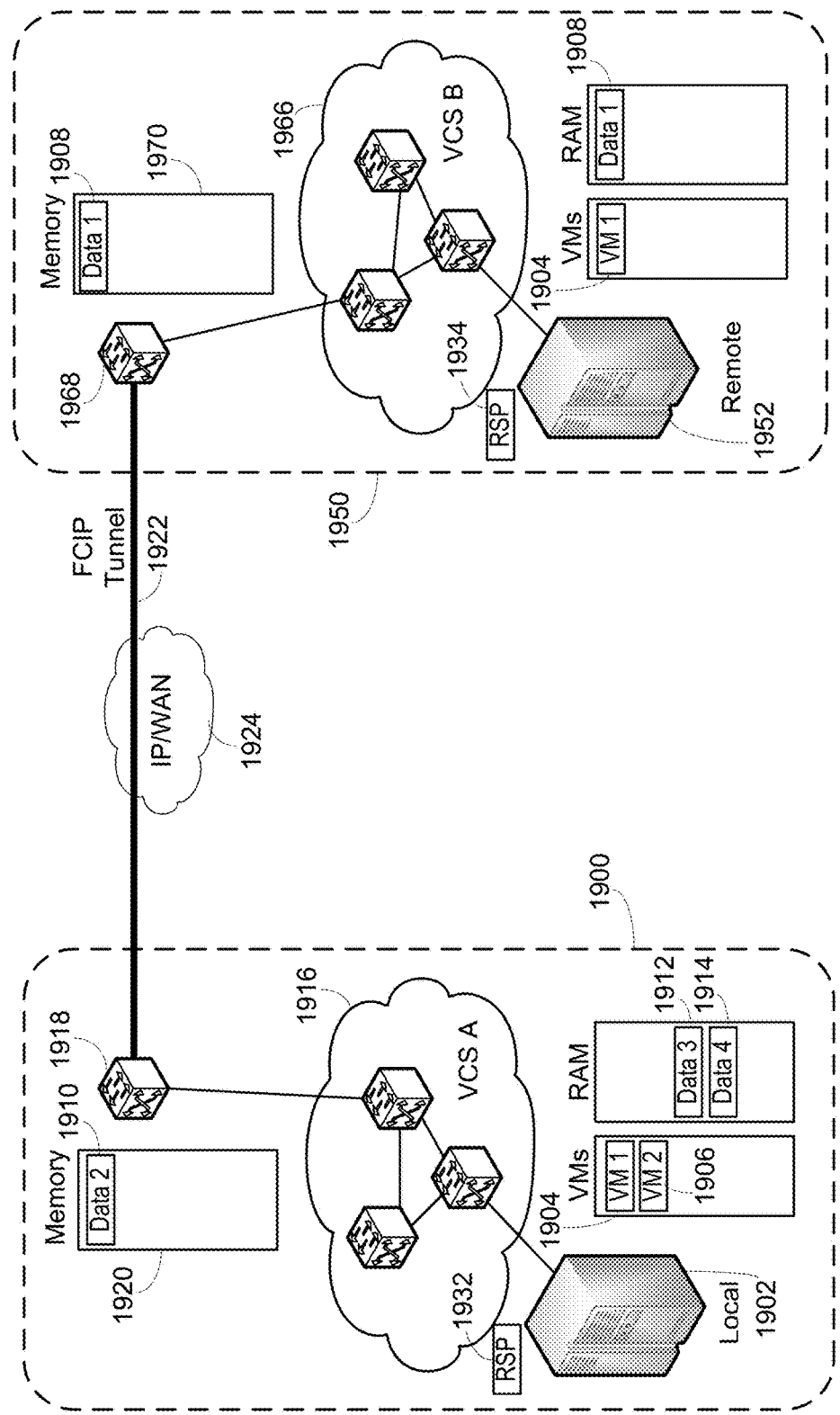
Figure 19M:
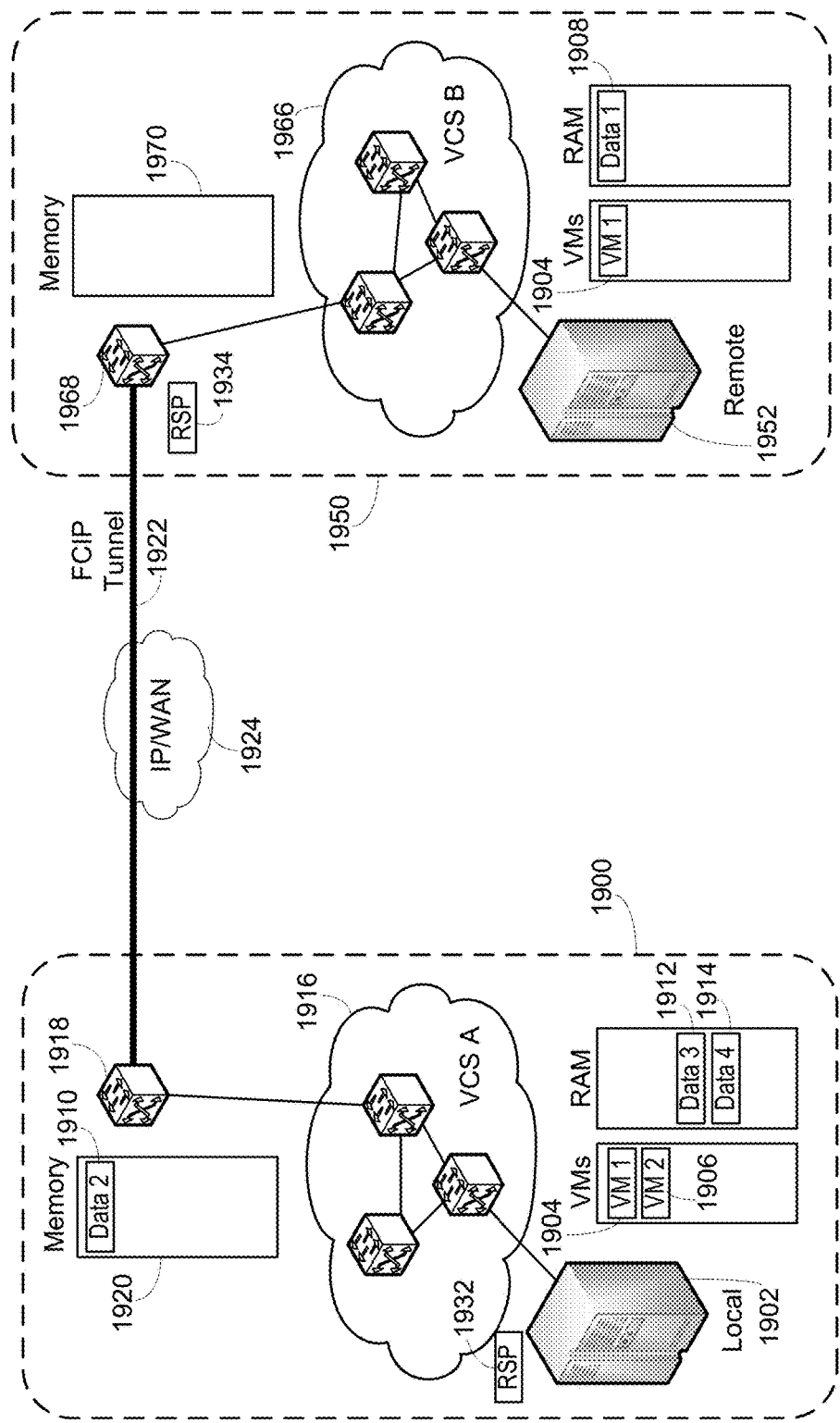
Figure 19N:
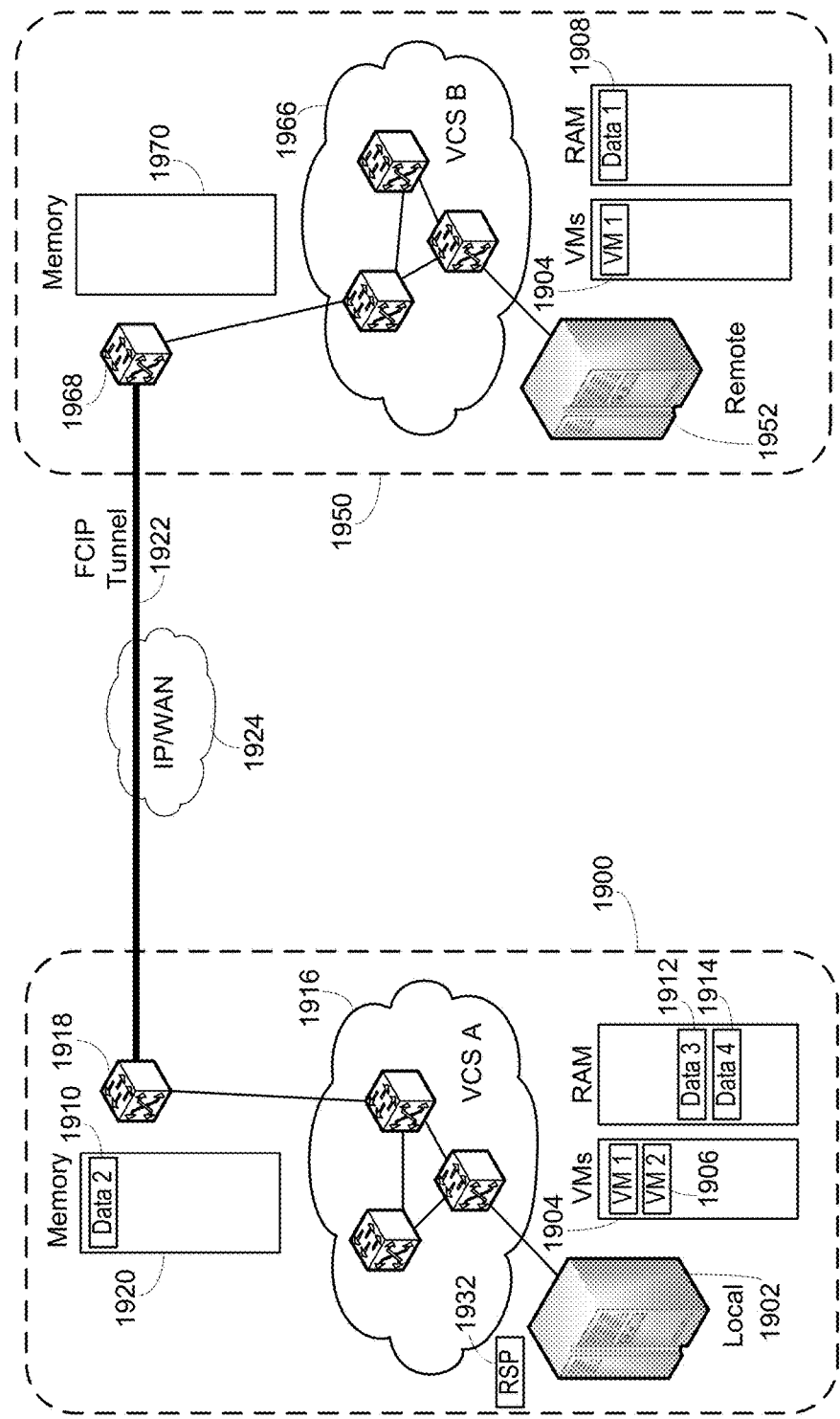
Figure 19O:
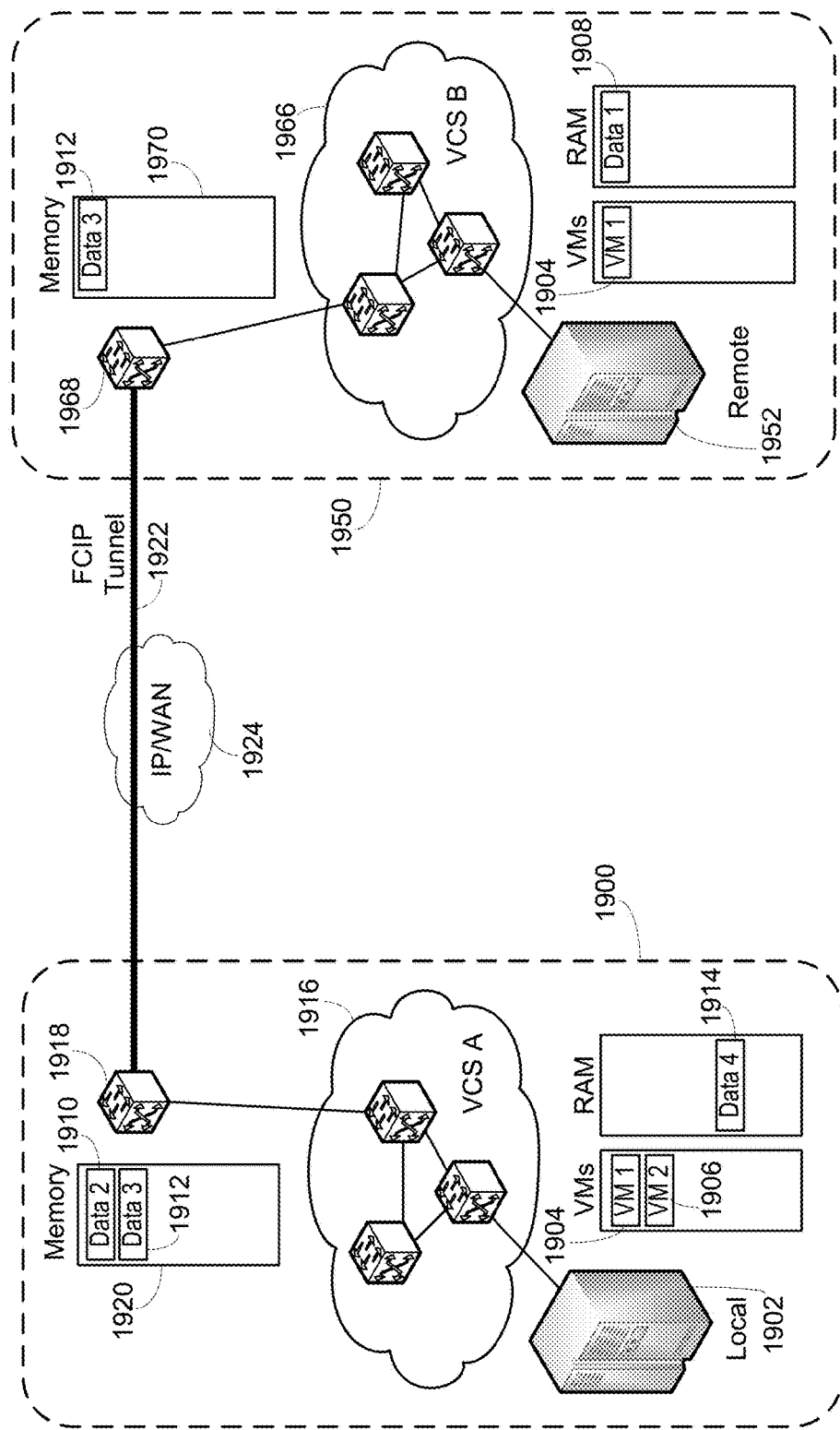
Figure 19P:
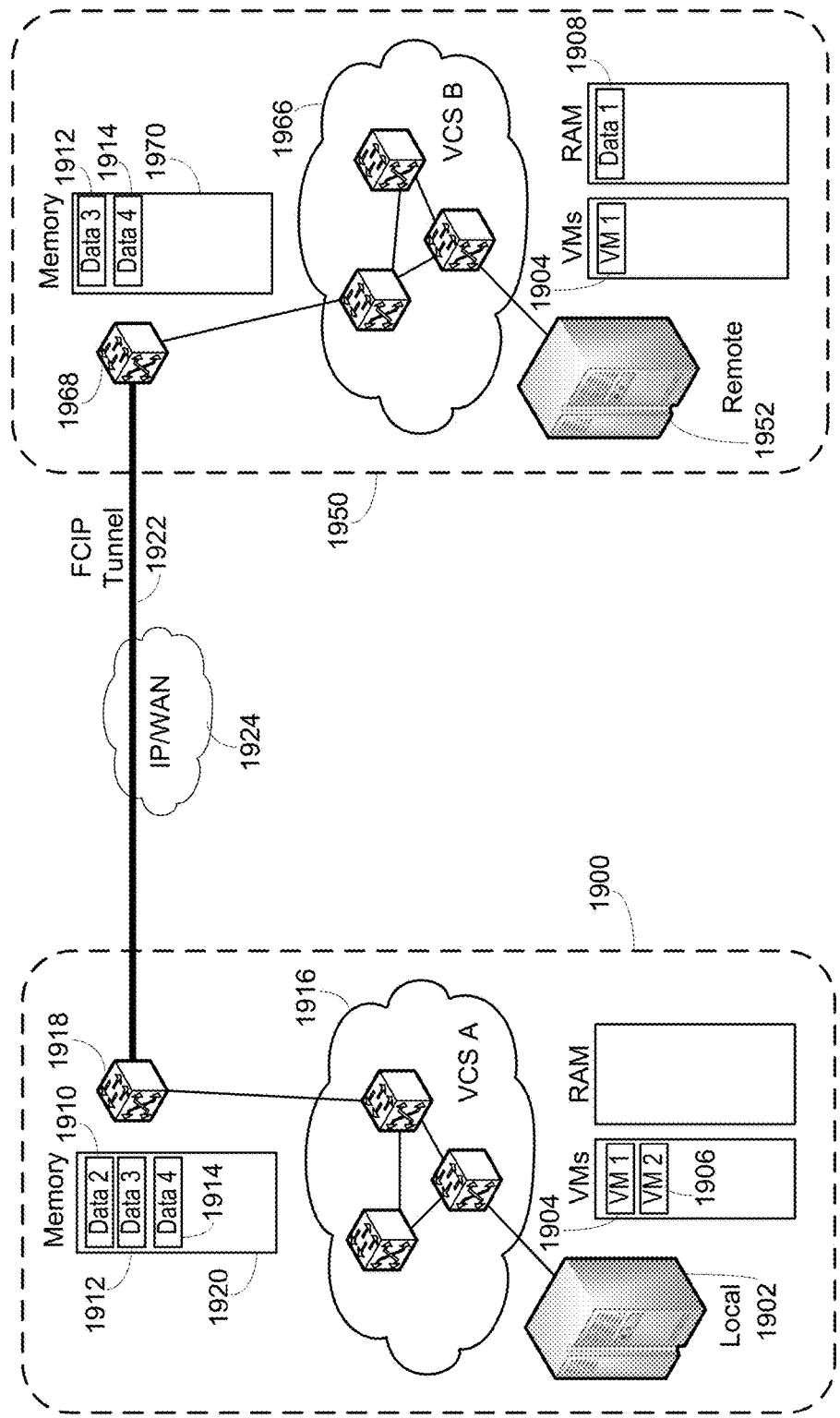
Figure 19Q:
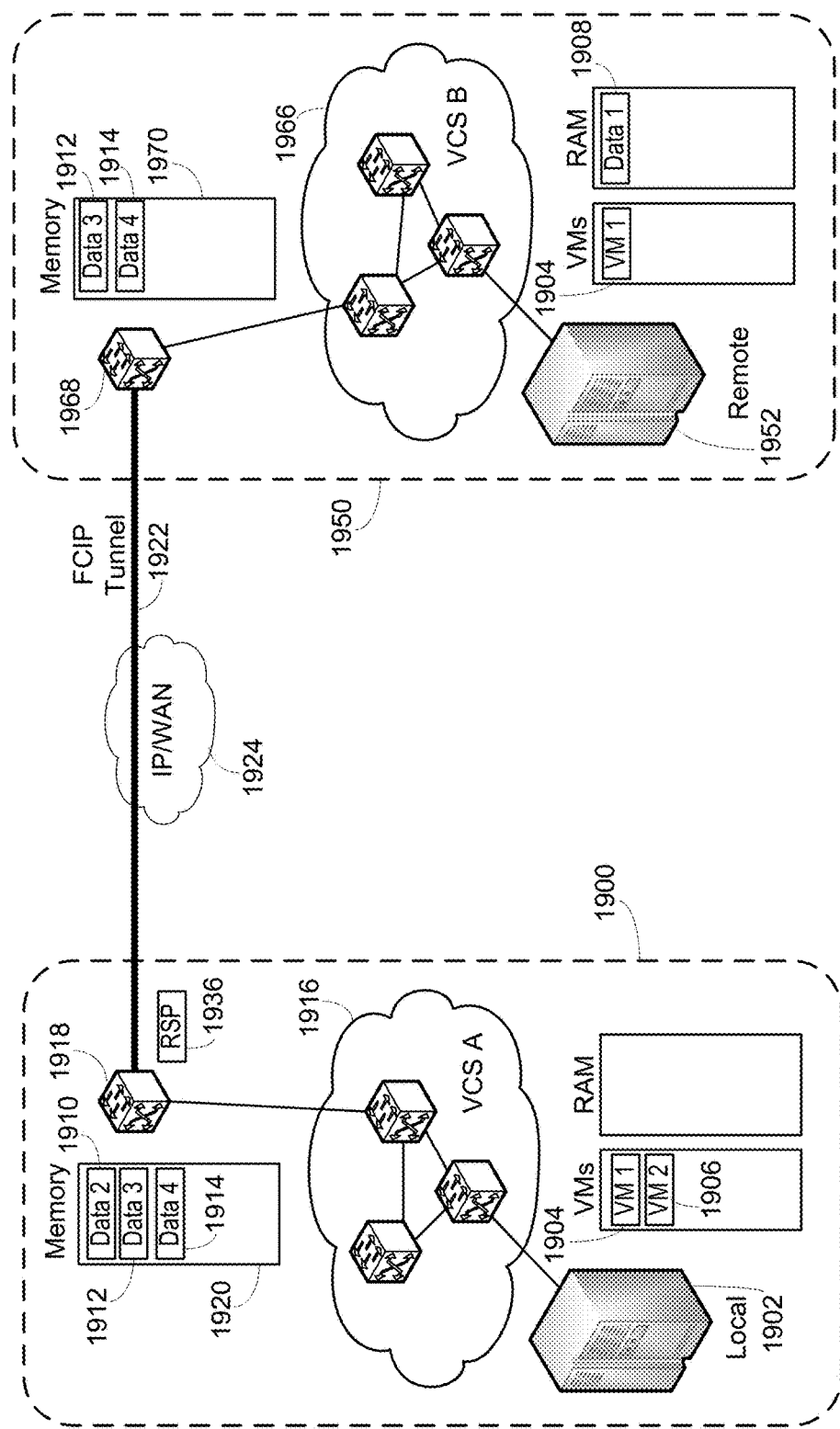
Figure 19R:
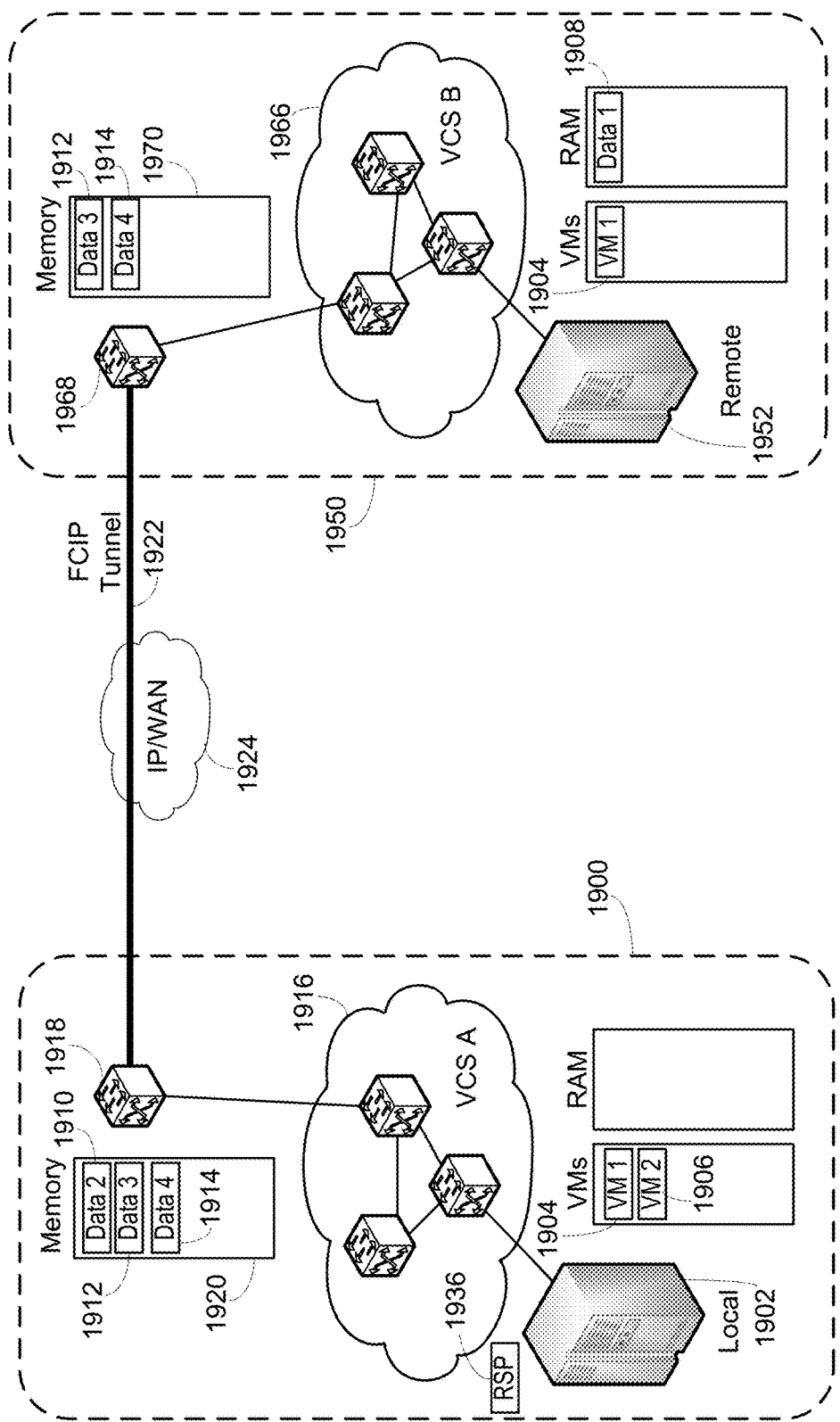

The data1 1908 is transferred to the remote ESX server 1952, as shown in FIG. 19H. With the RSP packet 1930 being received by the local ESX server 1902, then data2 1910 can be transferred to the memory 1920 of the CNE/LDCM device 1918, as shown in FIG. 19I. Data 2 1910 is then sent over the FCIP tunnel 1922 to the CNE/LDCM device 1968 but does not arrive, as shown in FIG. 19J. Even though data2 1910 has not been received by the CNE/LDCM device 1968, as shown in FIG. 19K, the CNE/LDCM device 1918 returns an RSP packet 1932 to the local ESX server 1902, which arrives at the local ESX server 1902, as shown in FIG. 19L. FIG. 19L also shows an RSP packet 1934 being provided from the remote ESX server 1952. The RSP packet 1934 reaches the CNE/LDCM device 1968 in FIG. 19M and data1 1908 is removed from cache memory 1970. The RSP packet 1932 is received by the local ESX server 1902 in FIG. 19N. In response, data3 1912 is transferred to the memory 1920 of the CNE/LDCM device 1918 and copied to the CNE/LDCM device 1968, as shown in FIG. 19O. Skipping the RSP packet for data 3 1912 from the CNE/LDCM device 1918, data4 1914 is provided to the CNE/LDCM 1918 and copied to the CNE/LDCM 1968, as shown in FIG. 19P. An RSP packet 1936 for data4 1914 is provided in FIG. 19Q and received in FIG. 19R.

Figure 19S:
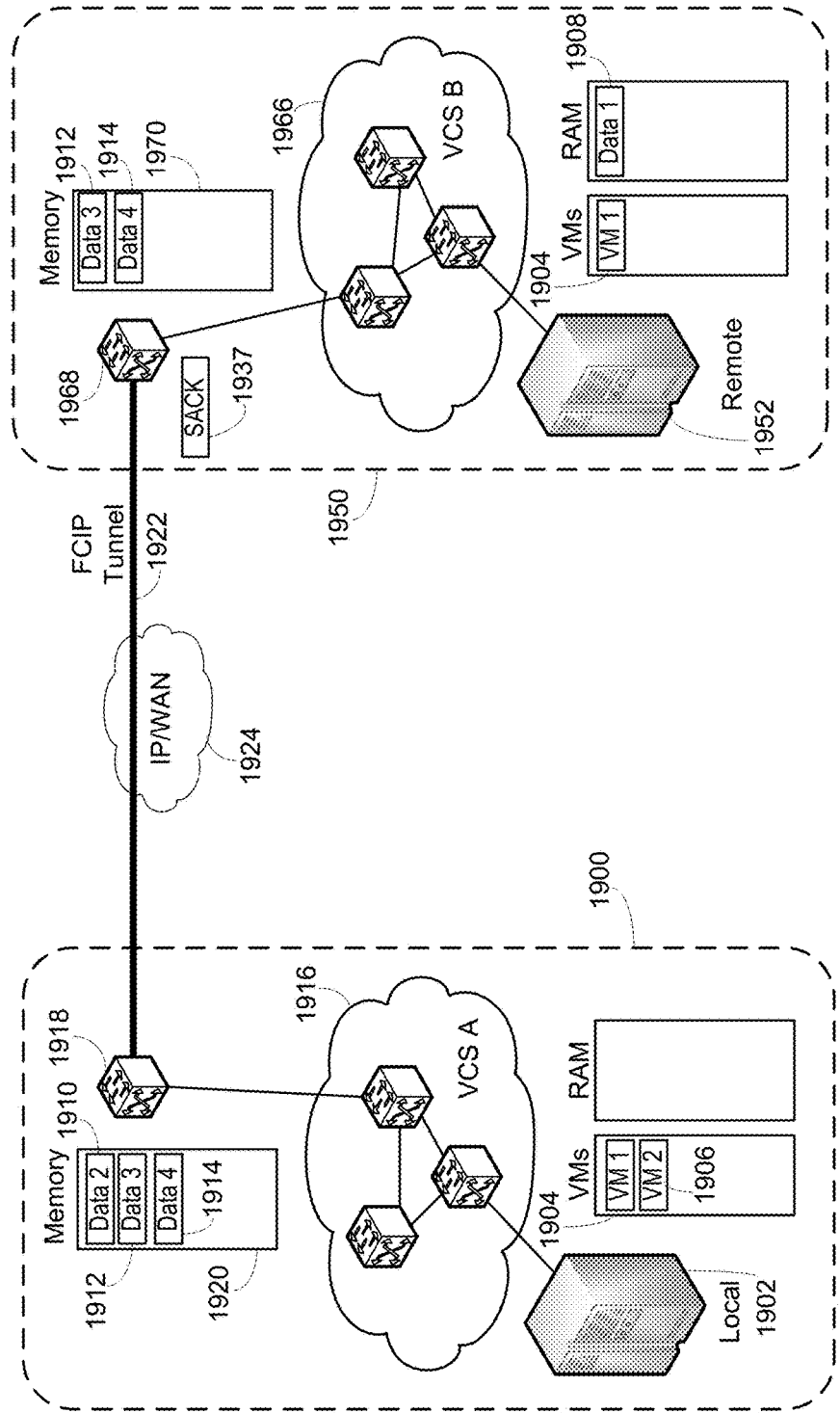
Figure 19T:
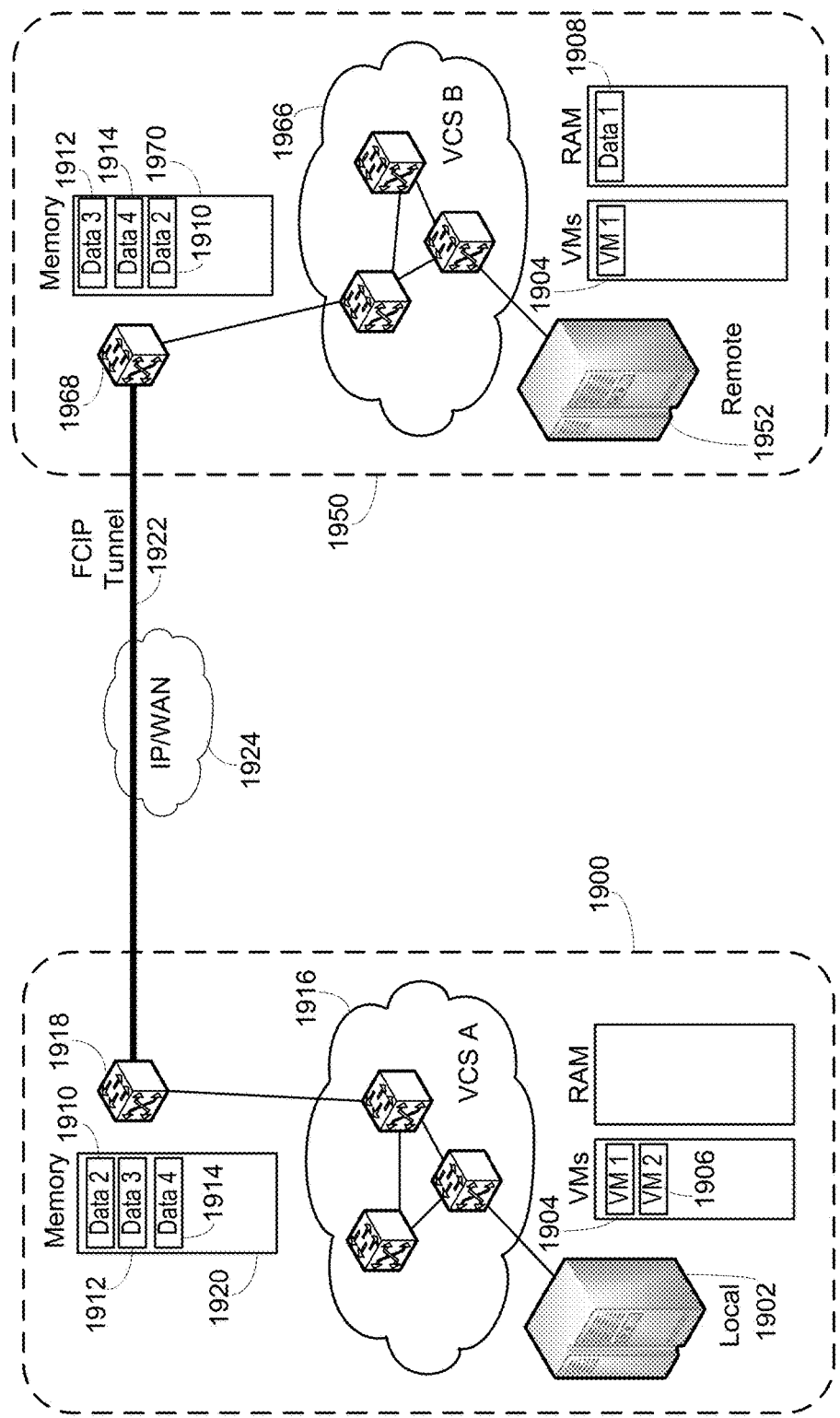
Figure 19U:
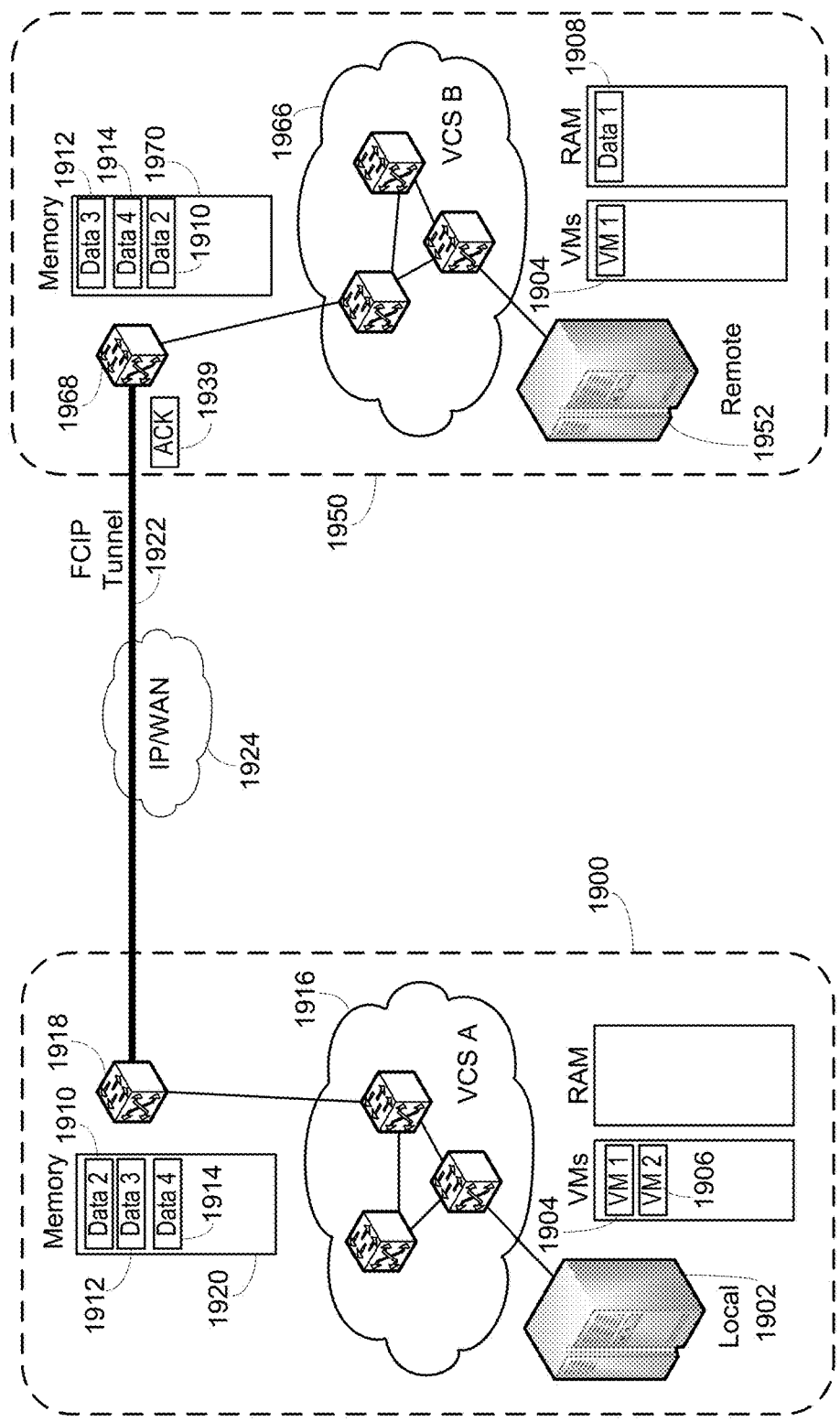
Figure 19V:
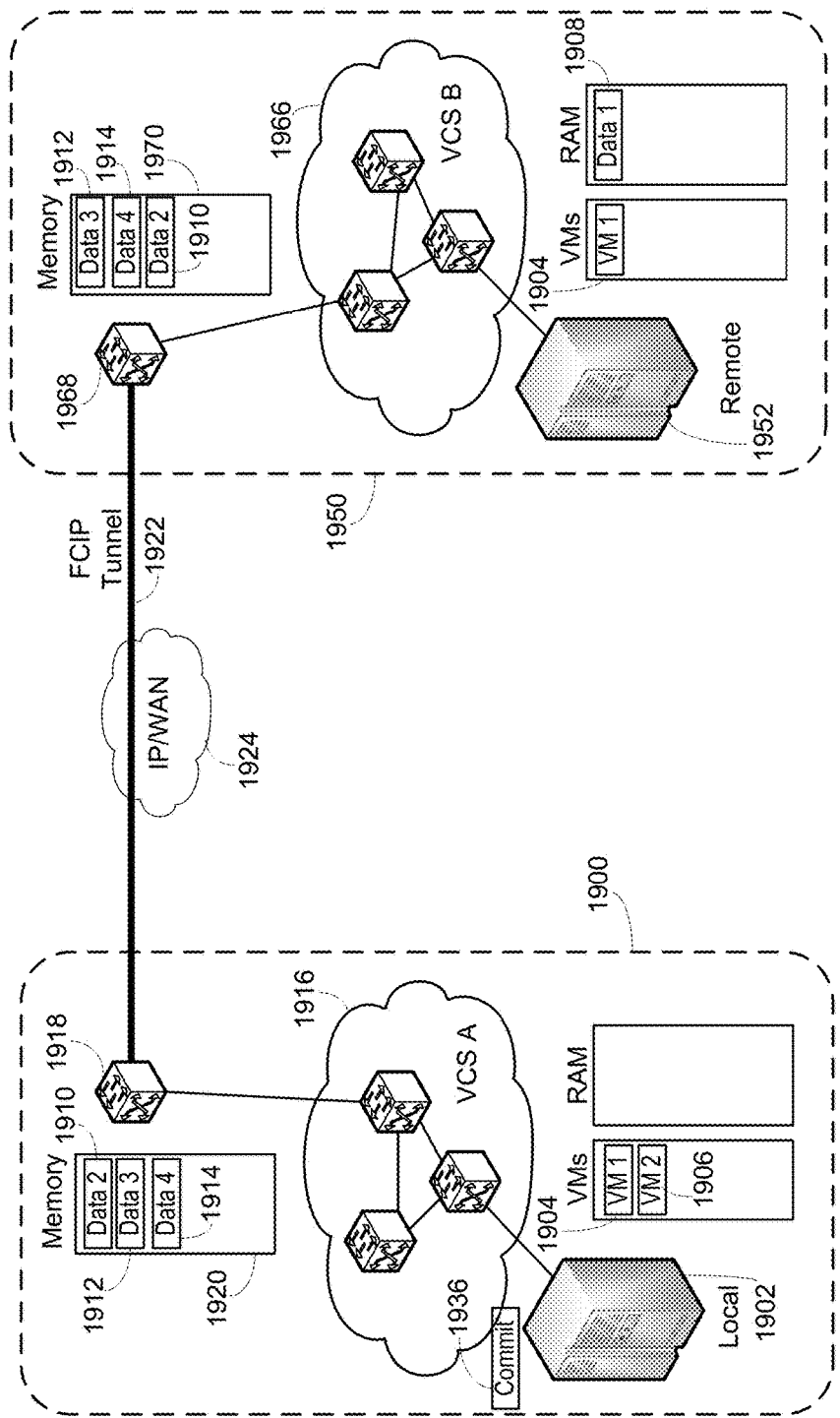
Figure 19W:
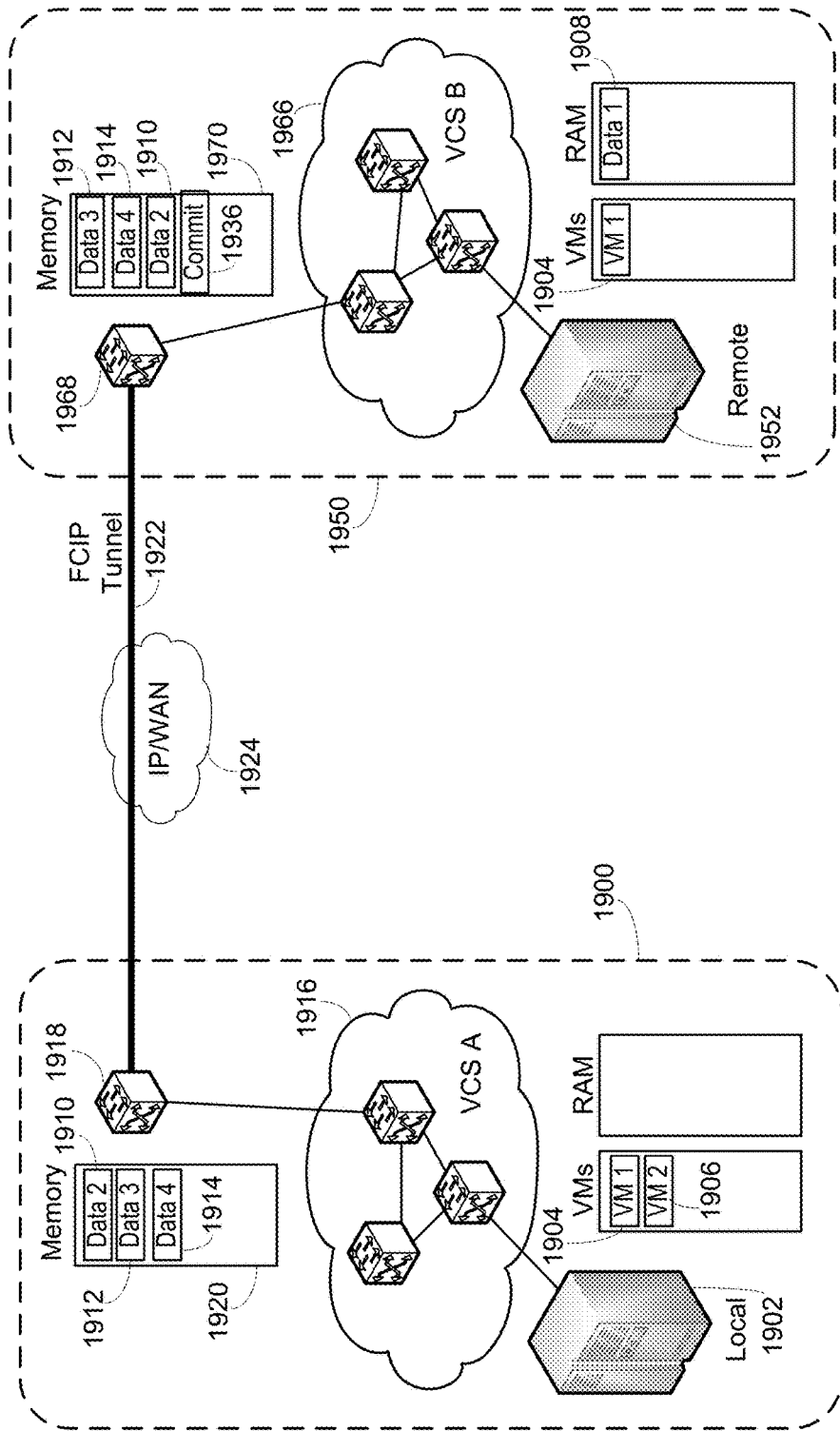
Figure 19X:
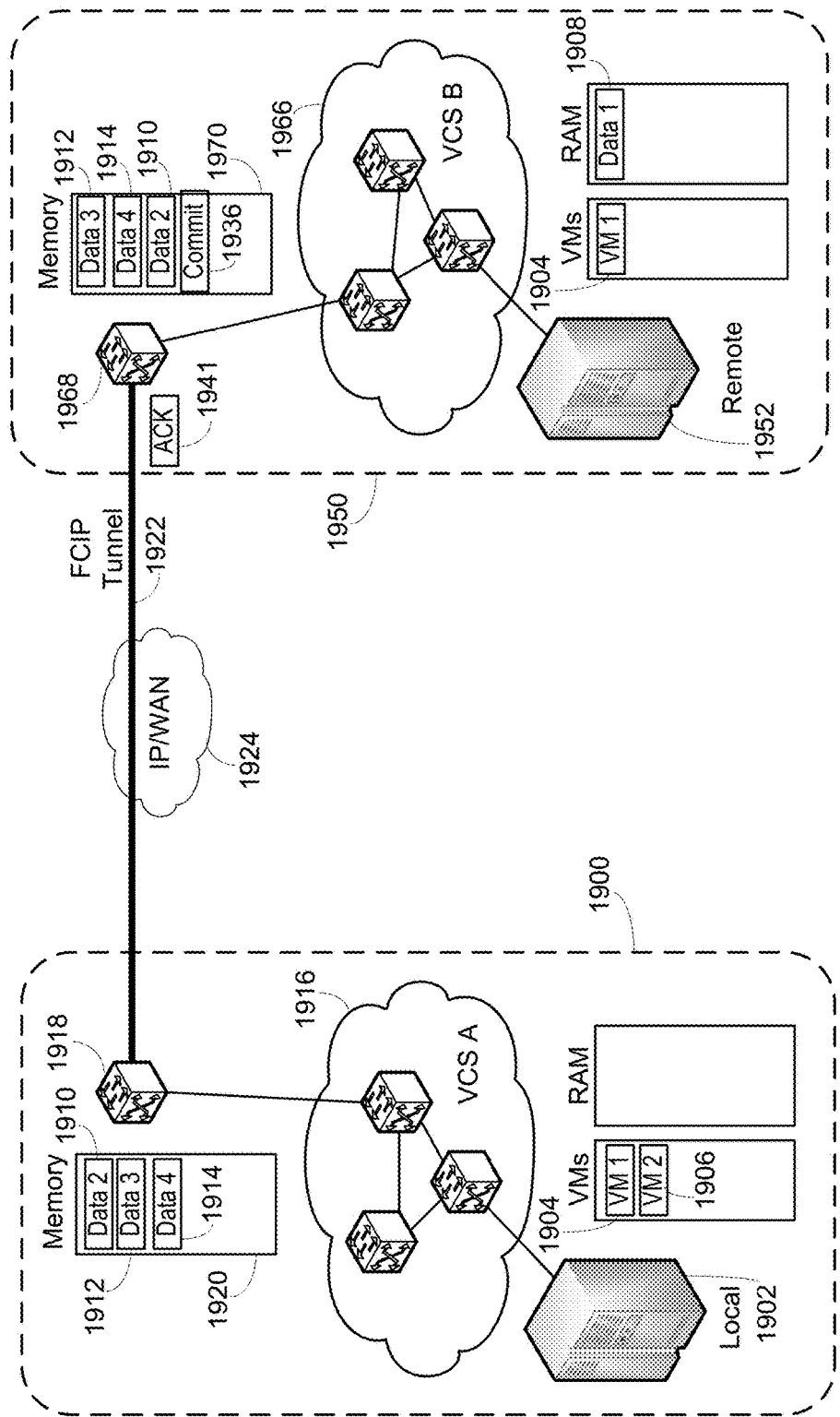

With the receipt of data3 1912 and data4 1914, the CNE/LDCM device 1968 determines that data2 1910 has been lost and requests another copy from the CNE/LDCM device 1918 by sending a SACK 1937 in FIG. 19S. Data2 is shown as being provided in FIG. 19T. The CNE/LDCM device 1968 provides an ACK 1939 in FIG. 19U and the CNE/LDCM device 1918 can then remove data2 1910, data3 1912 and data4 1914 from its cache memory 1920, though data3 1912 and data4 1920 could have been removed after the SAK 1937. Because the local ESX server 1902 believes that all of the data has been transferred, it provides a COMMIT packet 1936 as shown in FIG. 19V. The COMMIT packet 1936 is forwarded to the CNE/LDCM device 1968 as shown in FIG. 19W and is ACKed 1941 in FIG. 19X.

Figure 19Y:
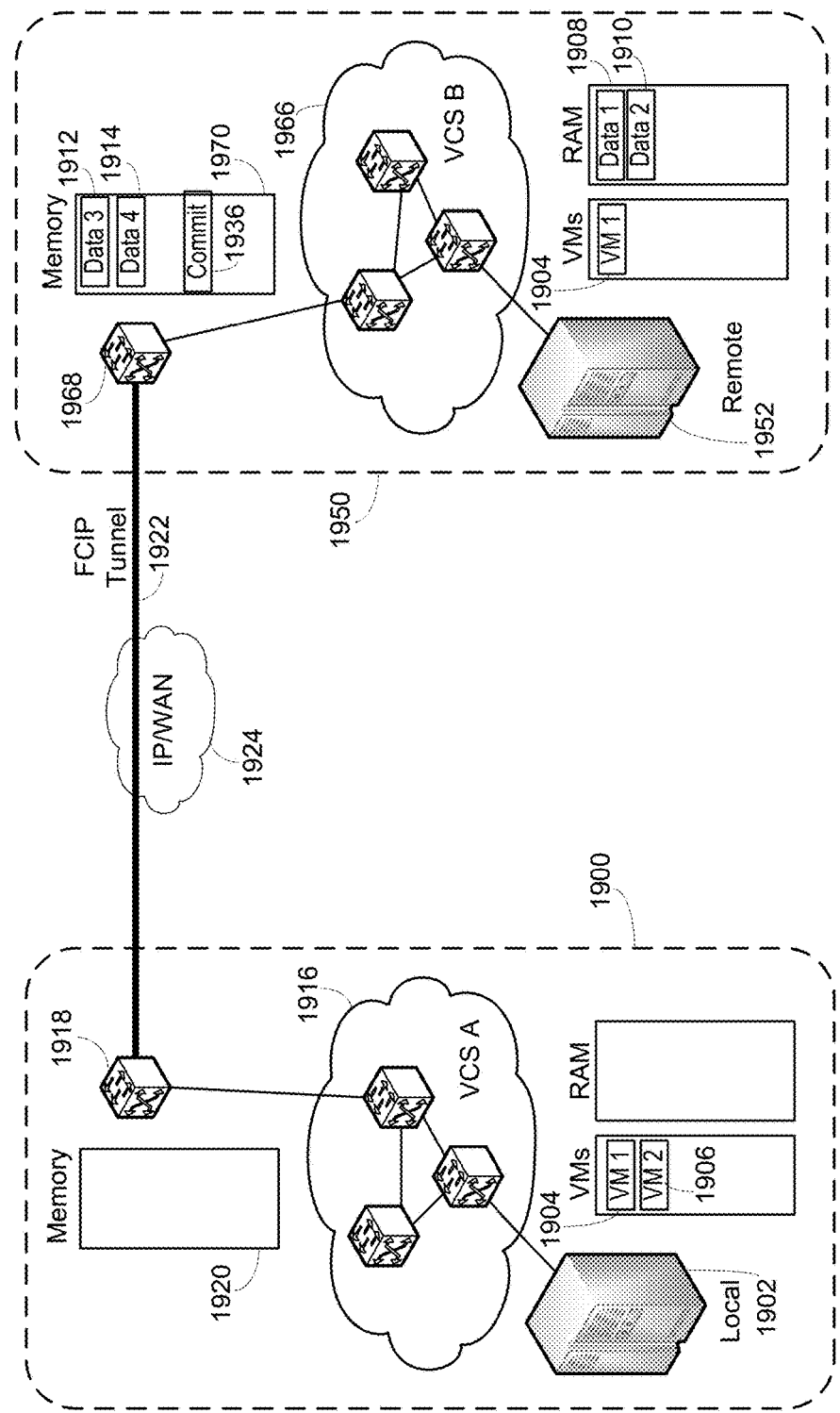
Figure 19Z:
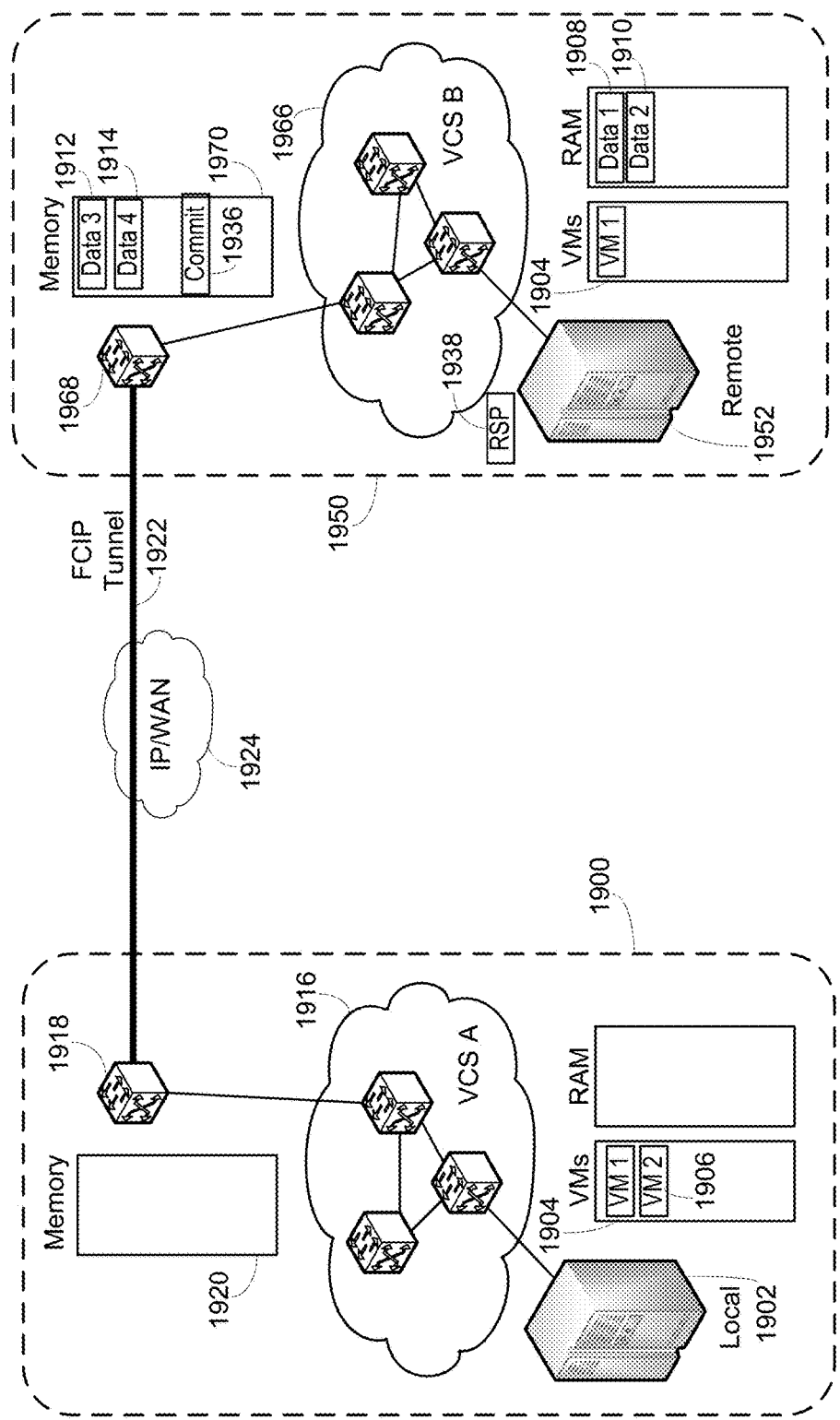
Figure 19A:
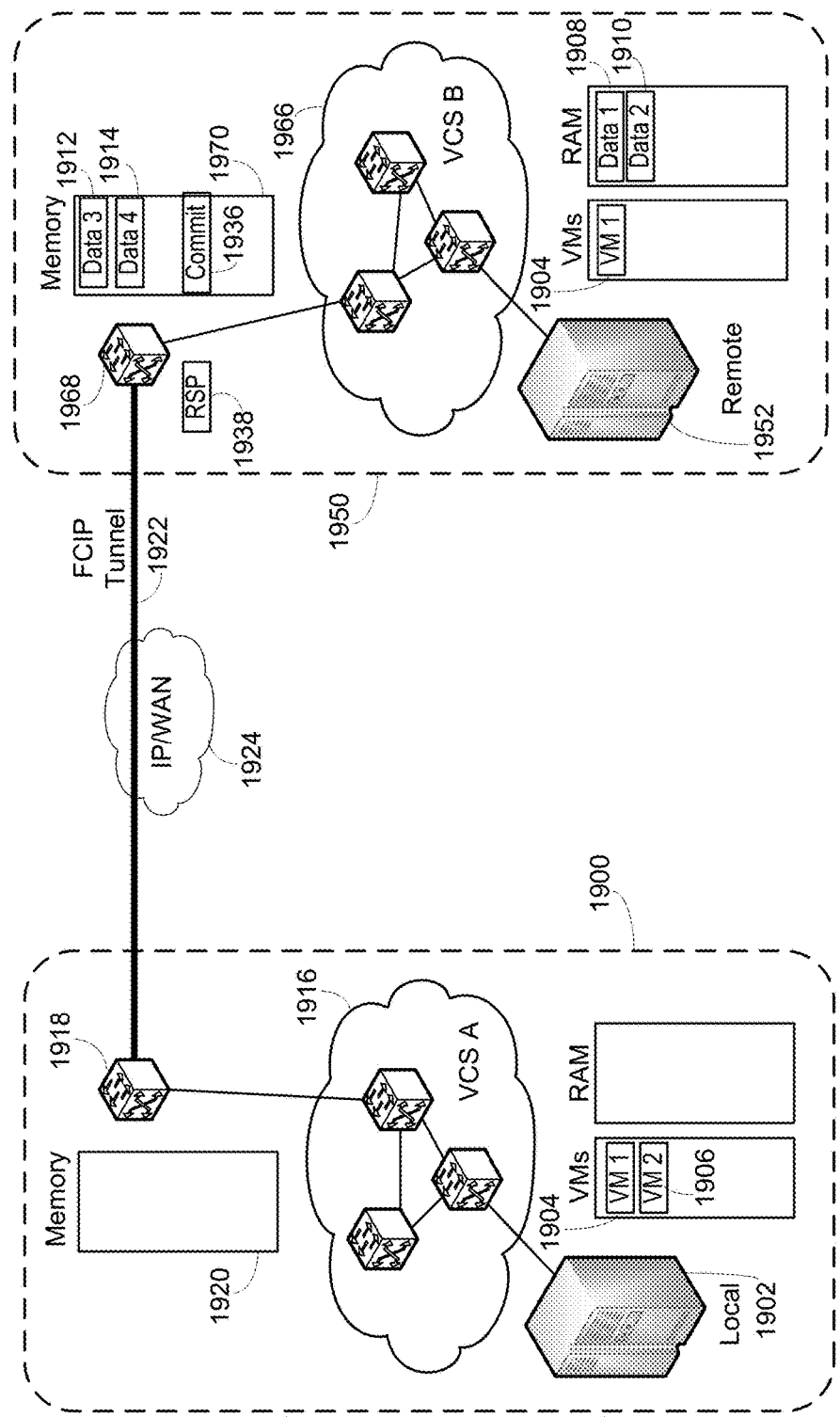
Figure 19A:
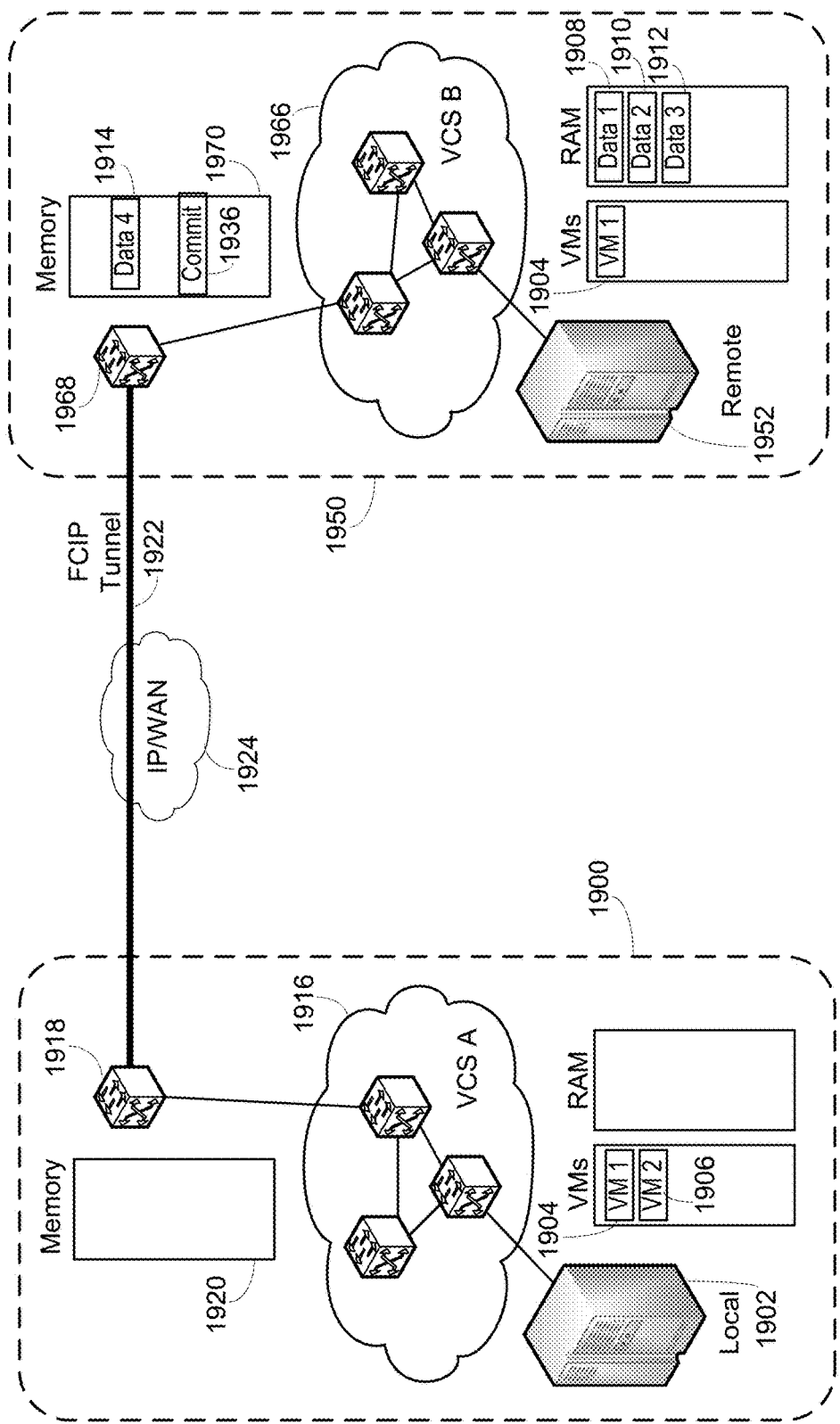
Figure 19A:
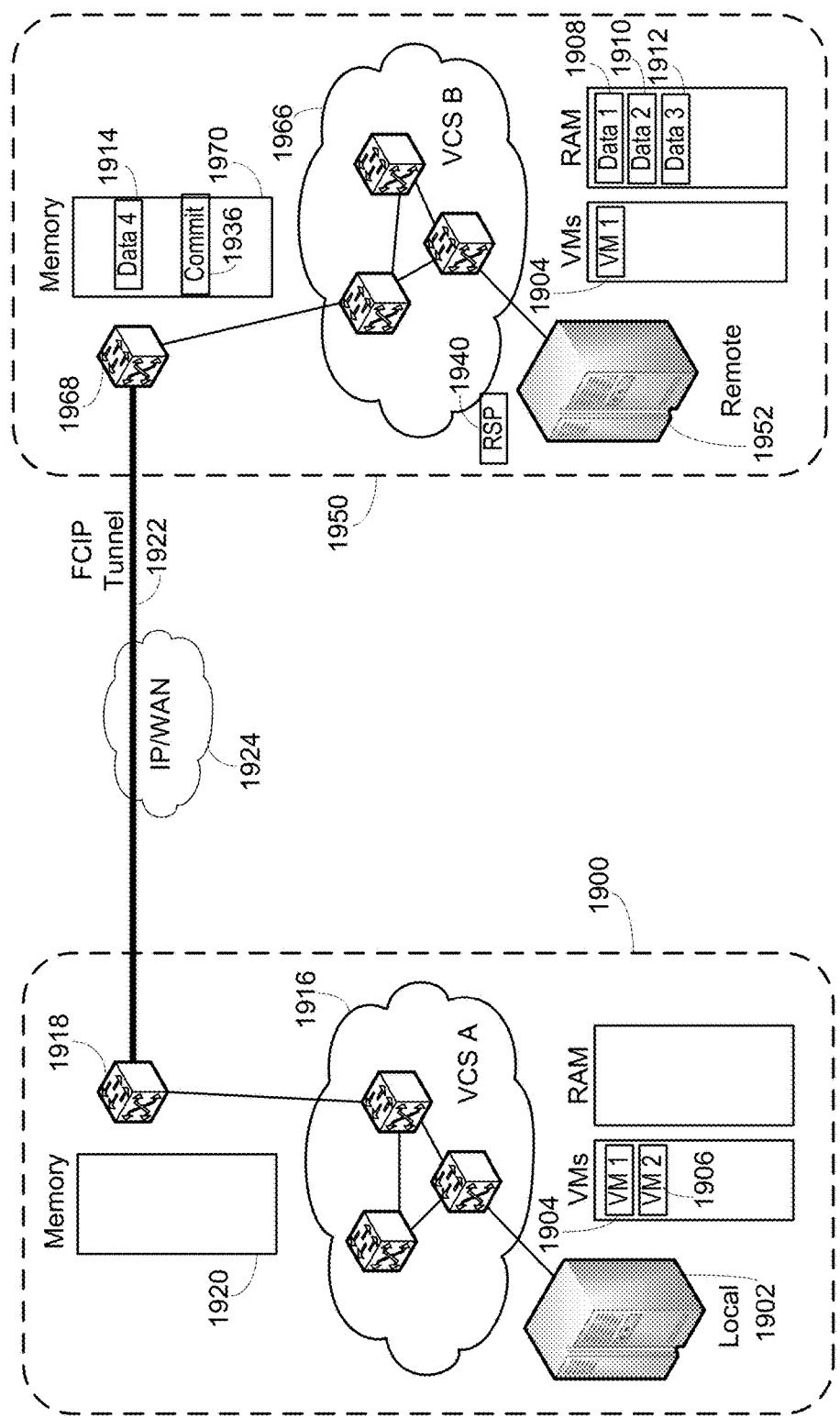
Figure 19A:
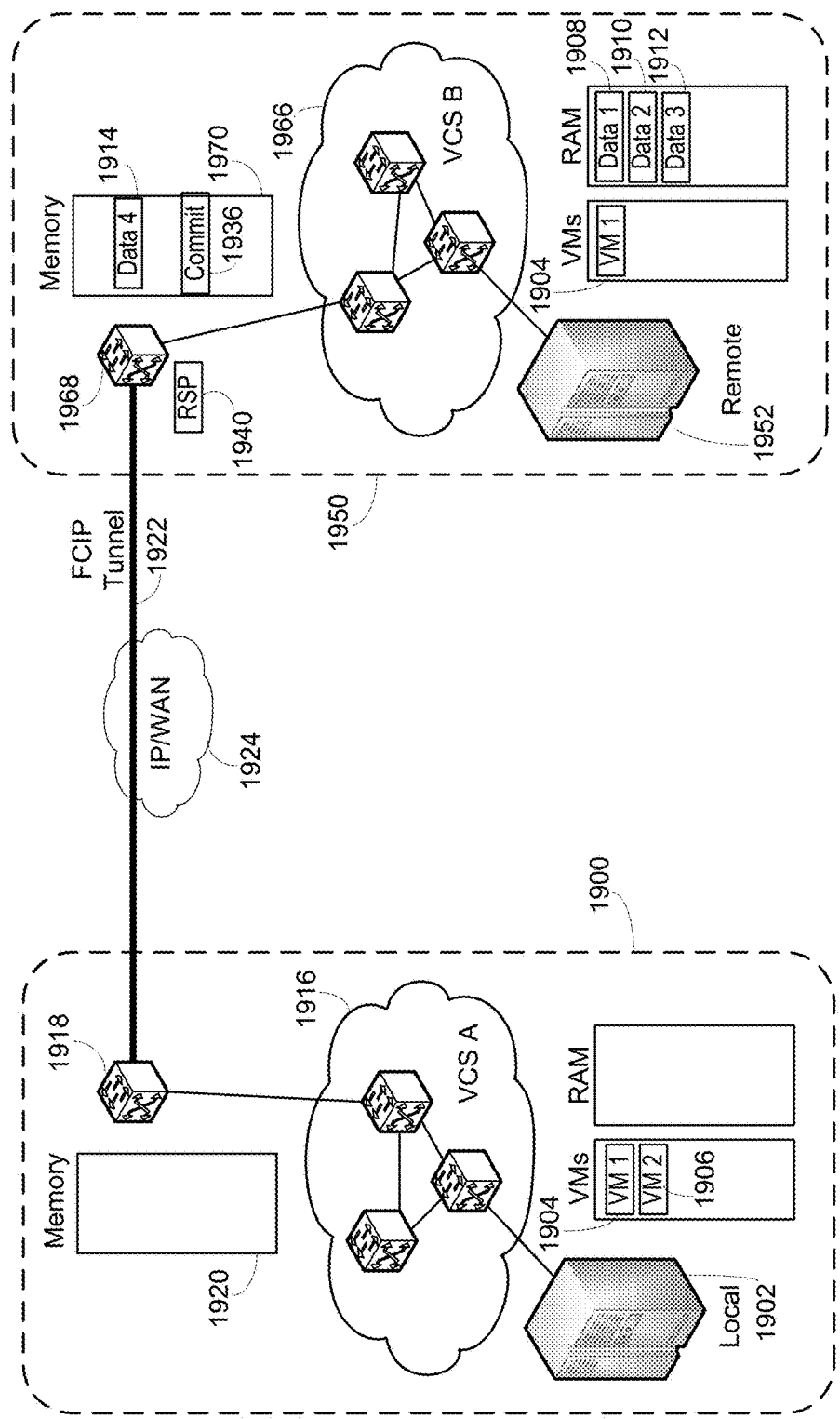
Figure 19A:
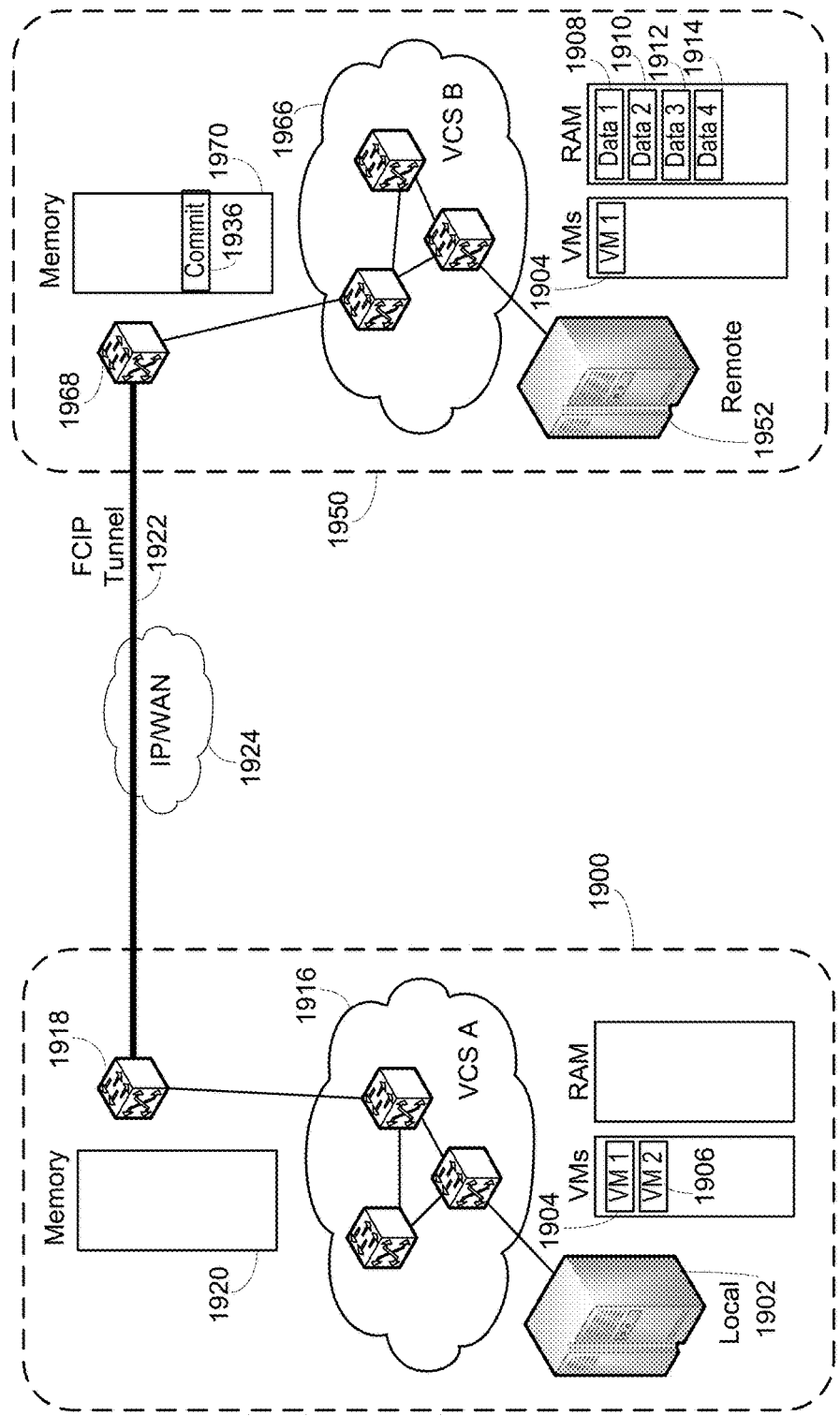
Figure 19A:
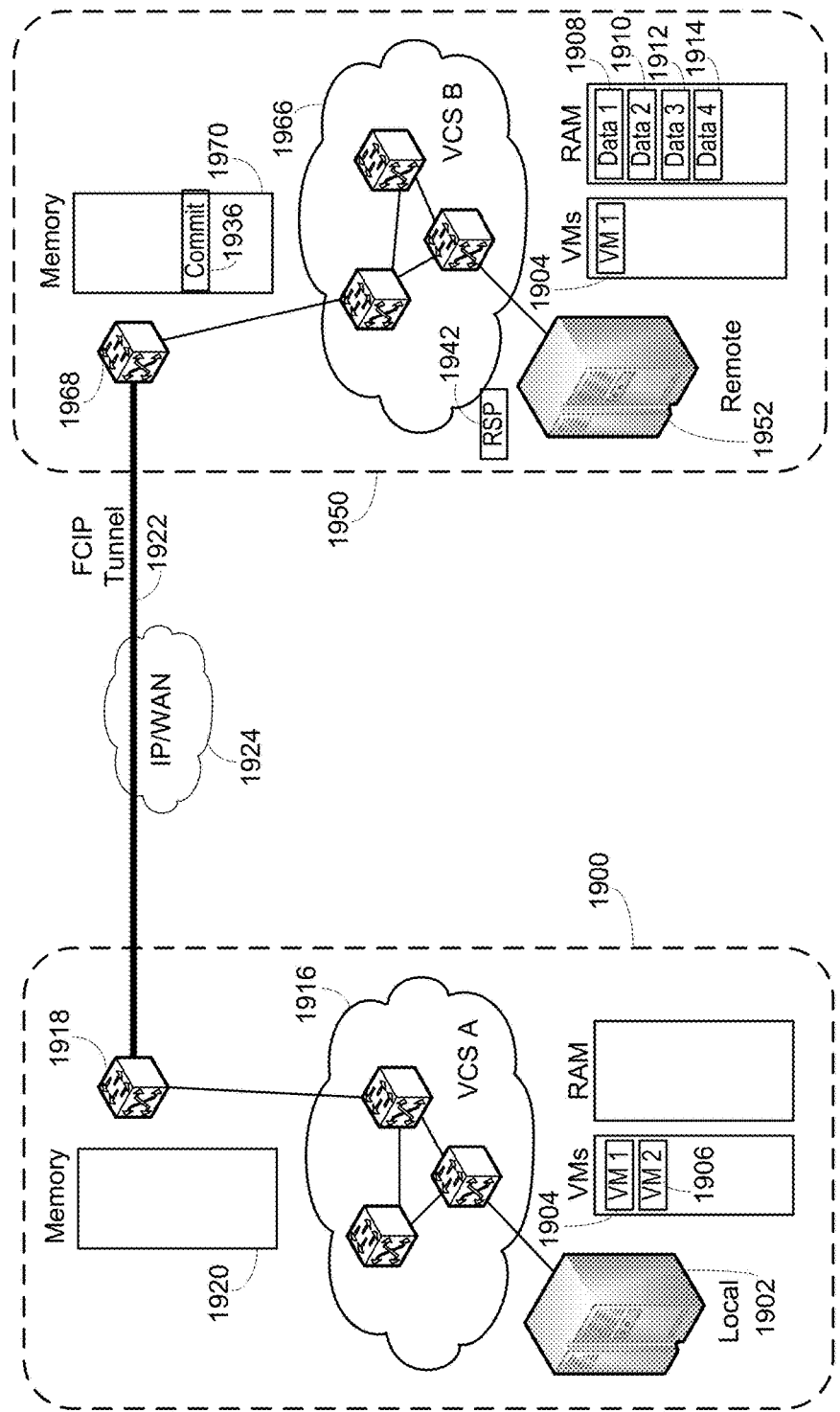
Figure 19A:
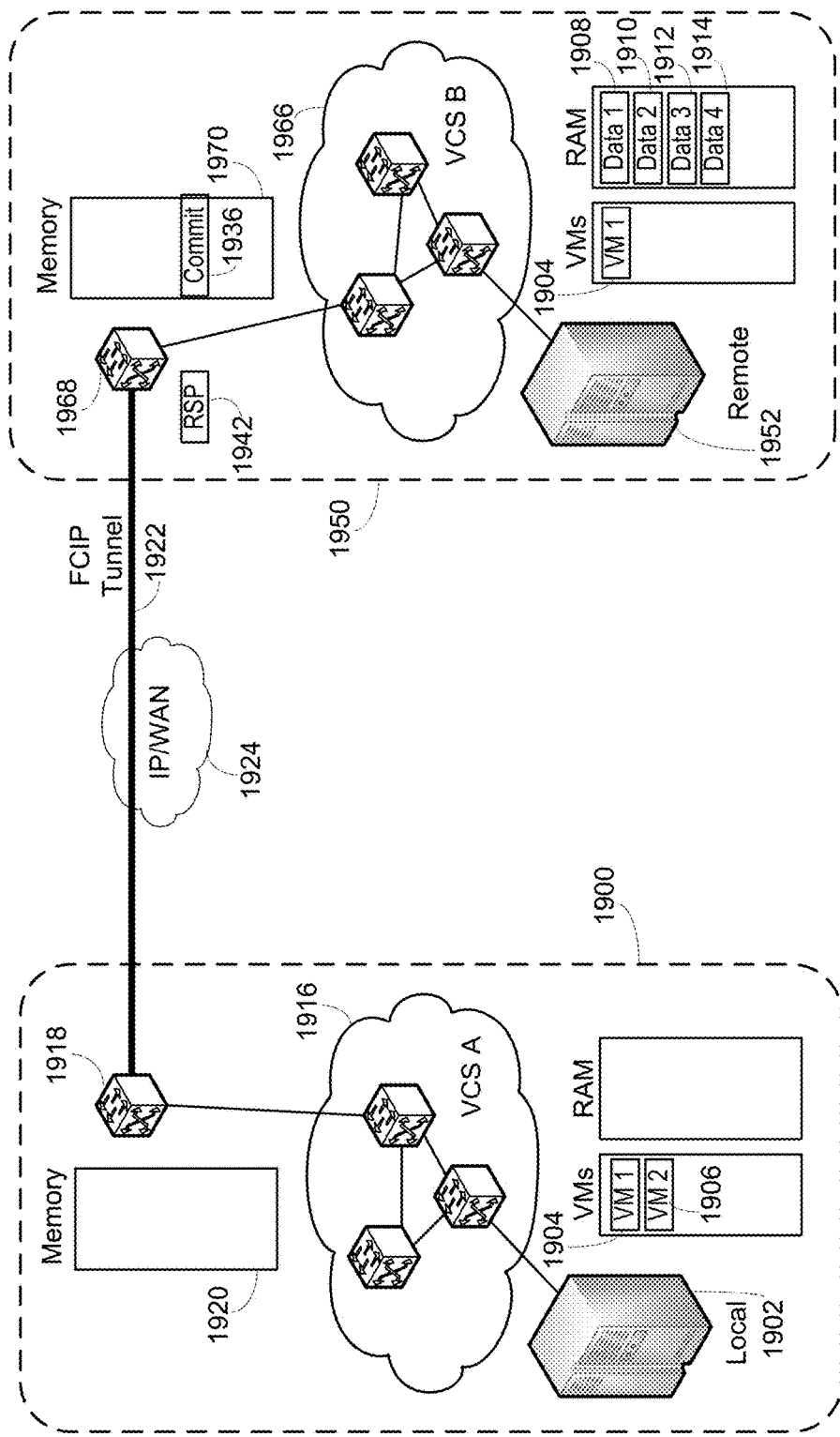
Figure 19A:
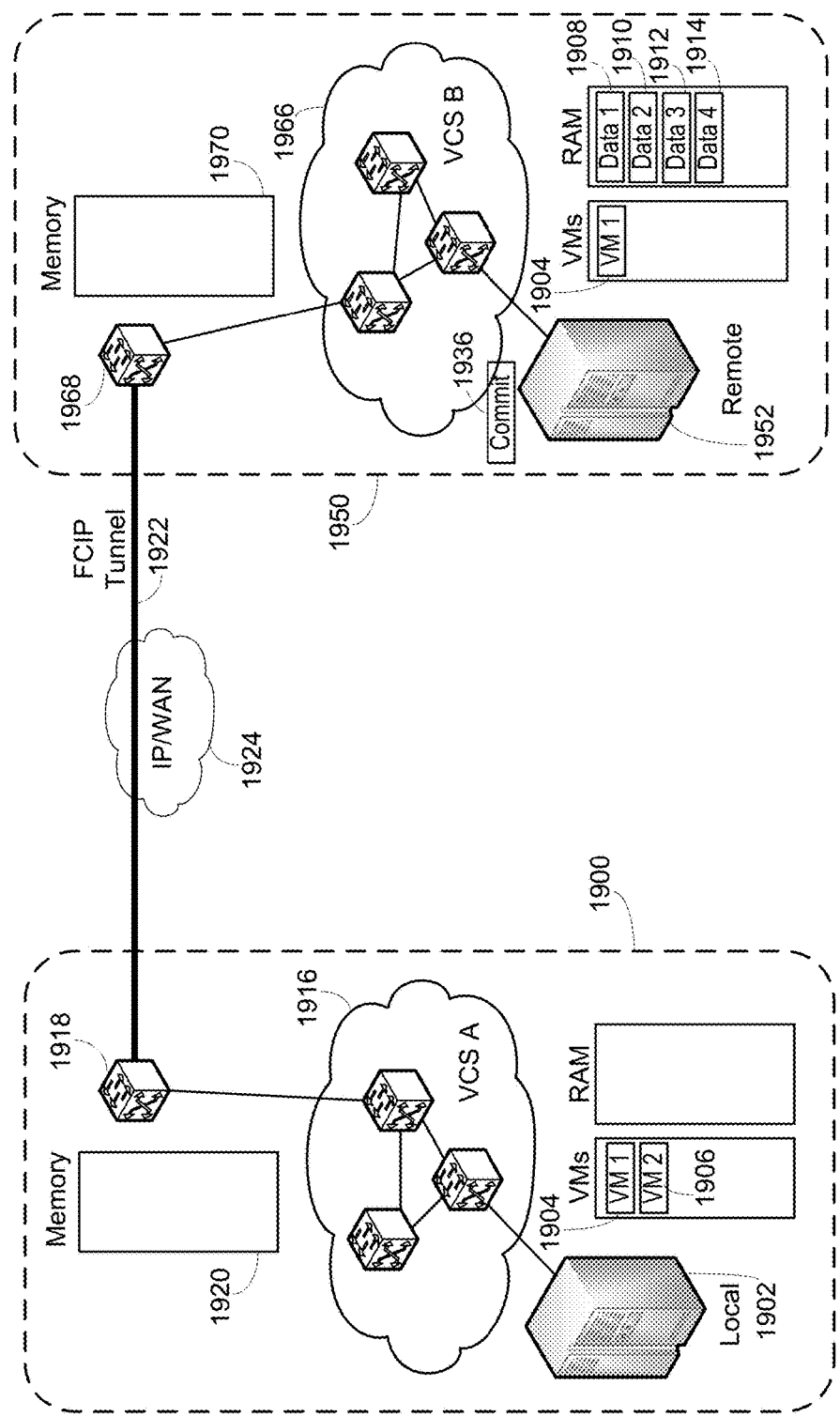
Figure 19A:
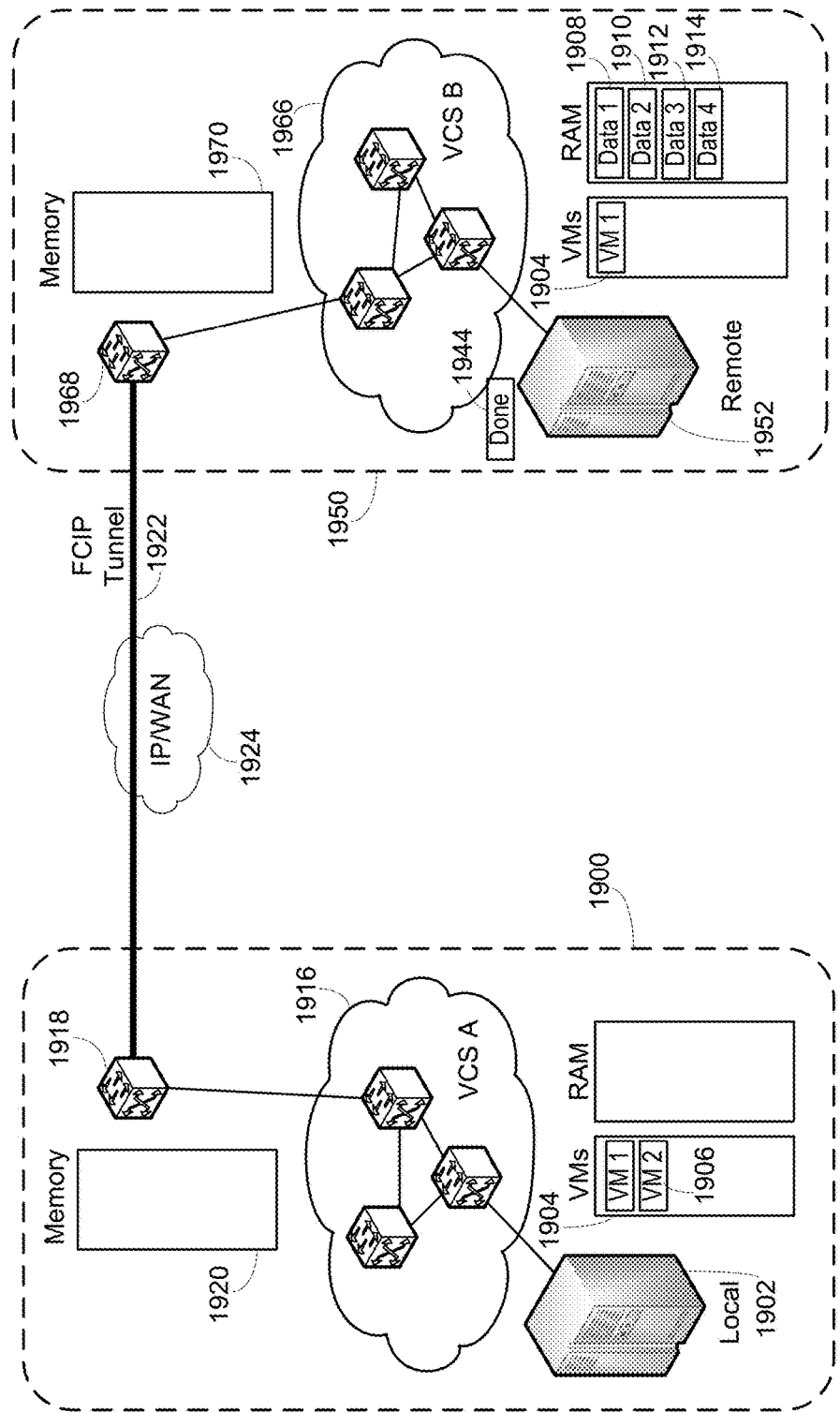
Figure 19A:
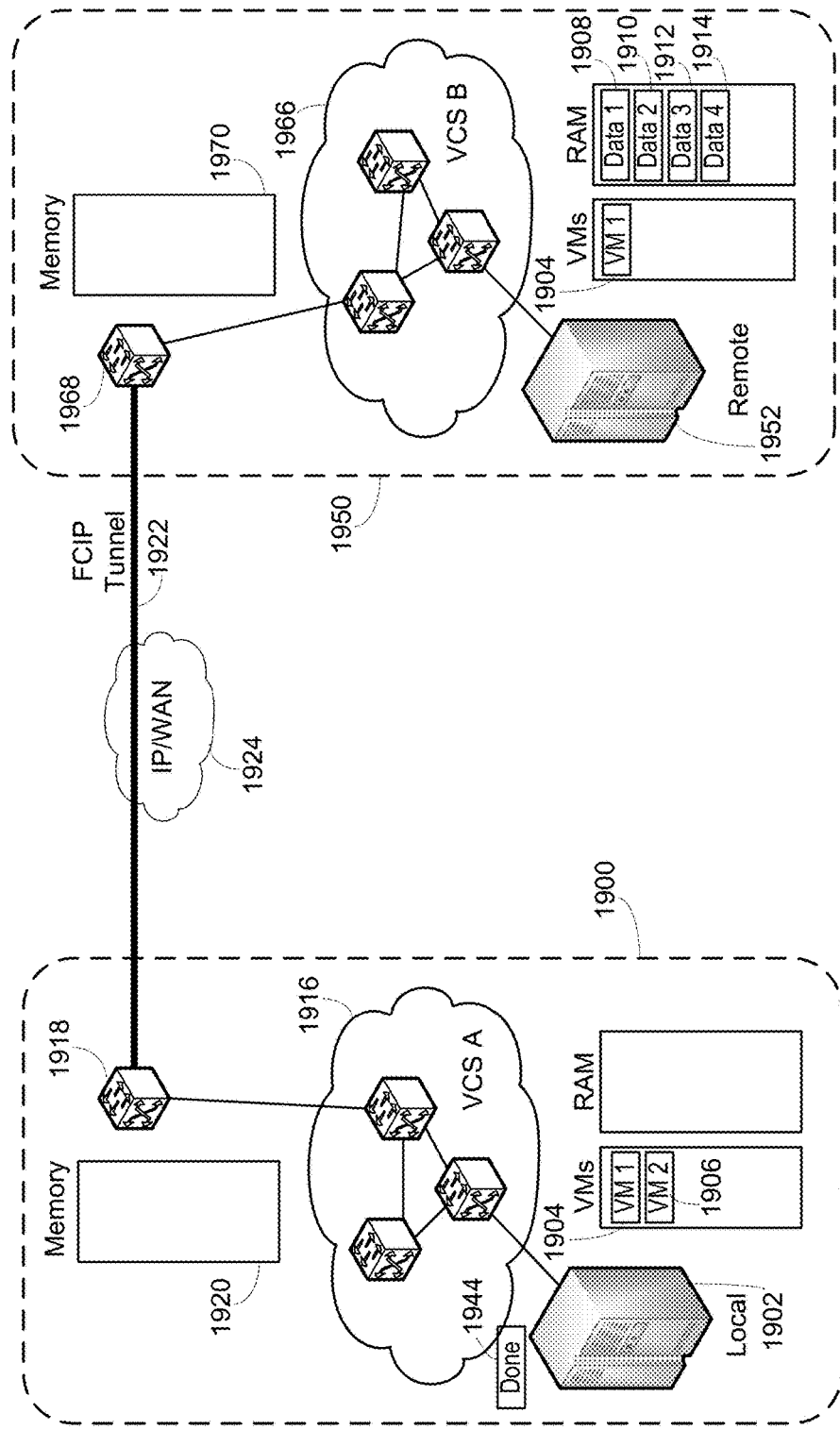
Figure 19A:
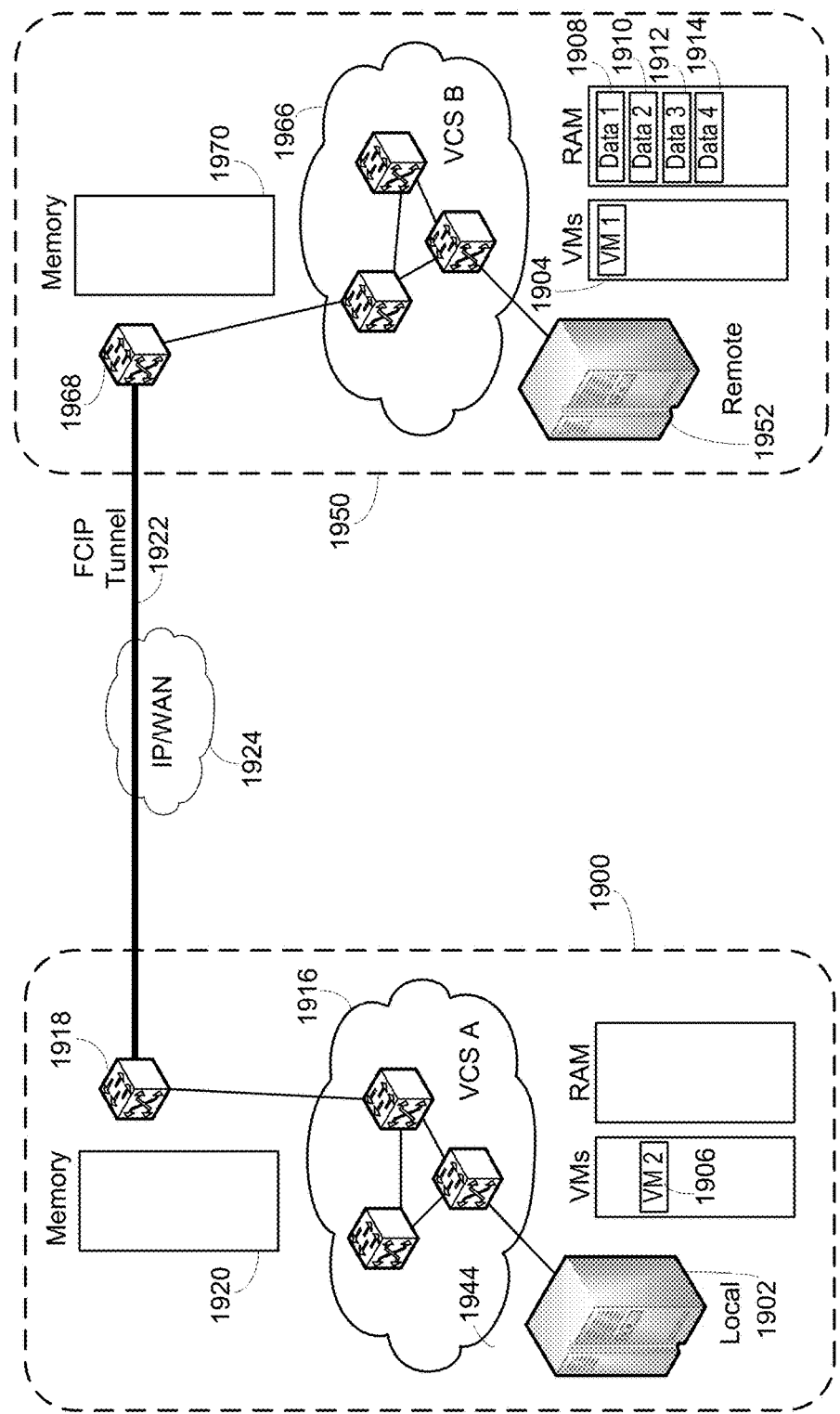

The CNE/LDCM device 1968 provides data2 1910 to the remote ESX server 1952 as shown in FIG. 19Y. An RSP packet 1938 is returned to the CNE/LDCM device 1968 in FIGS. 19Z and 19AA. Data 3 1912 is provided to the remote ESX server 1952 in FIG. 19AB and the RSP packet 1940 is provided and received in FIGS. 19AC and 19AD. Similarly FIGS. 19AE-19AG show the transfer of data4 1914. With the RSP packet 1942 received, the CNE/LDCM 1968 transfers the COMMIT packet 1936 to the remote ESX server 1952, as shown in FIG. 19AH. When the remote ESX server 1952 receives the COMMIT packet 1936, it responds with the DONE packet 1944, to indicate the completion of the move. This is shown in FIG. 19AI. With that transmission, the remote ESX server 1952 will restart the VM and normal operations will resume. The DONE packet 1944 is received at the local ESX server 1902, as shown in FIG. 19AJ, and the local ESX server 1902 removes the VM1 1904 to complete the process in FIG. 19AK.

Figure 20A:
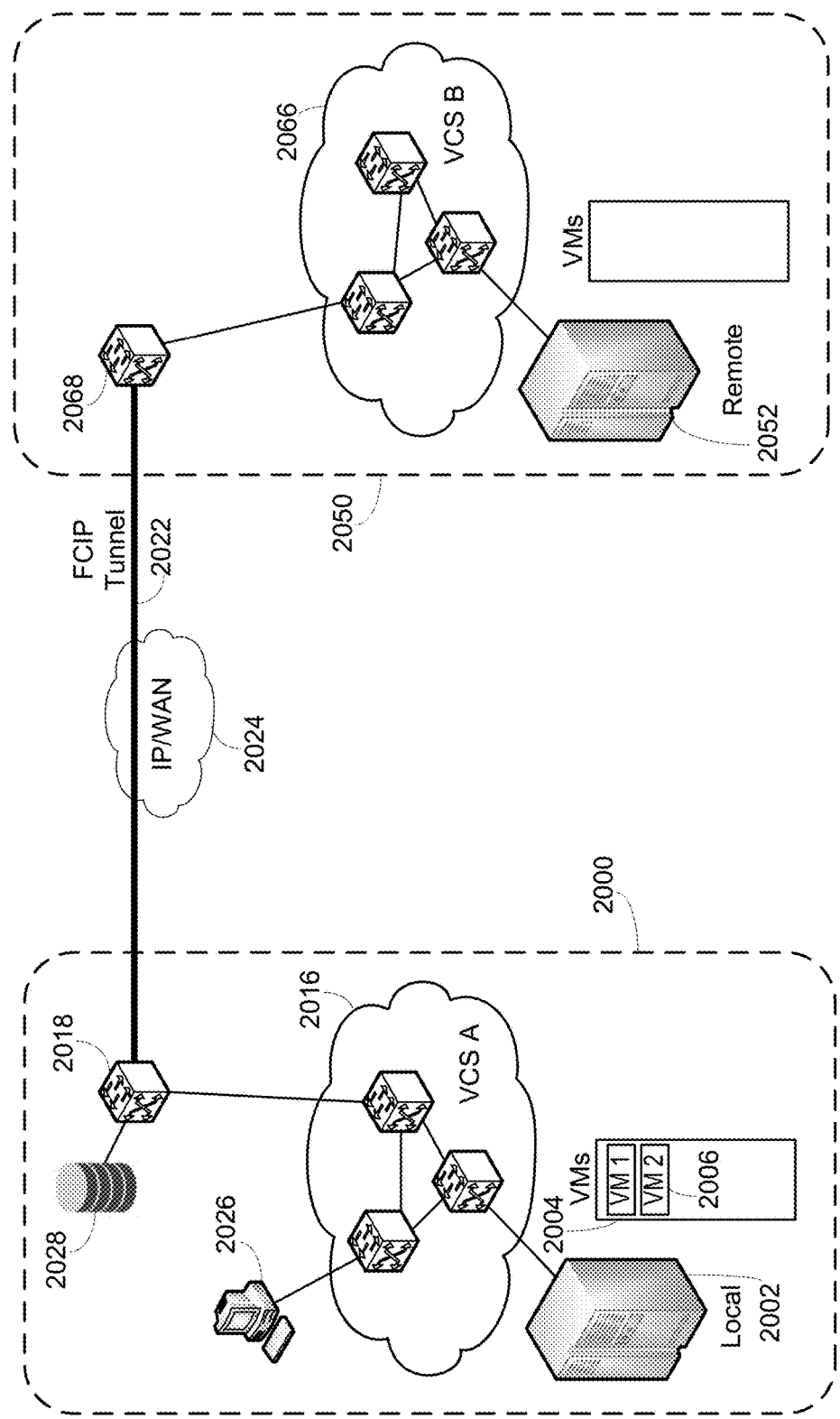
FIGS. 20A-20AG are block diagrams illustrating an application migration operation according to the present invention.
Figure 20B:
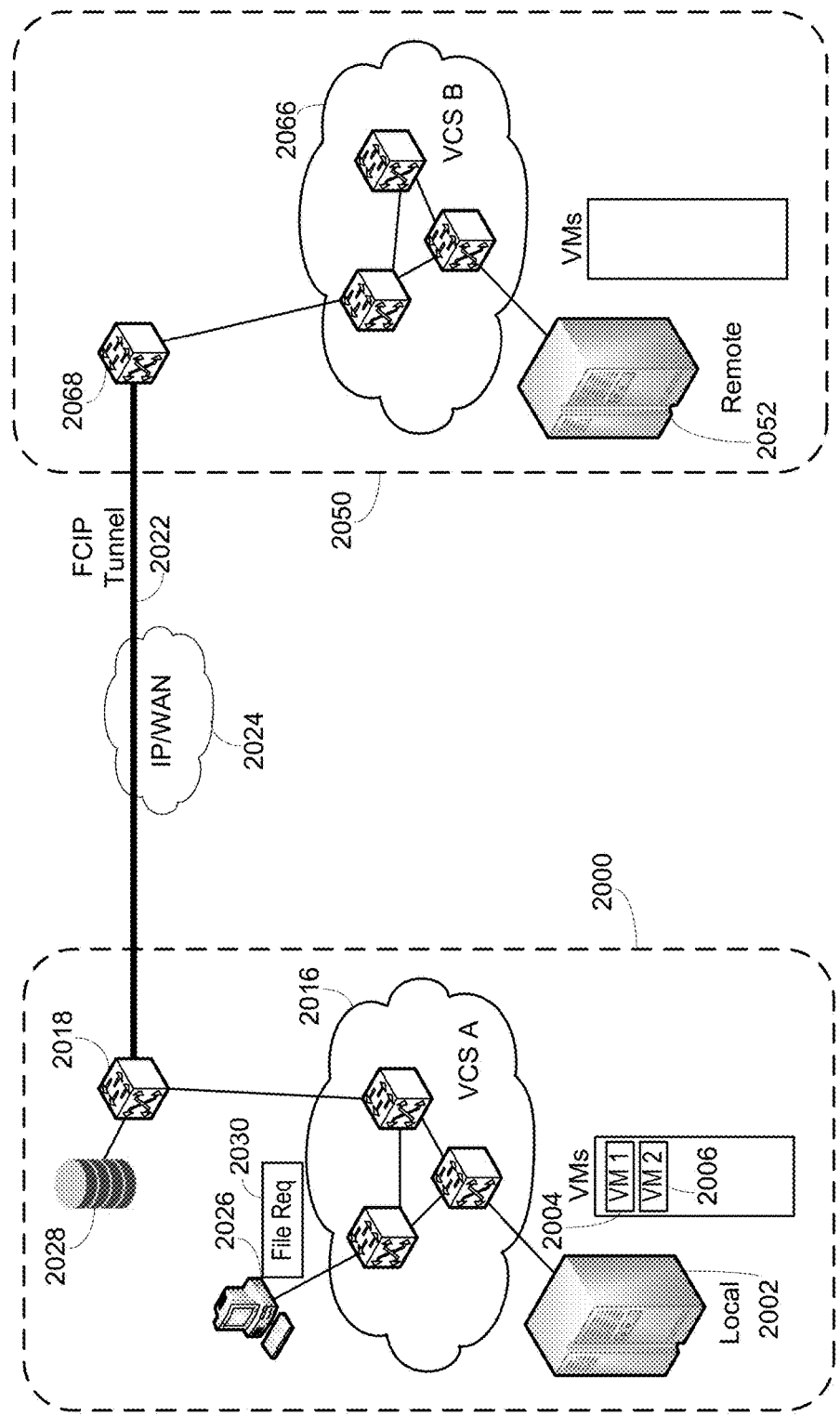
Figure 20C:
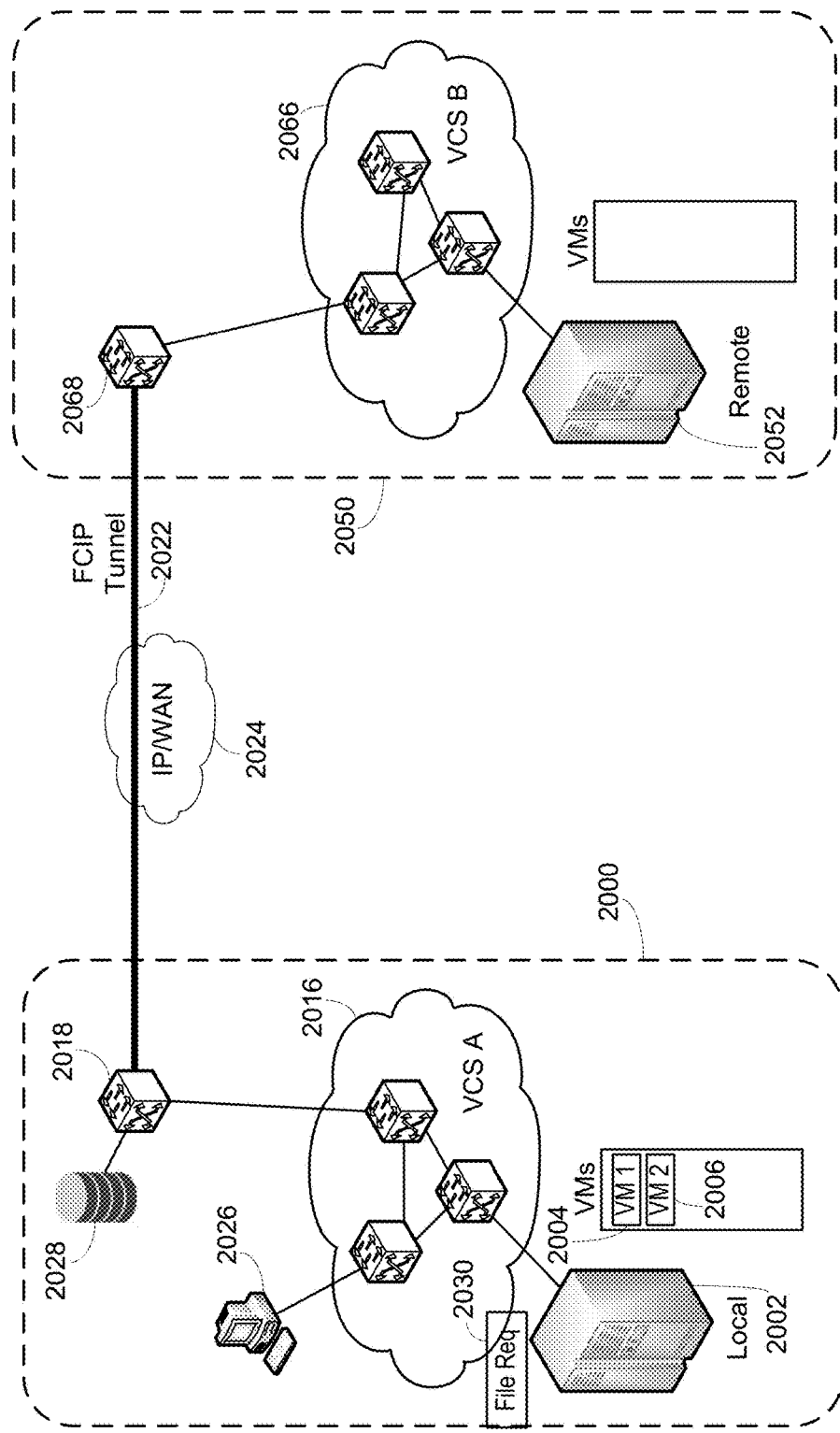
Figure 20D:
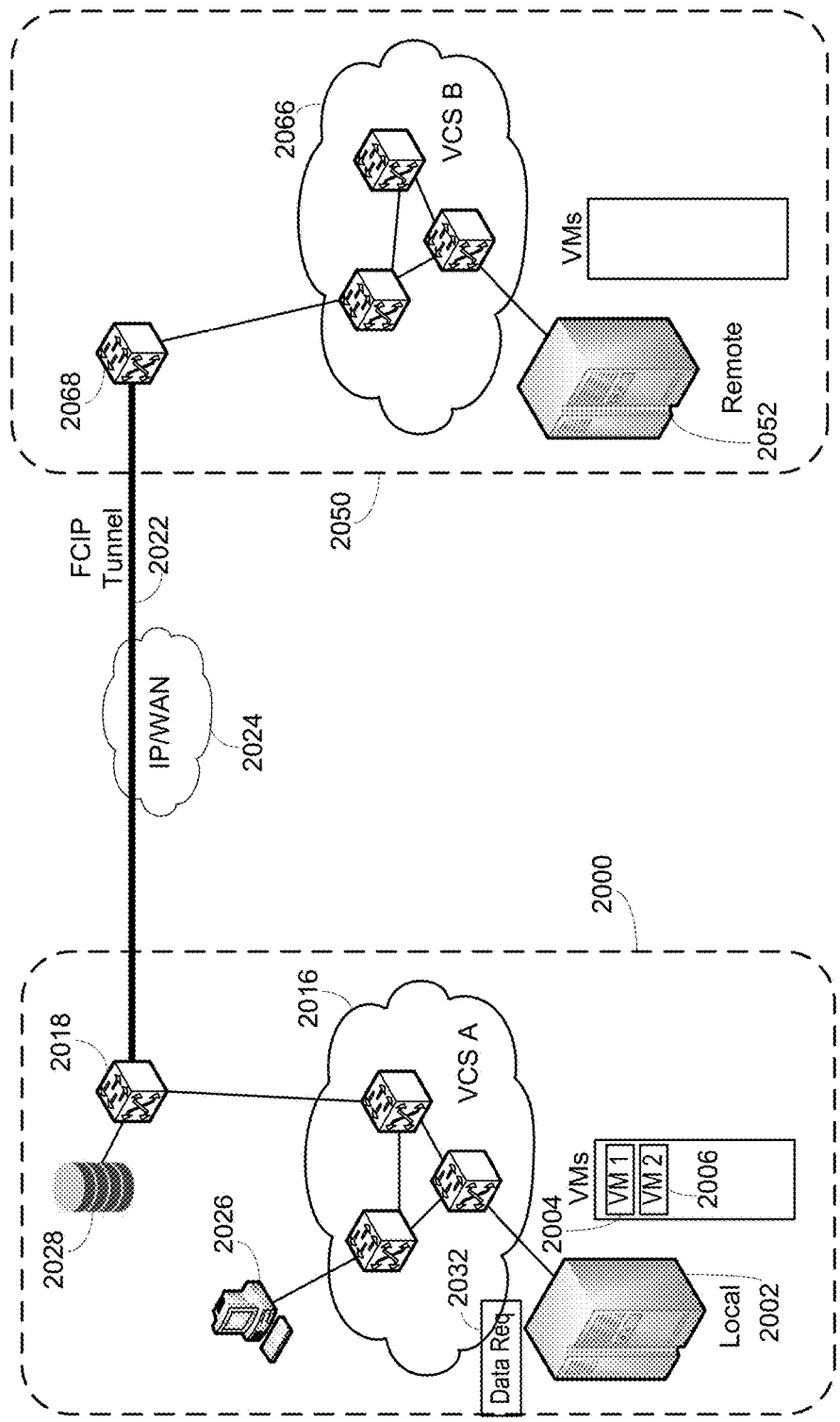
Figure 20E:
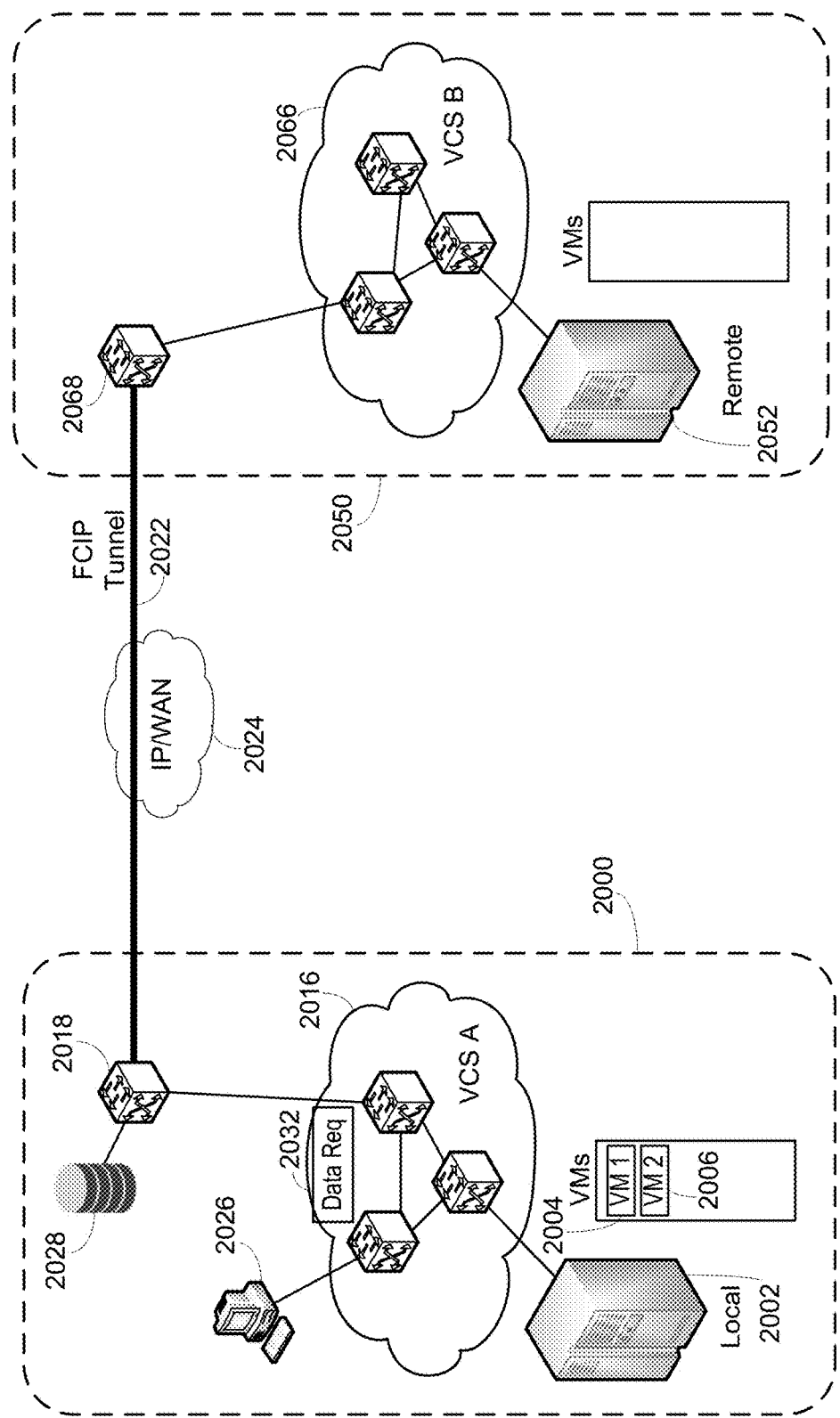
Figure 20F:
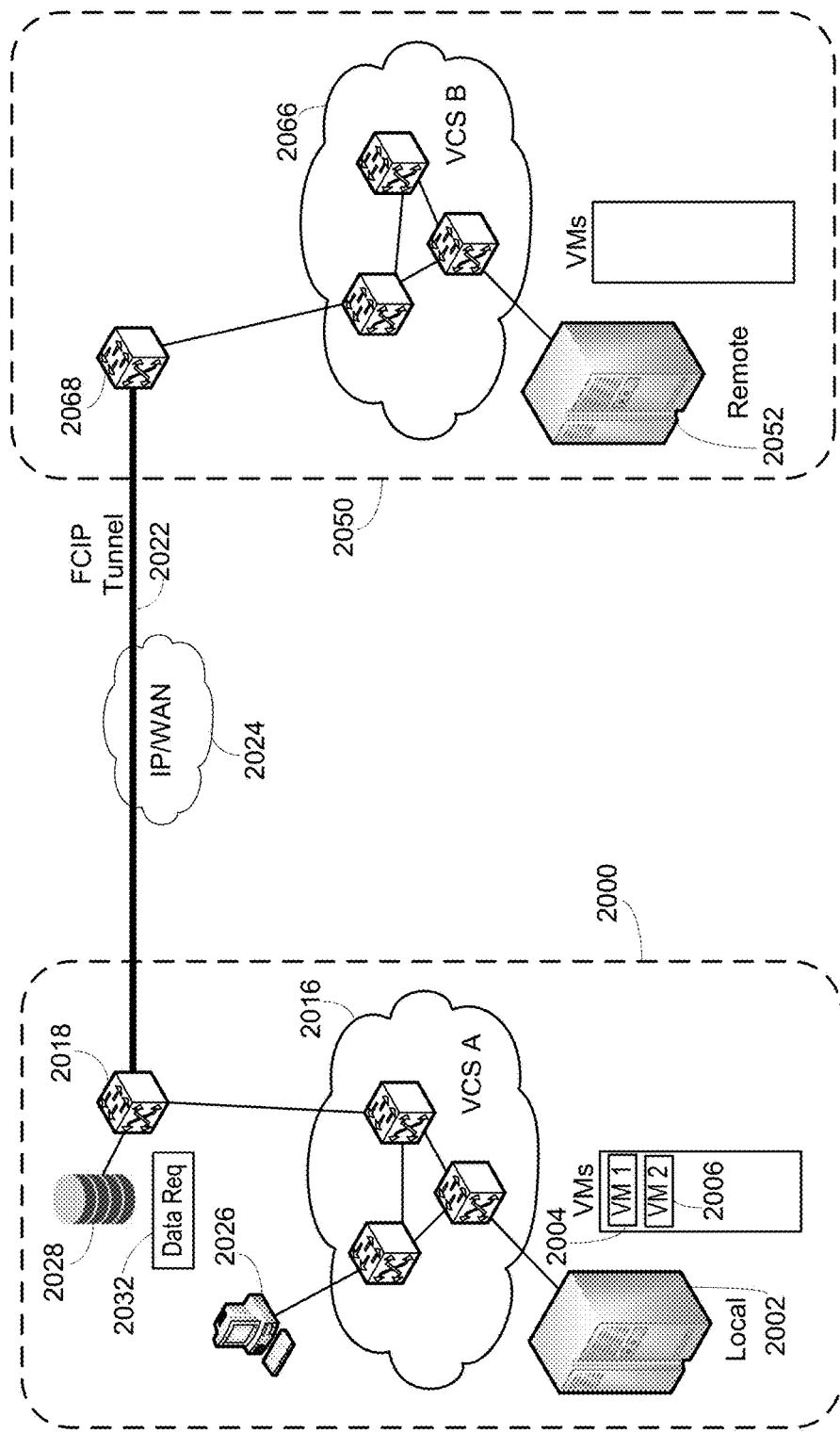
Figure 20G:
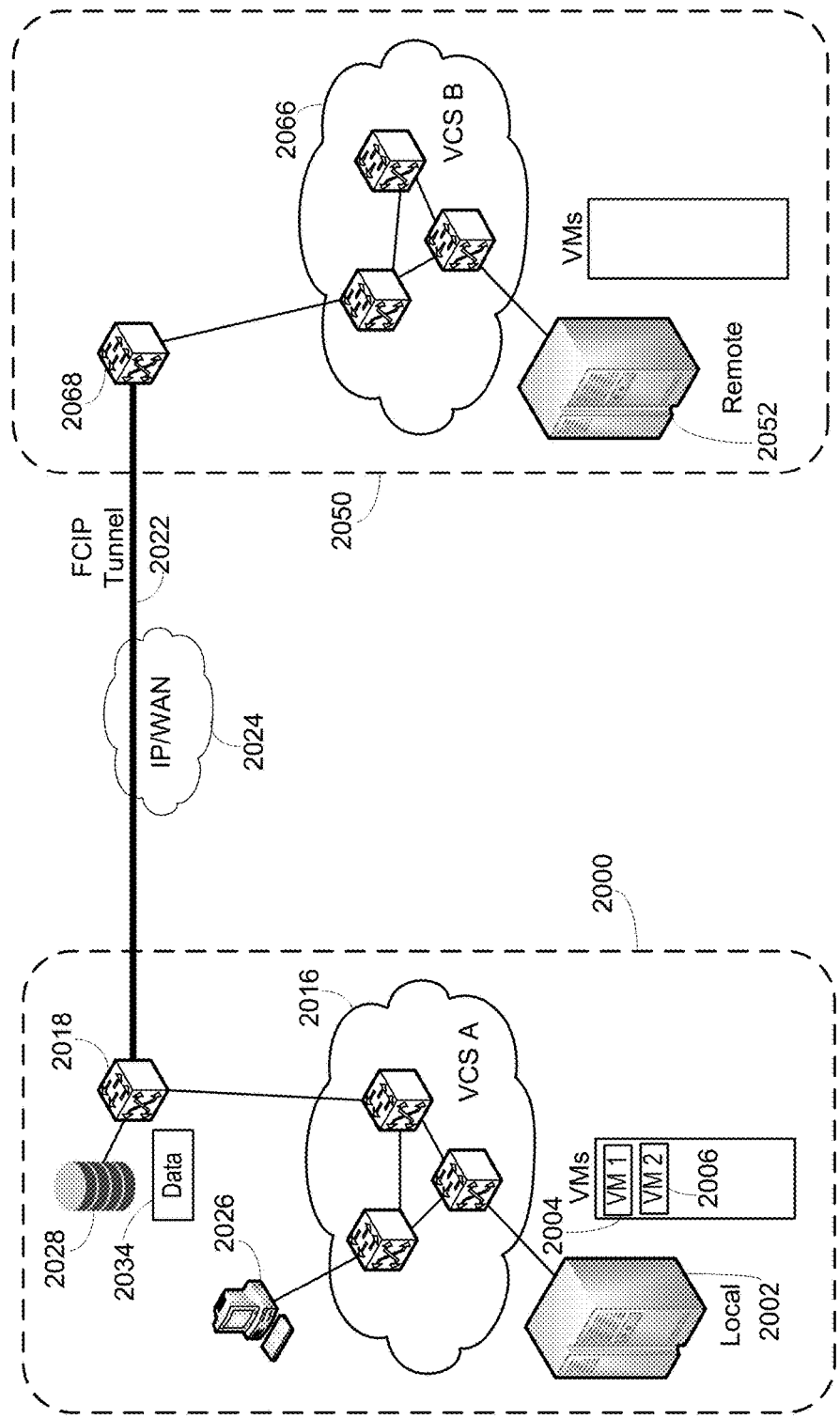
Figure 20H:
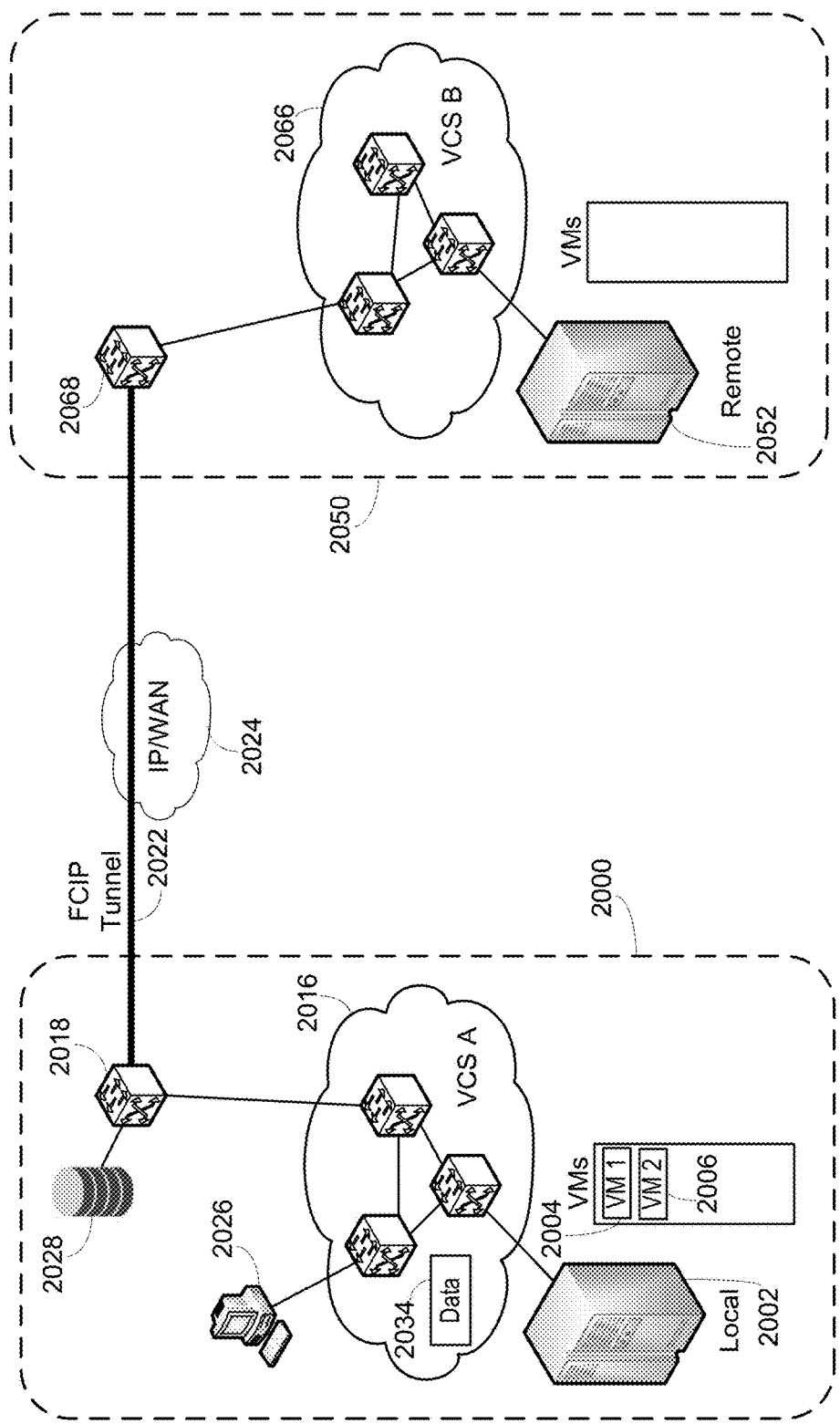
Figure 20I:
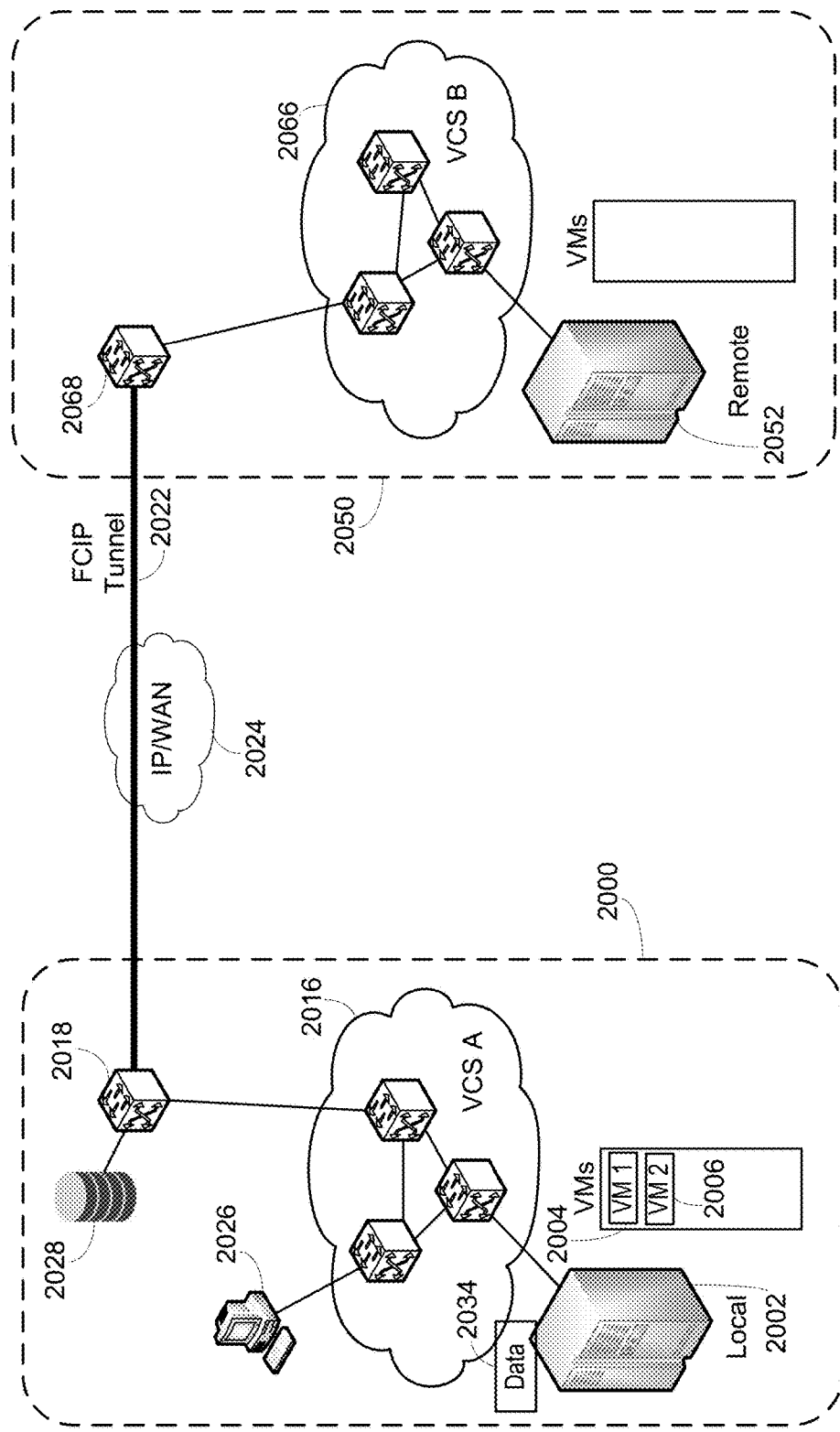
Figure 20J:
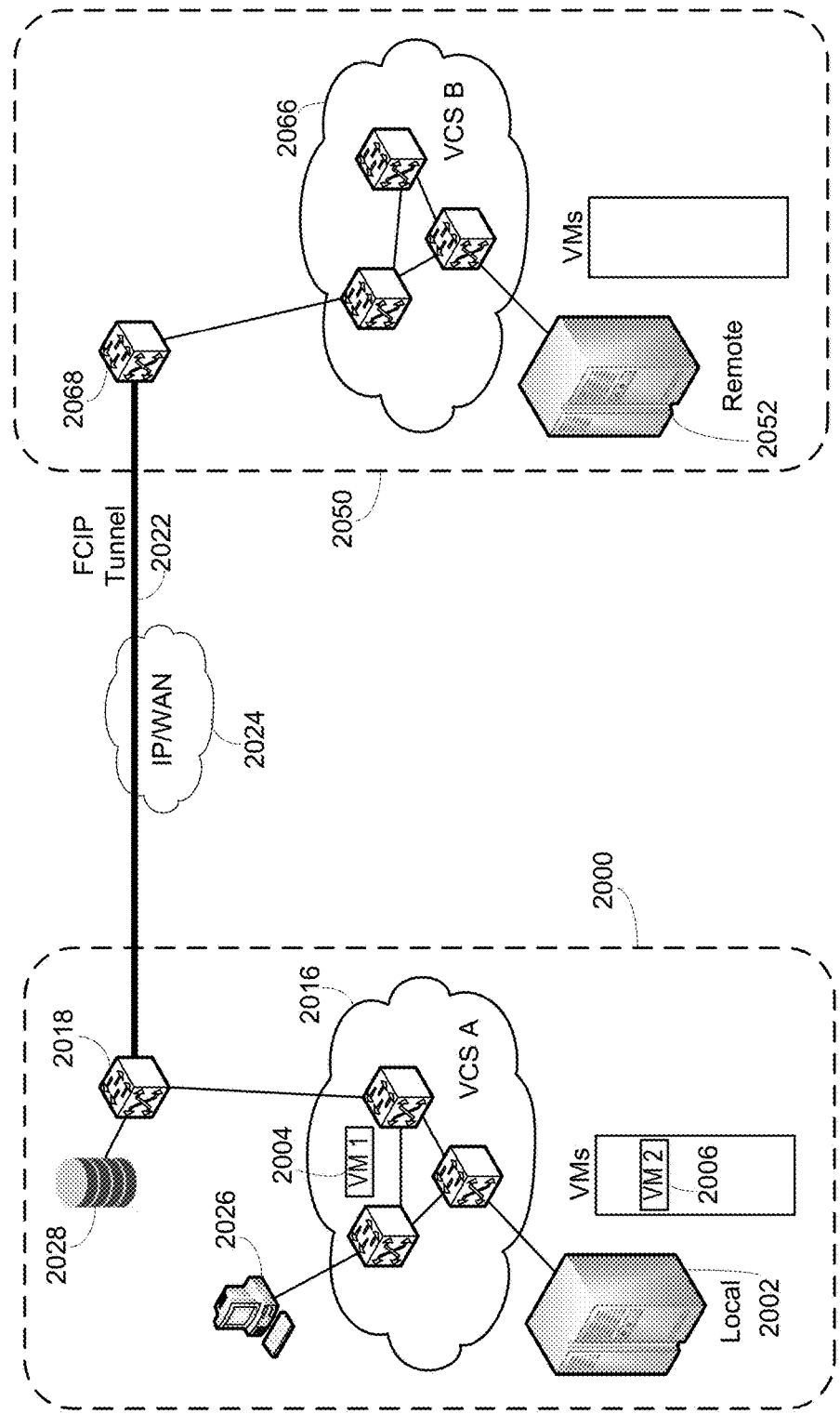
Figure 20K:
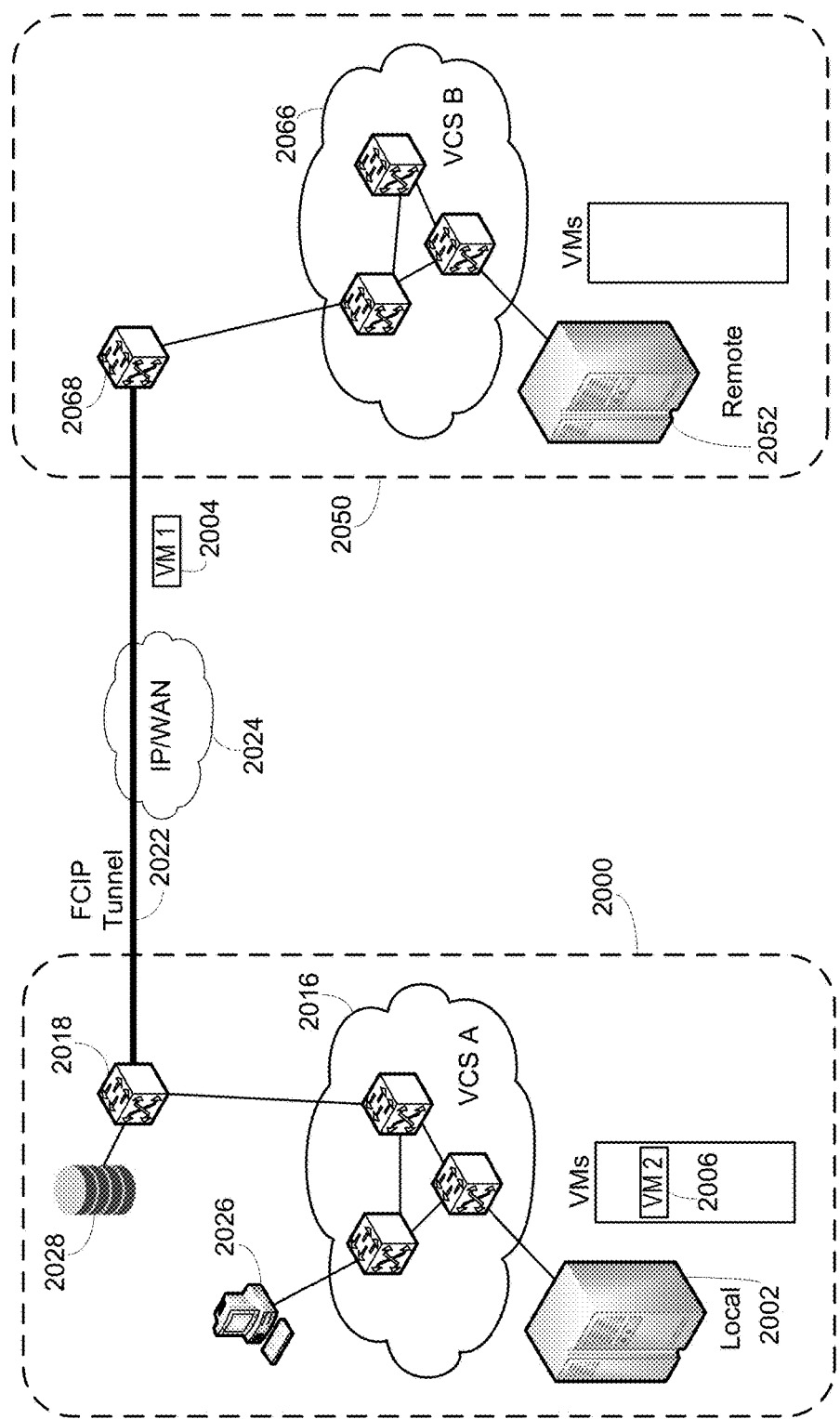
Figure 20L:
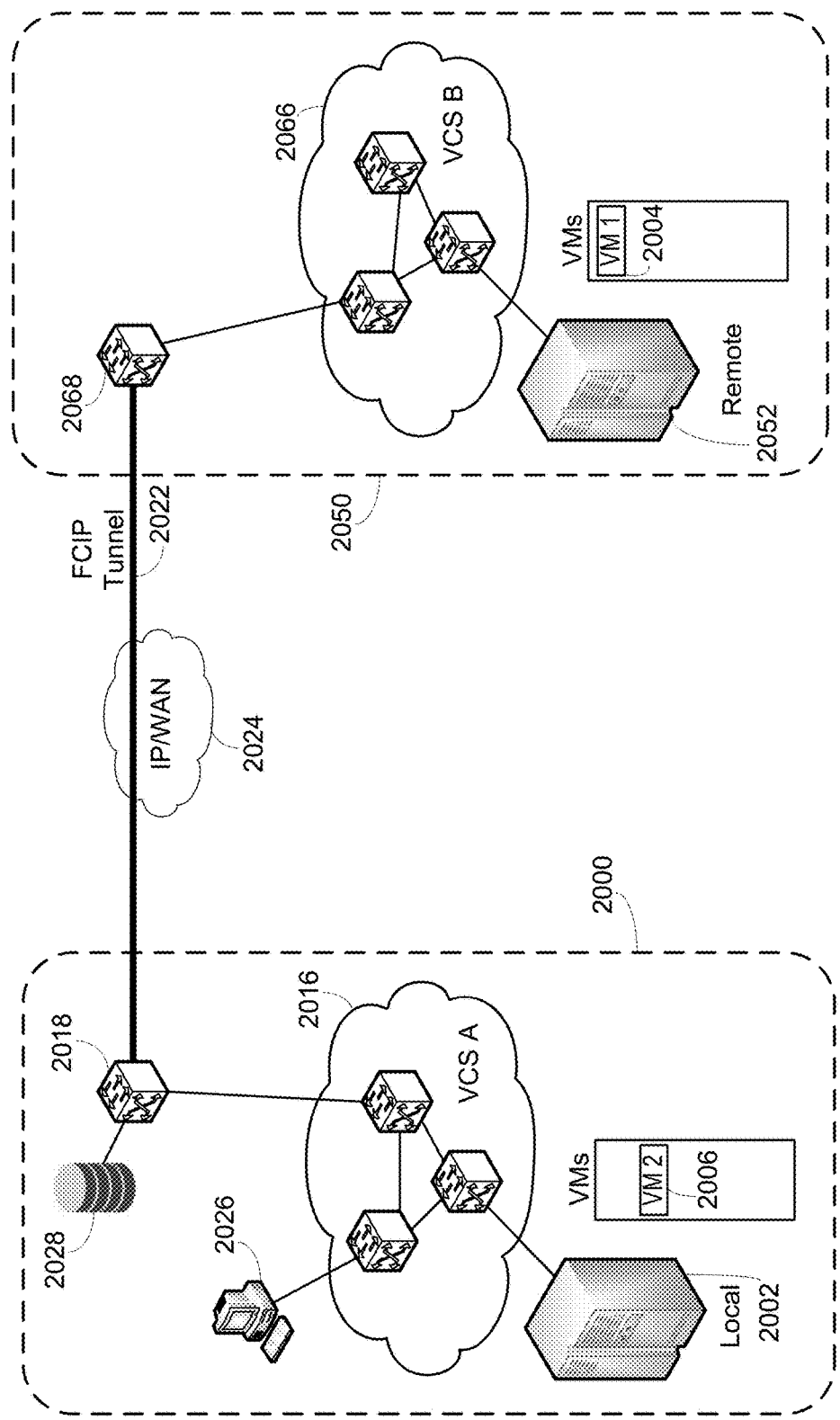
Figure 20M:
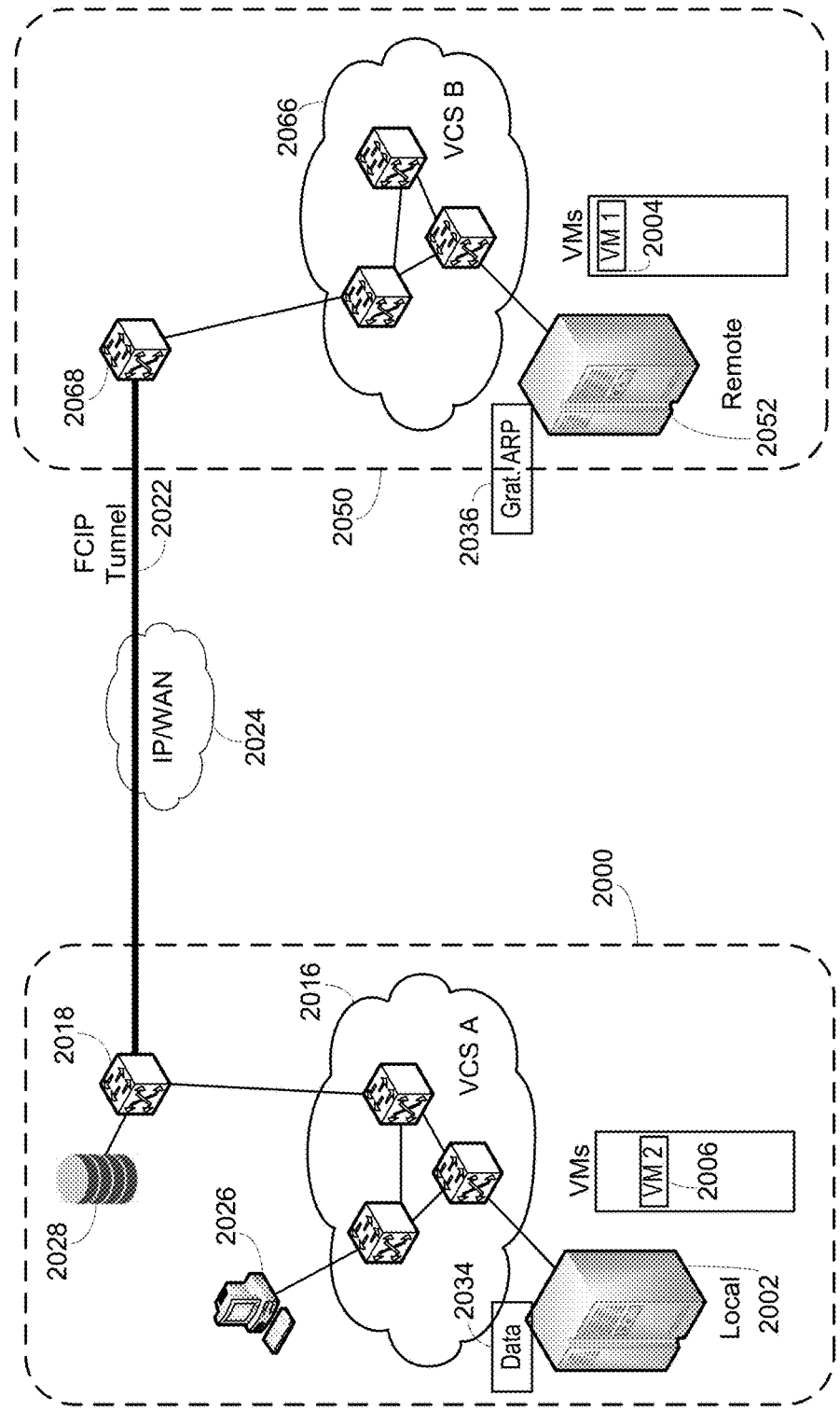
Figure 20N:
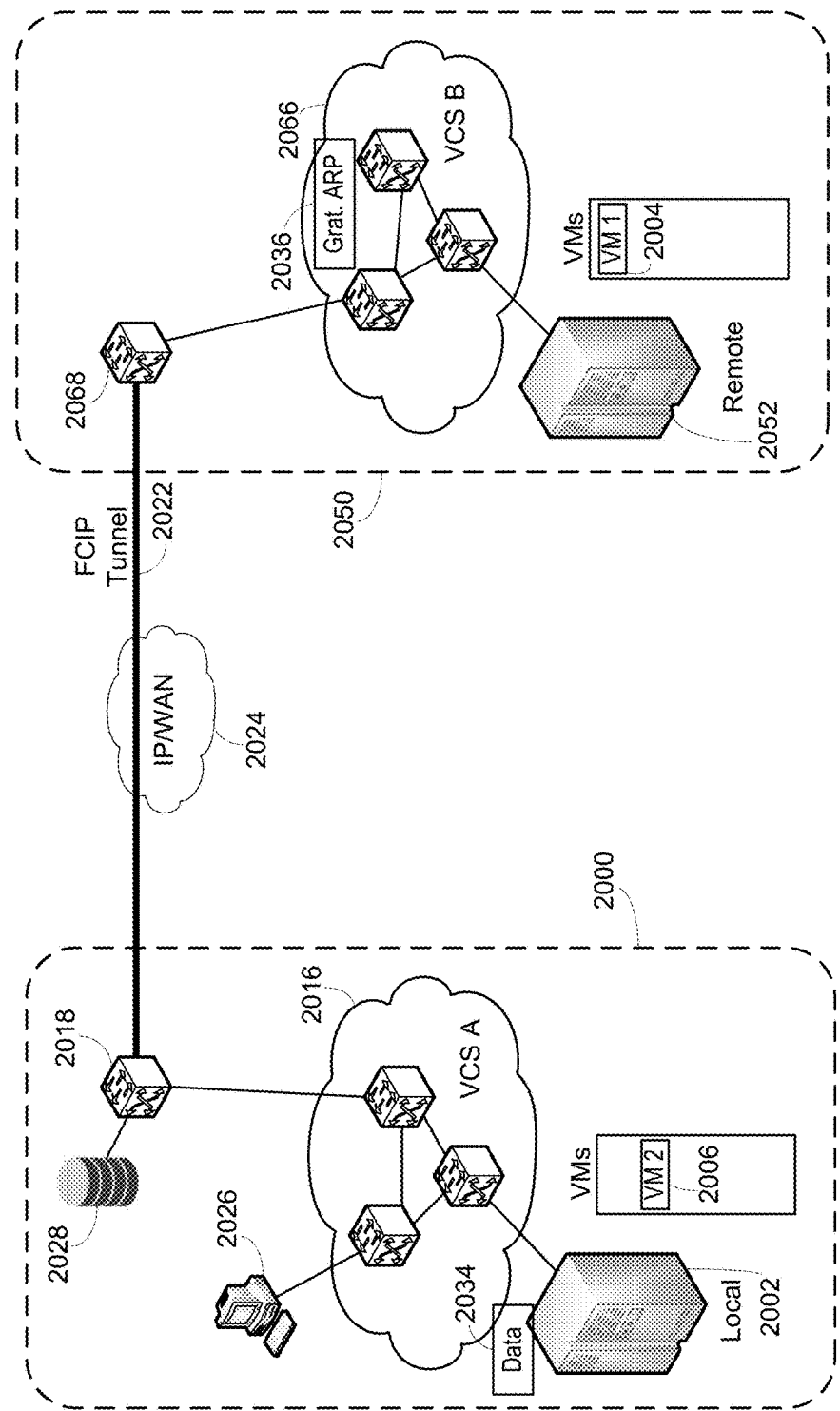
Figure 20O:
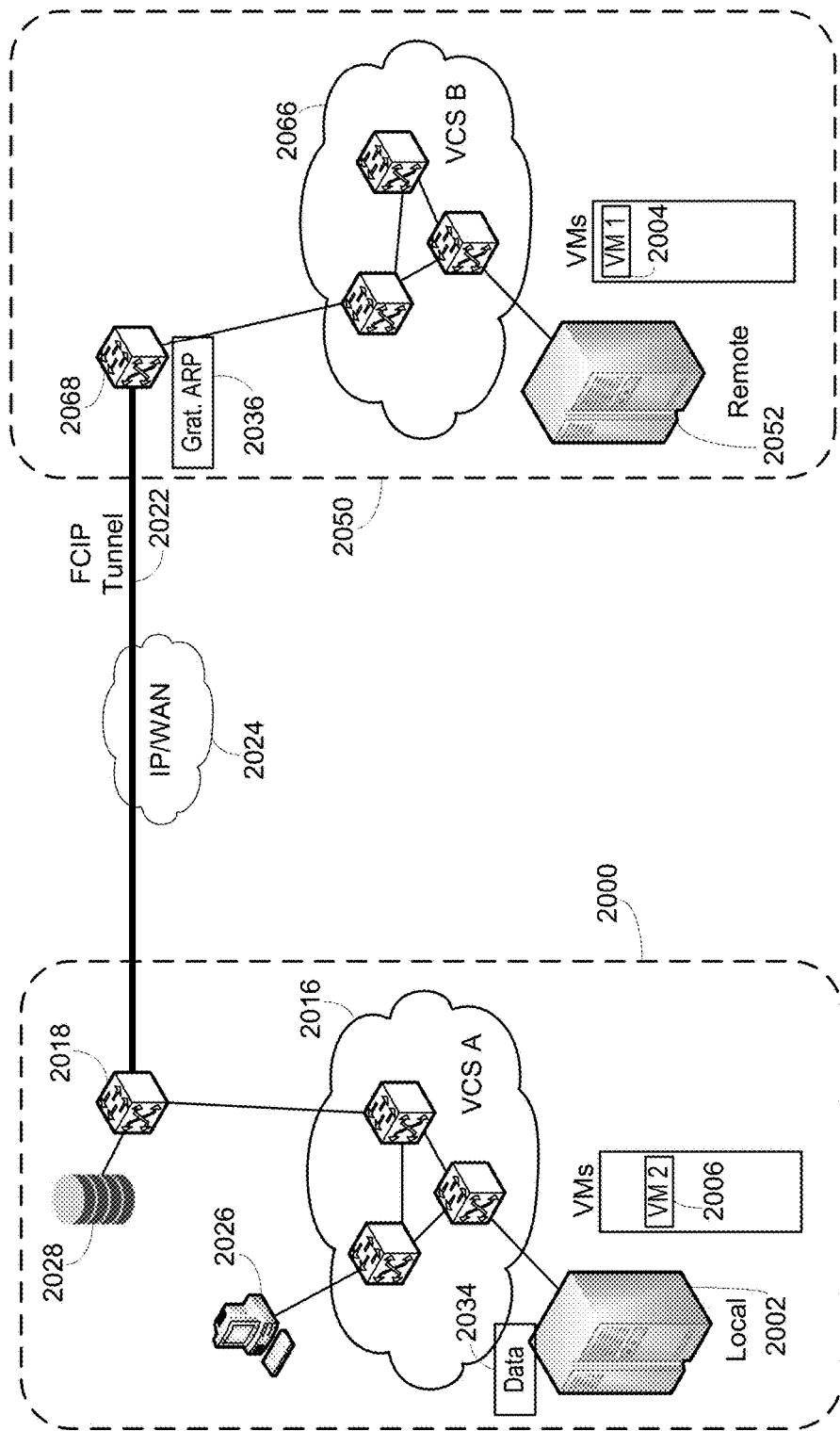
Figure 20P:
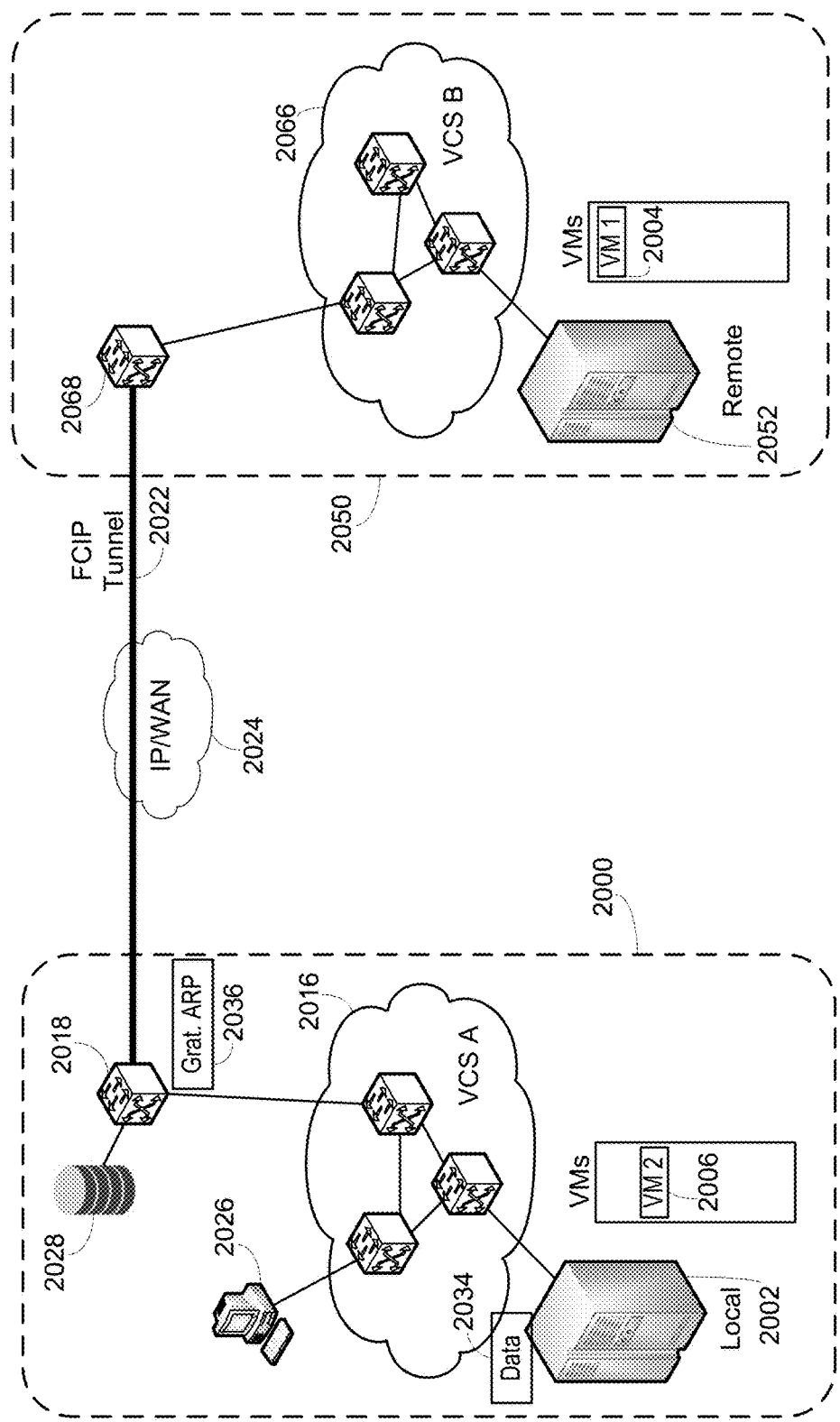
Figure 20Q:
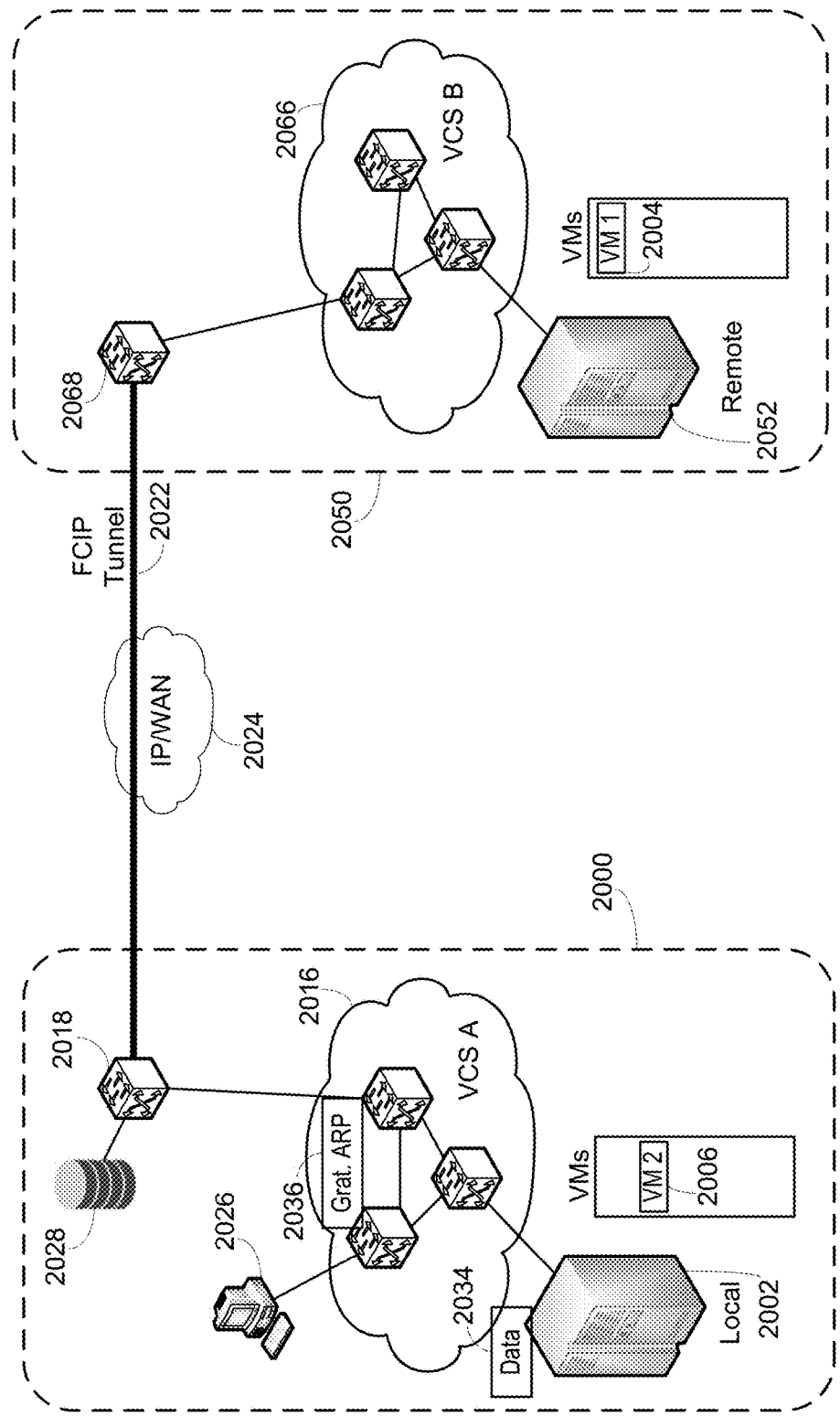
Figure 20R:
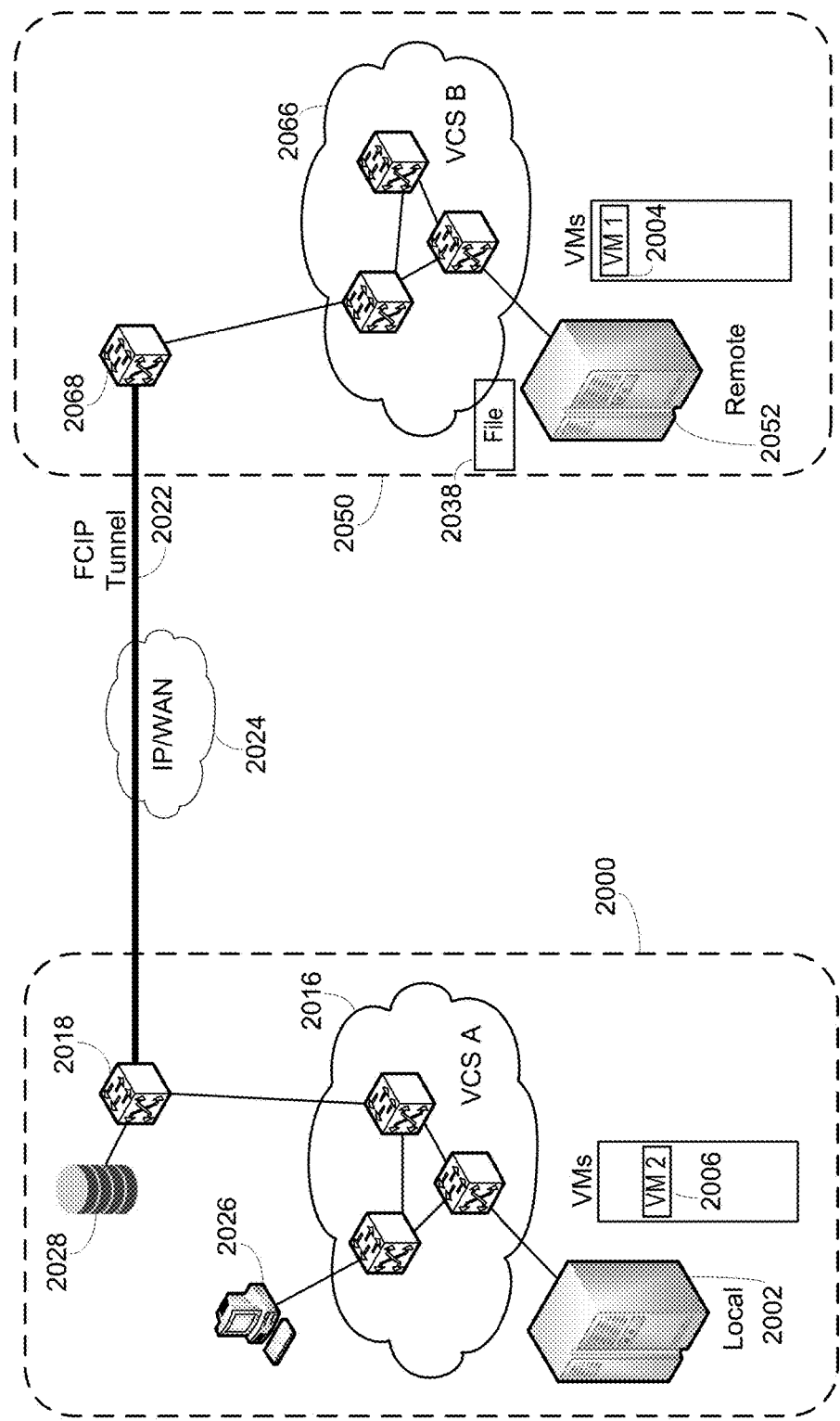
Figure 20S:
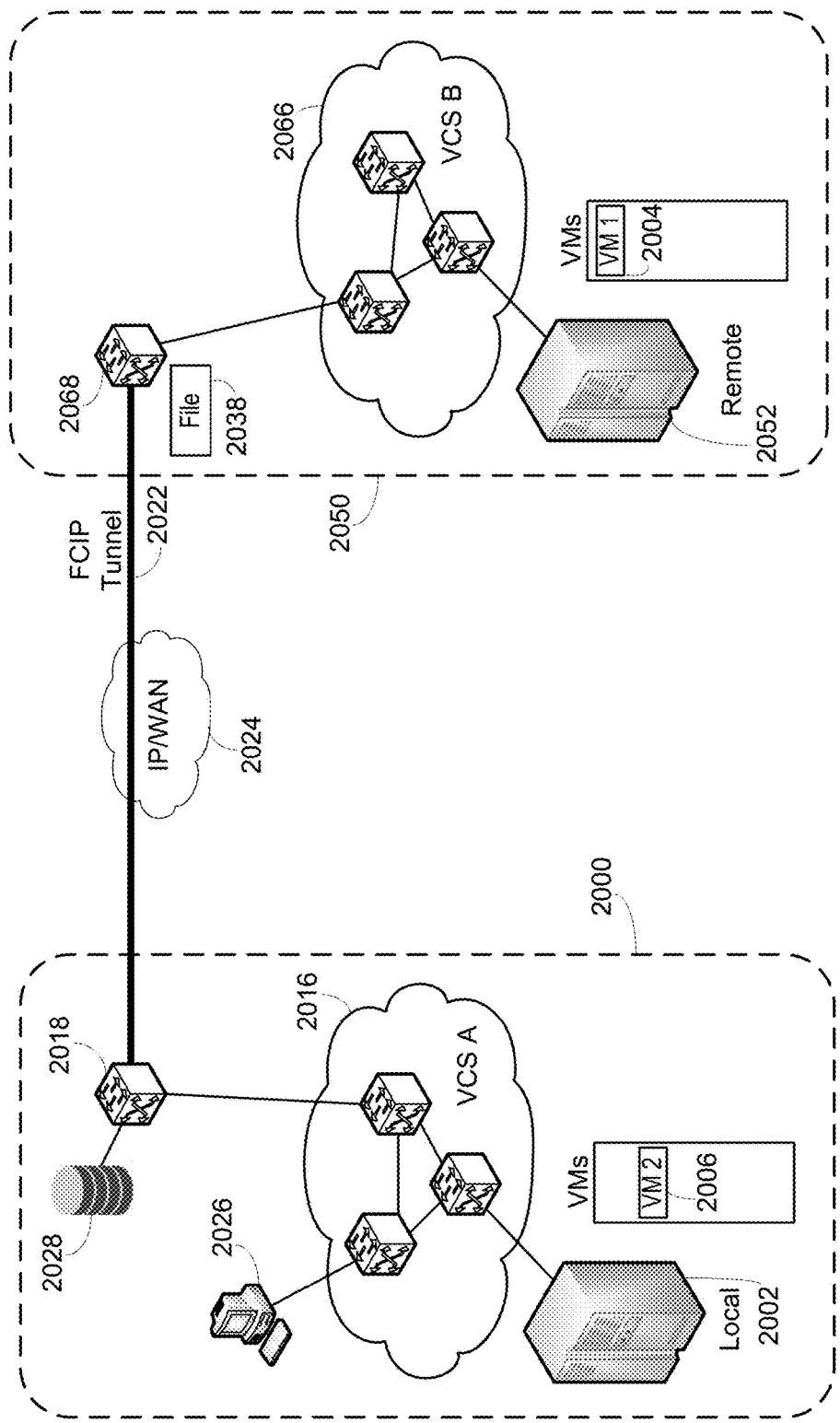
Figure 20T:
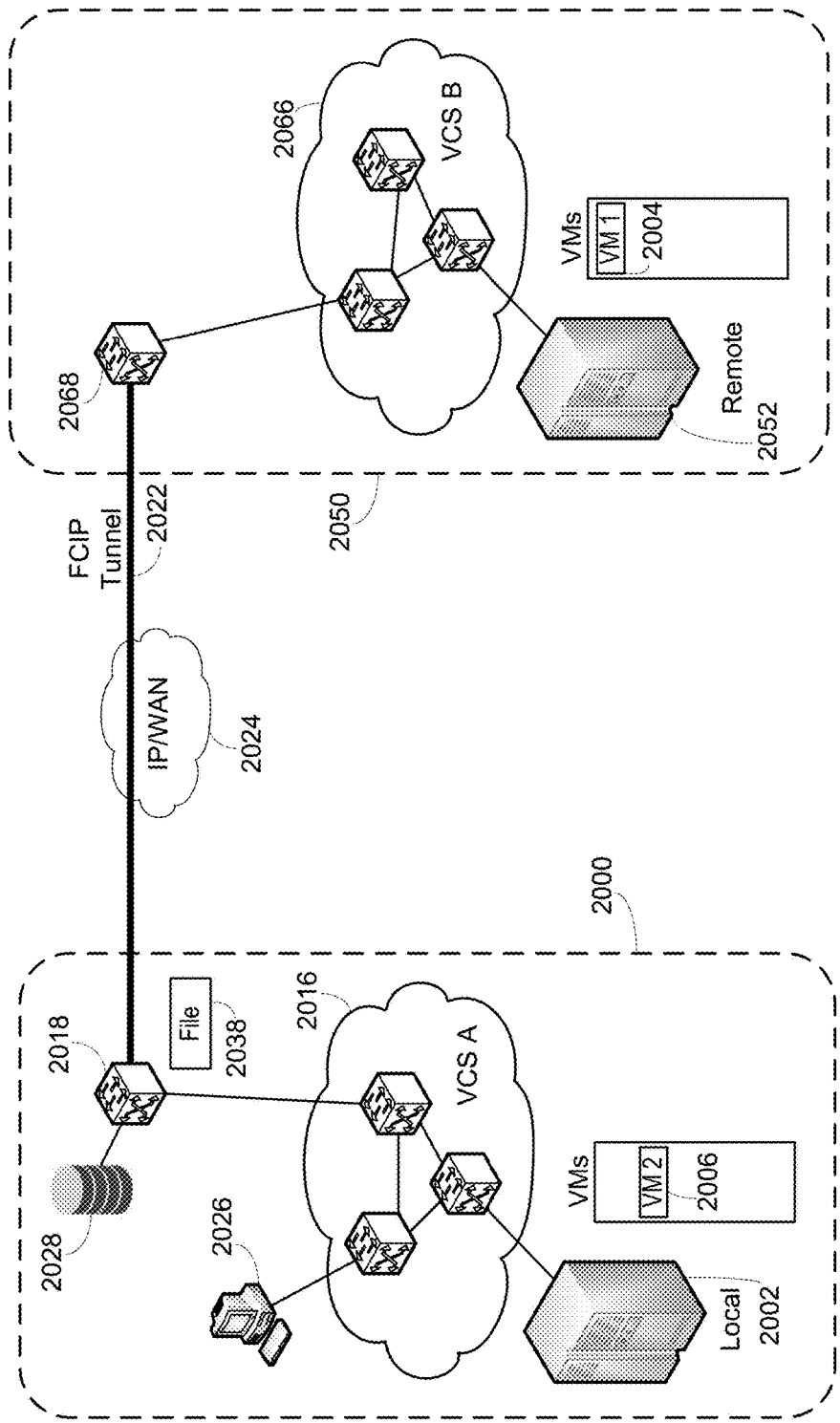
Figure 20U:
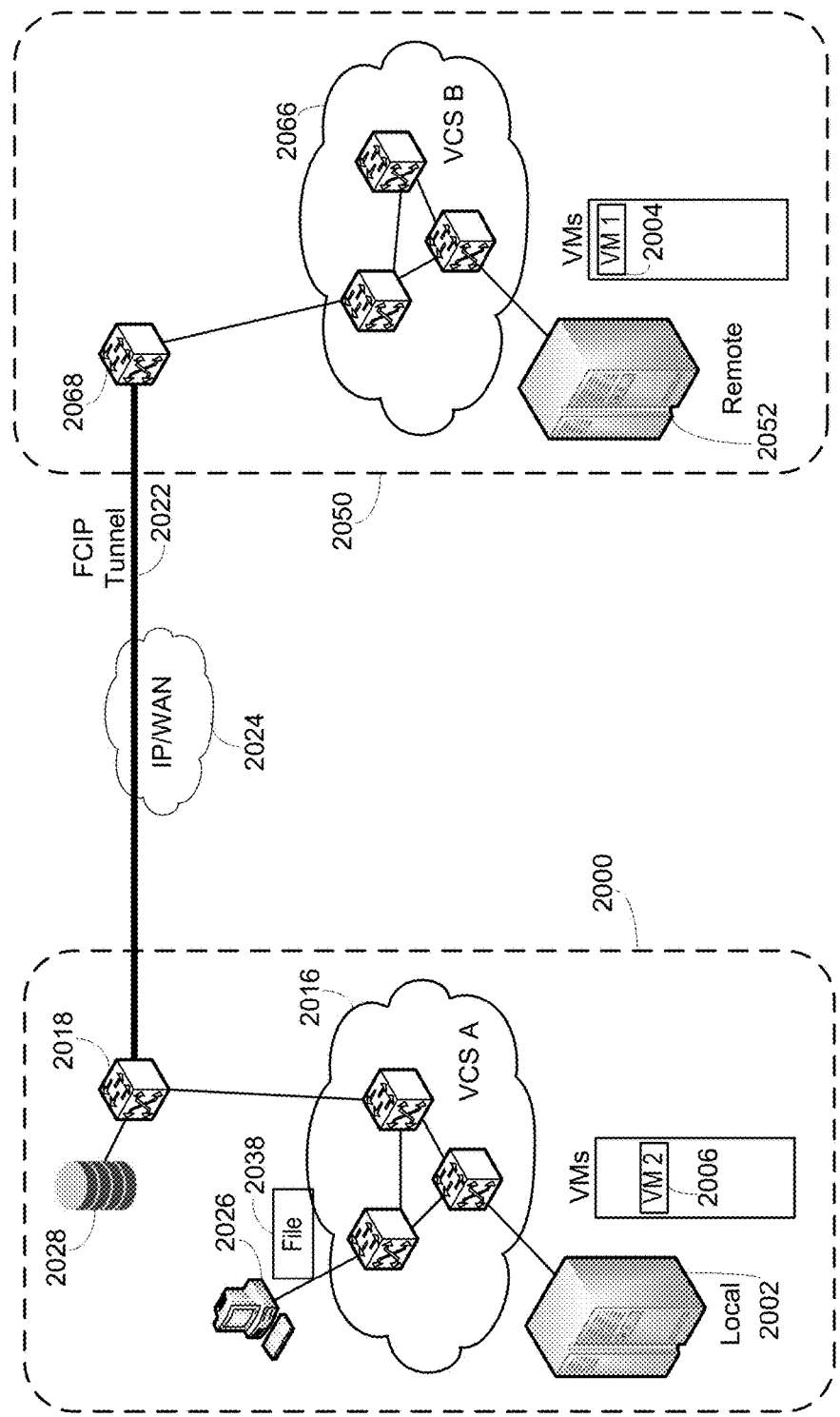
Figure 20V:
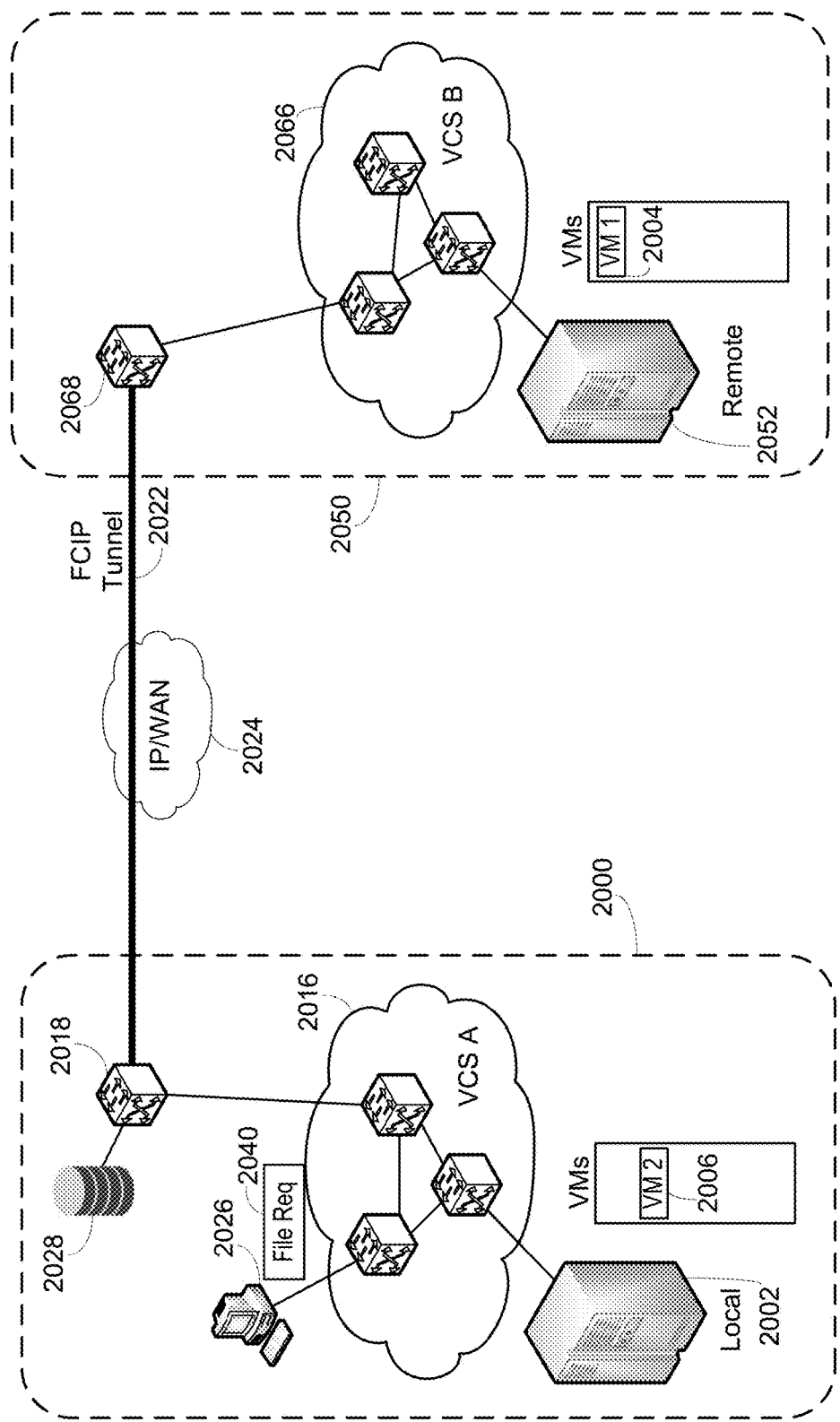
Figure 20W:
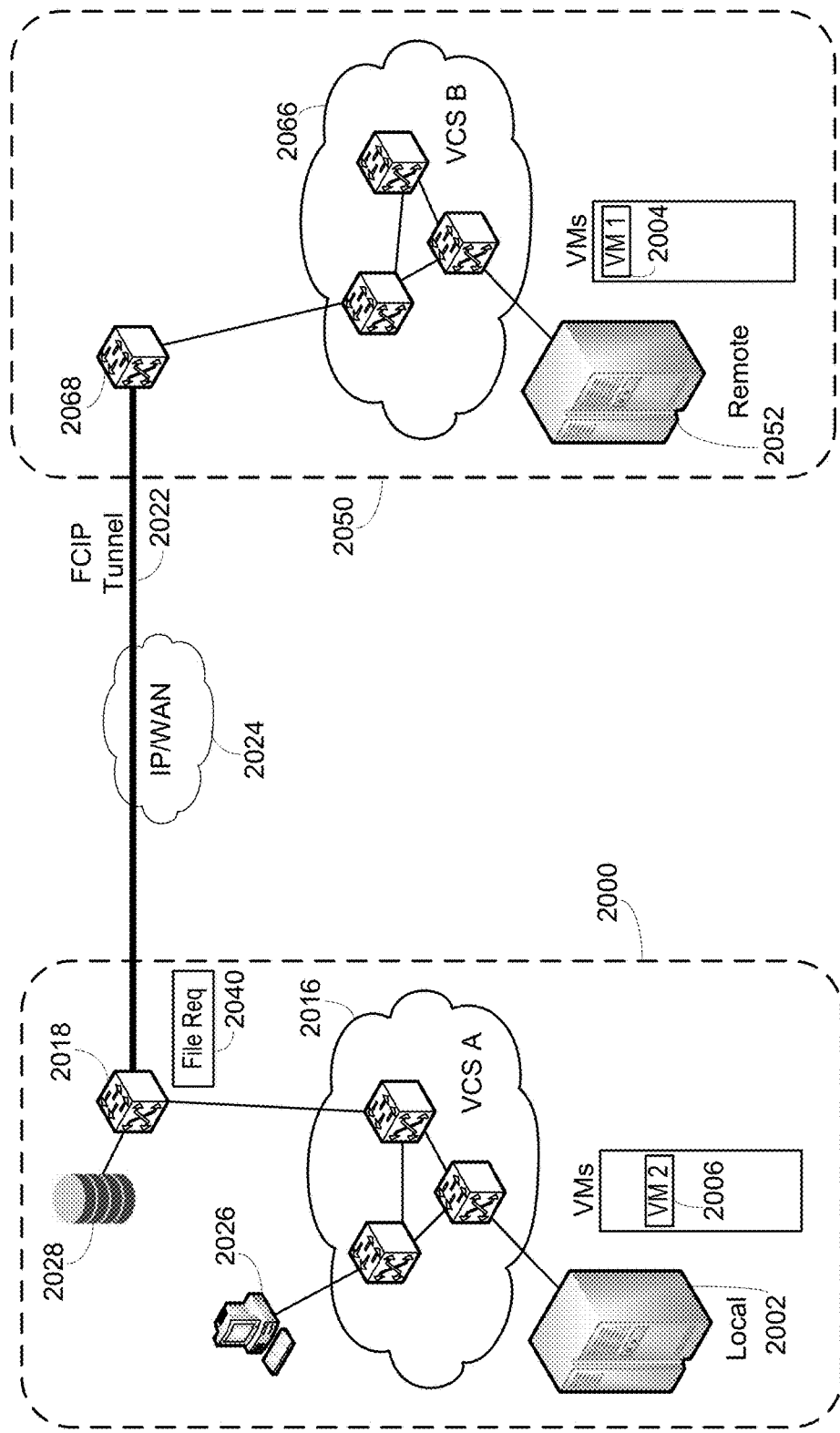
Figure 20X:
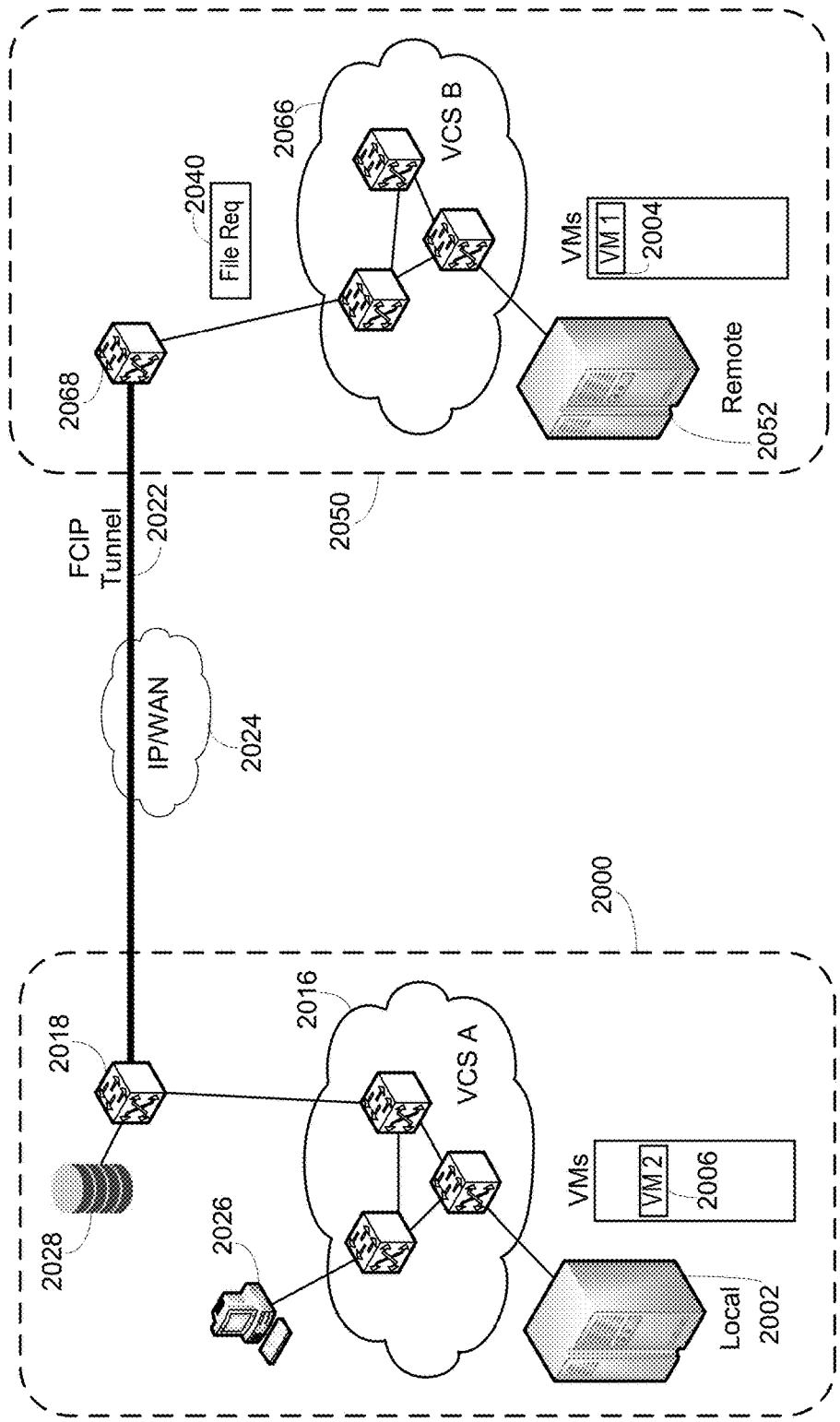
Figure 20Y:
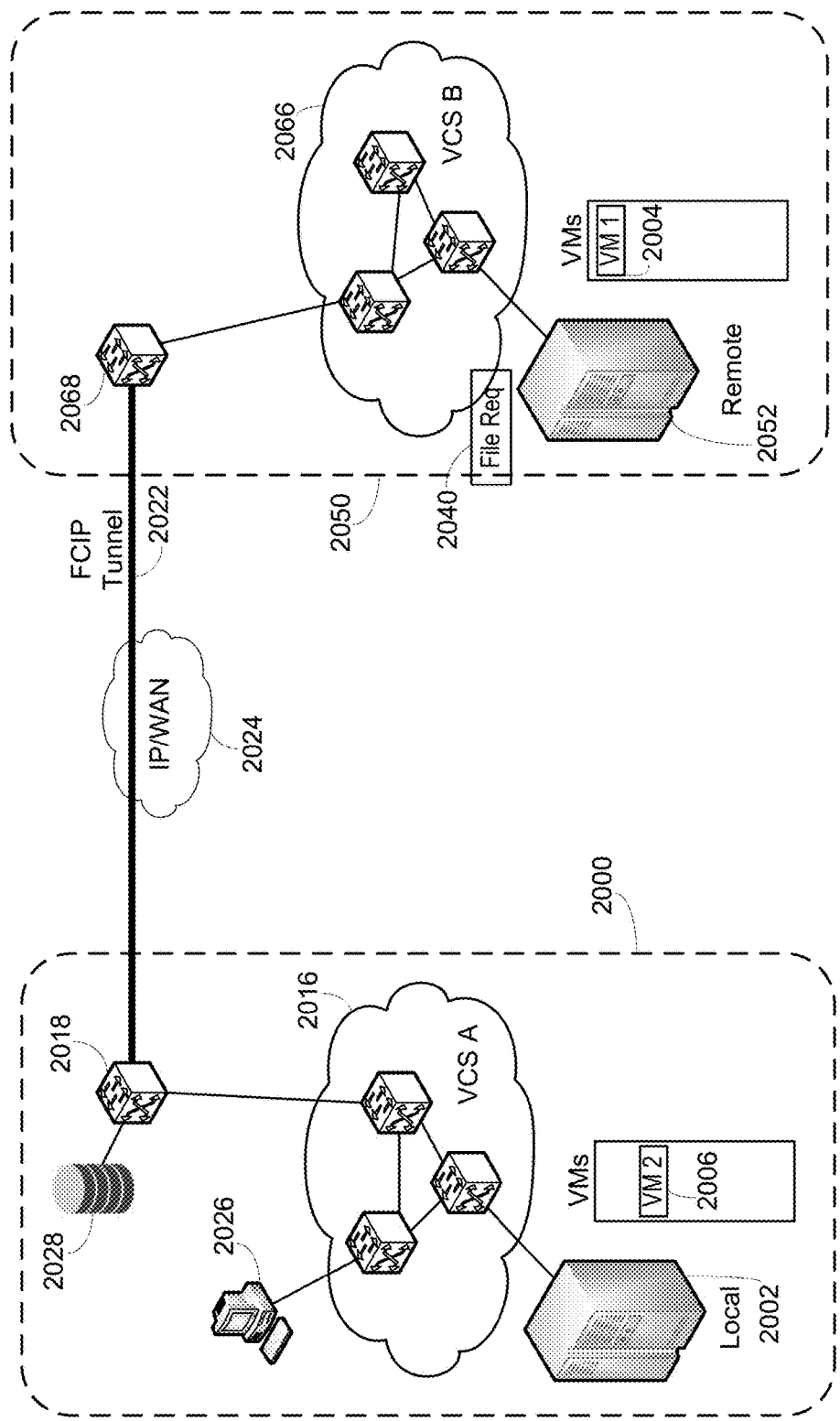
Figure 20Z:
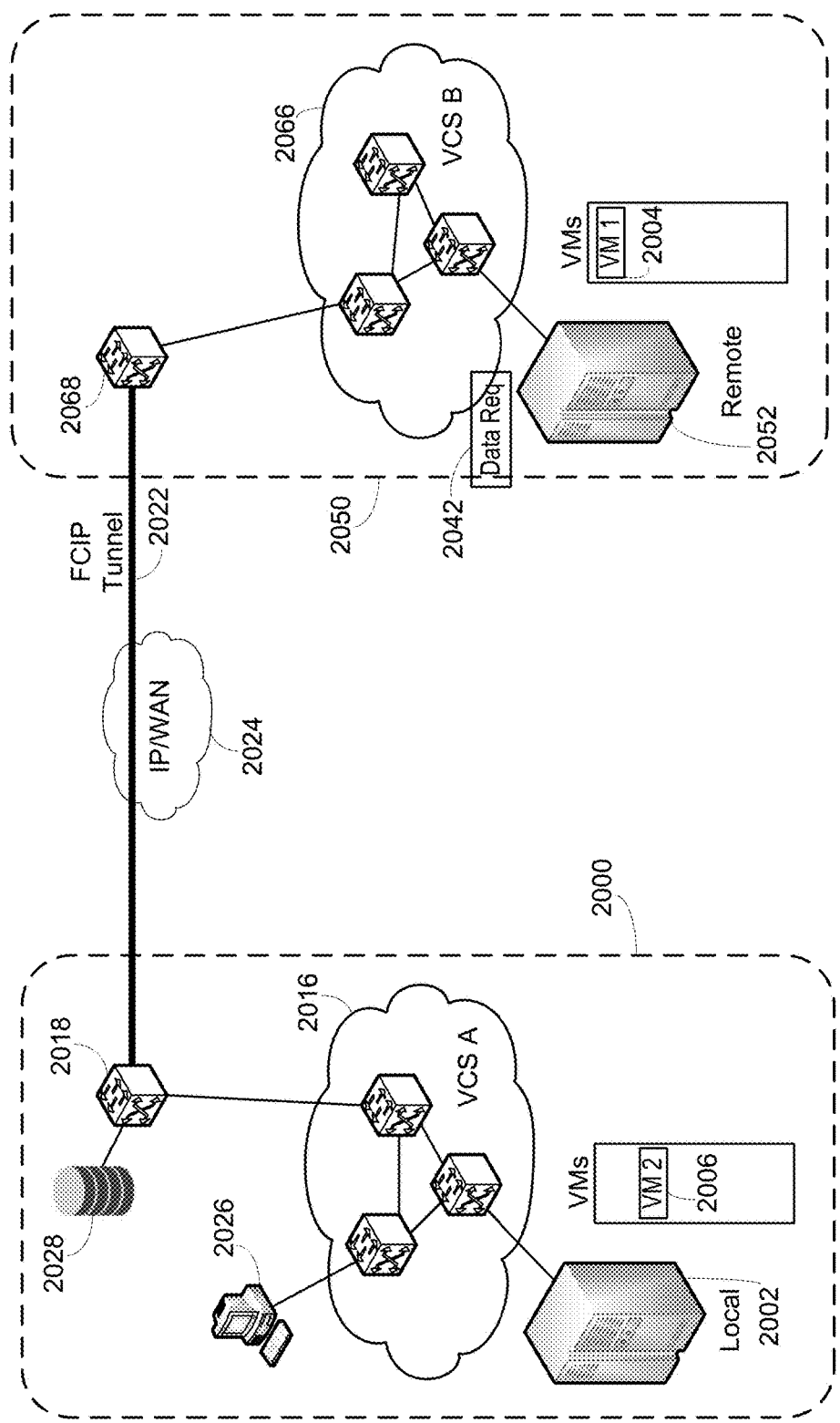
Figure 20A:
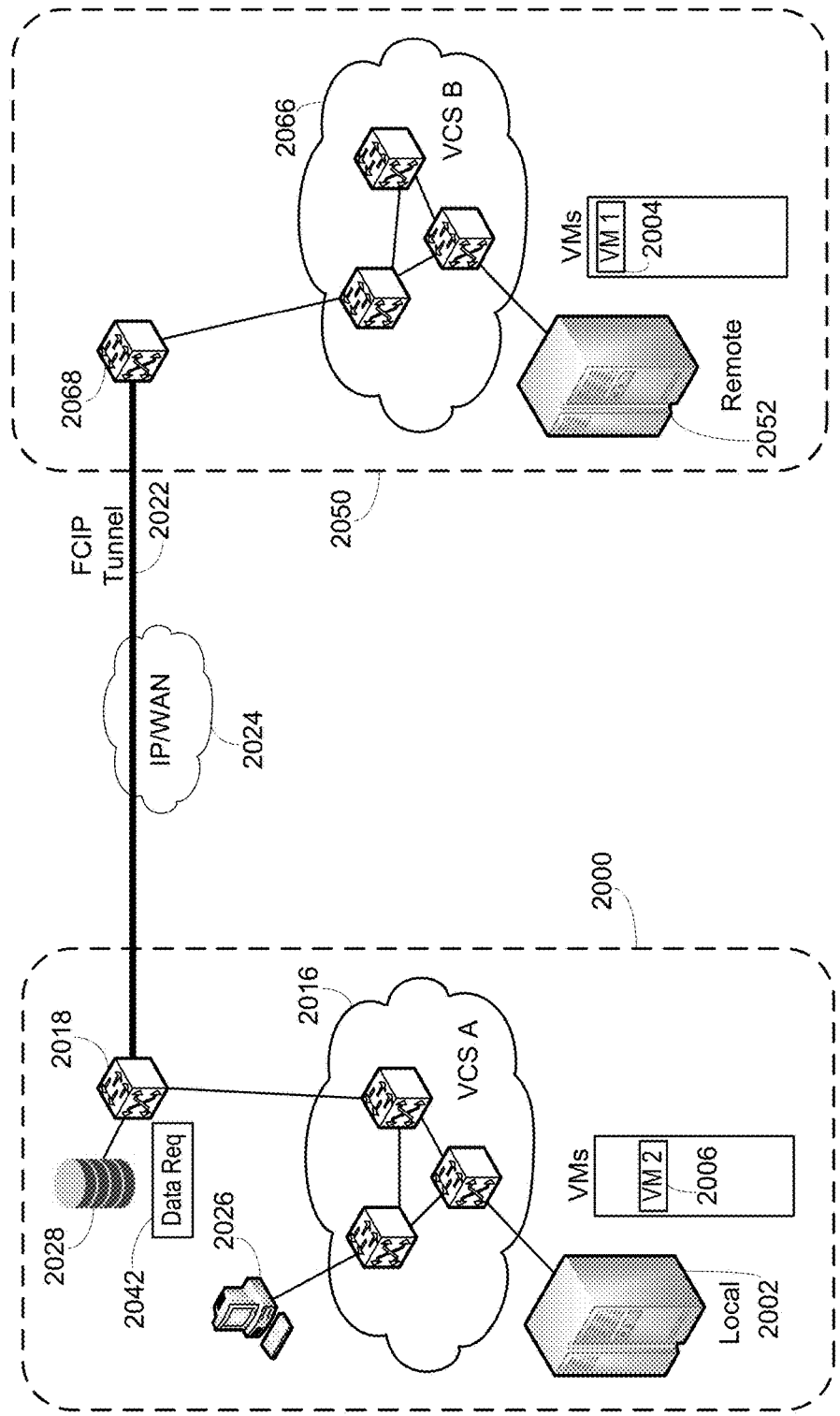
Figure 20A:
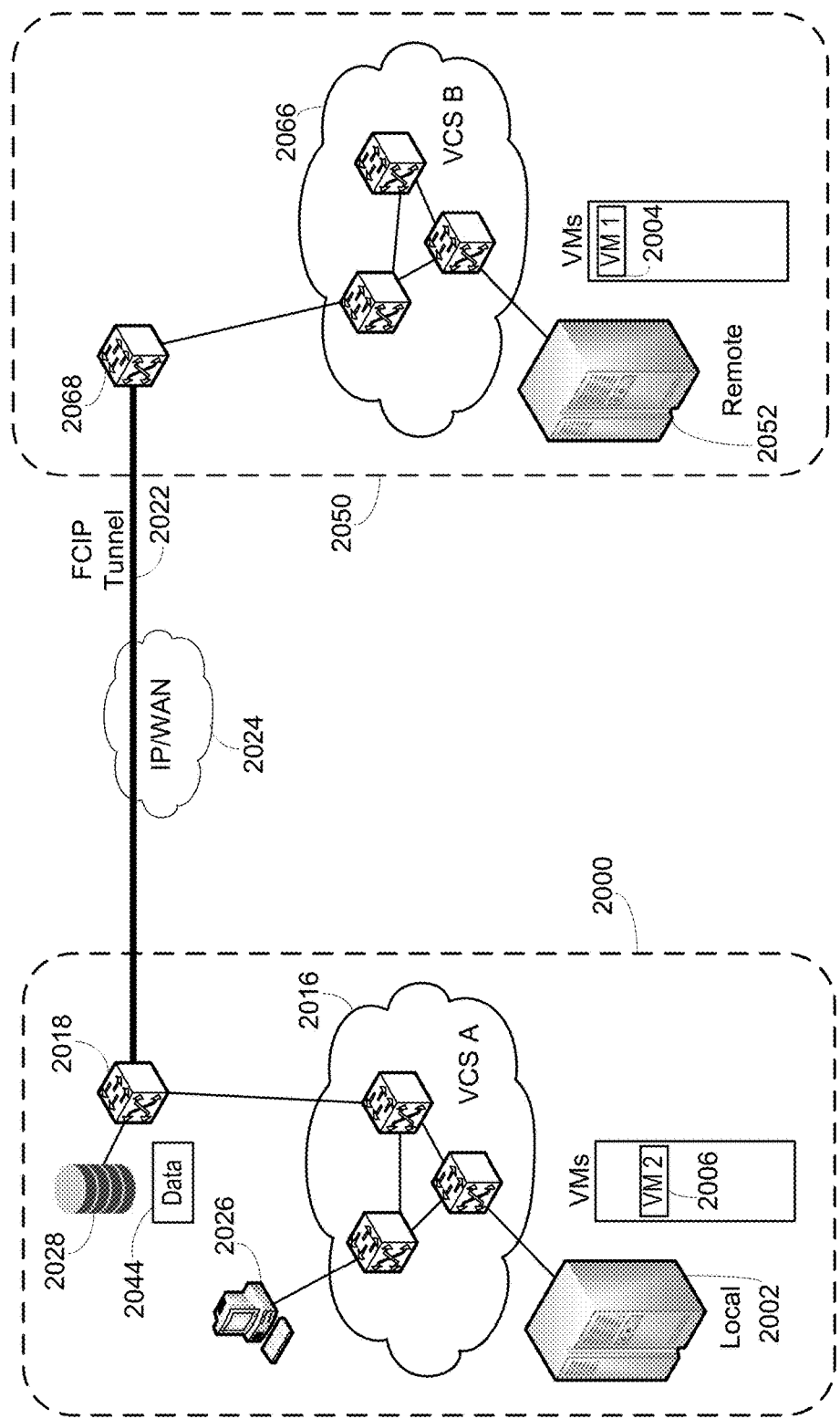
Figure 20A:
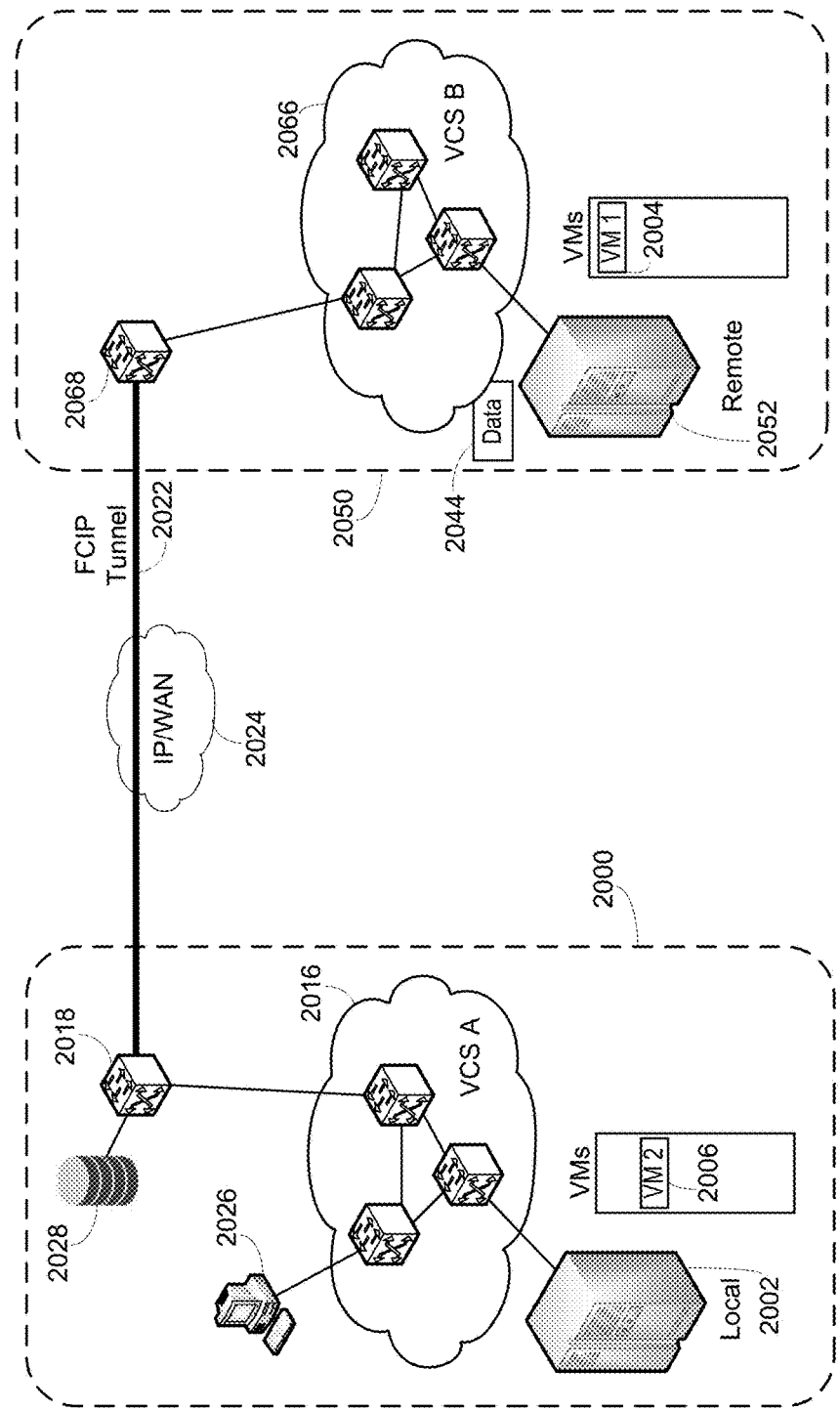
Figure 20A:
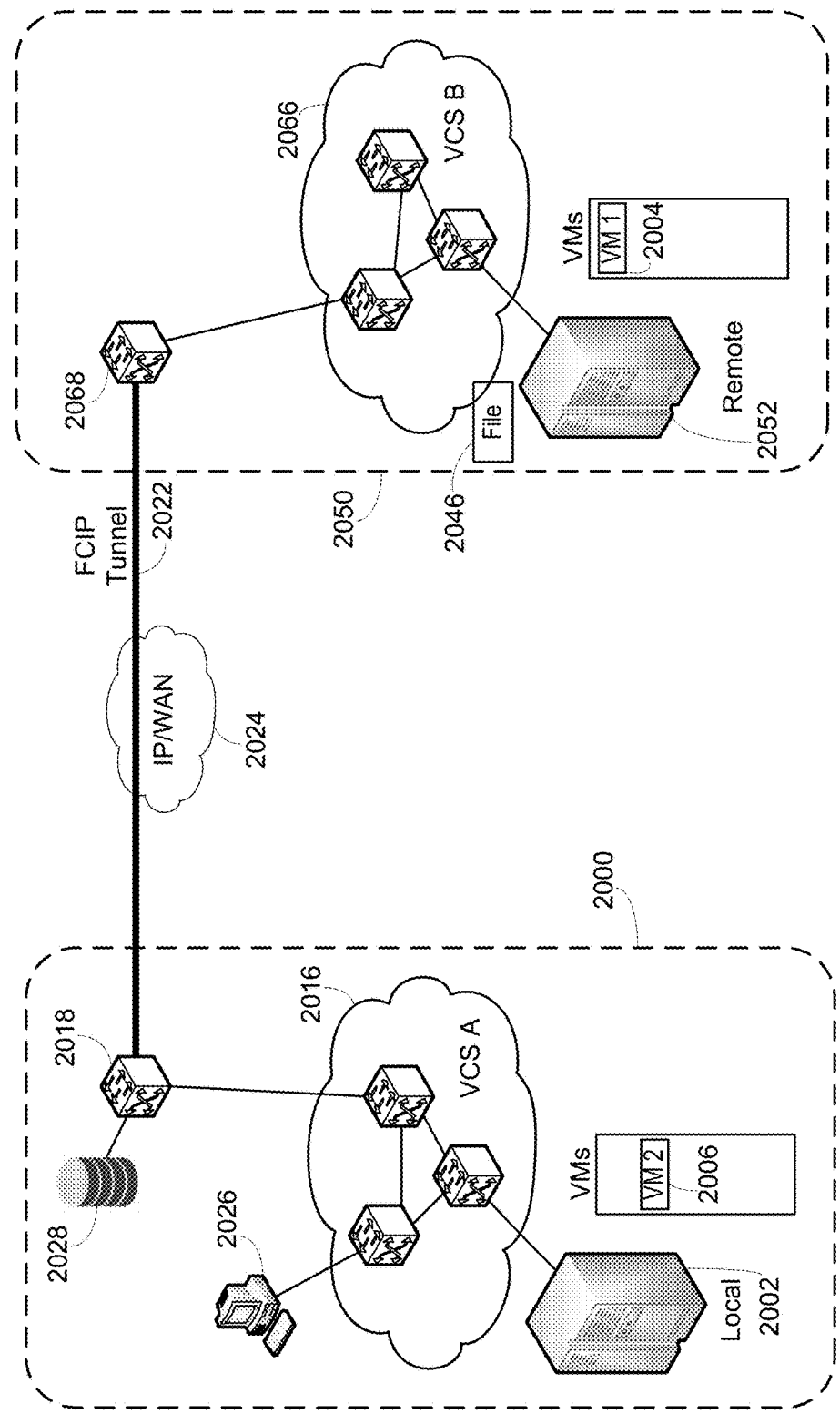
Figure 20A:
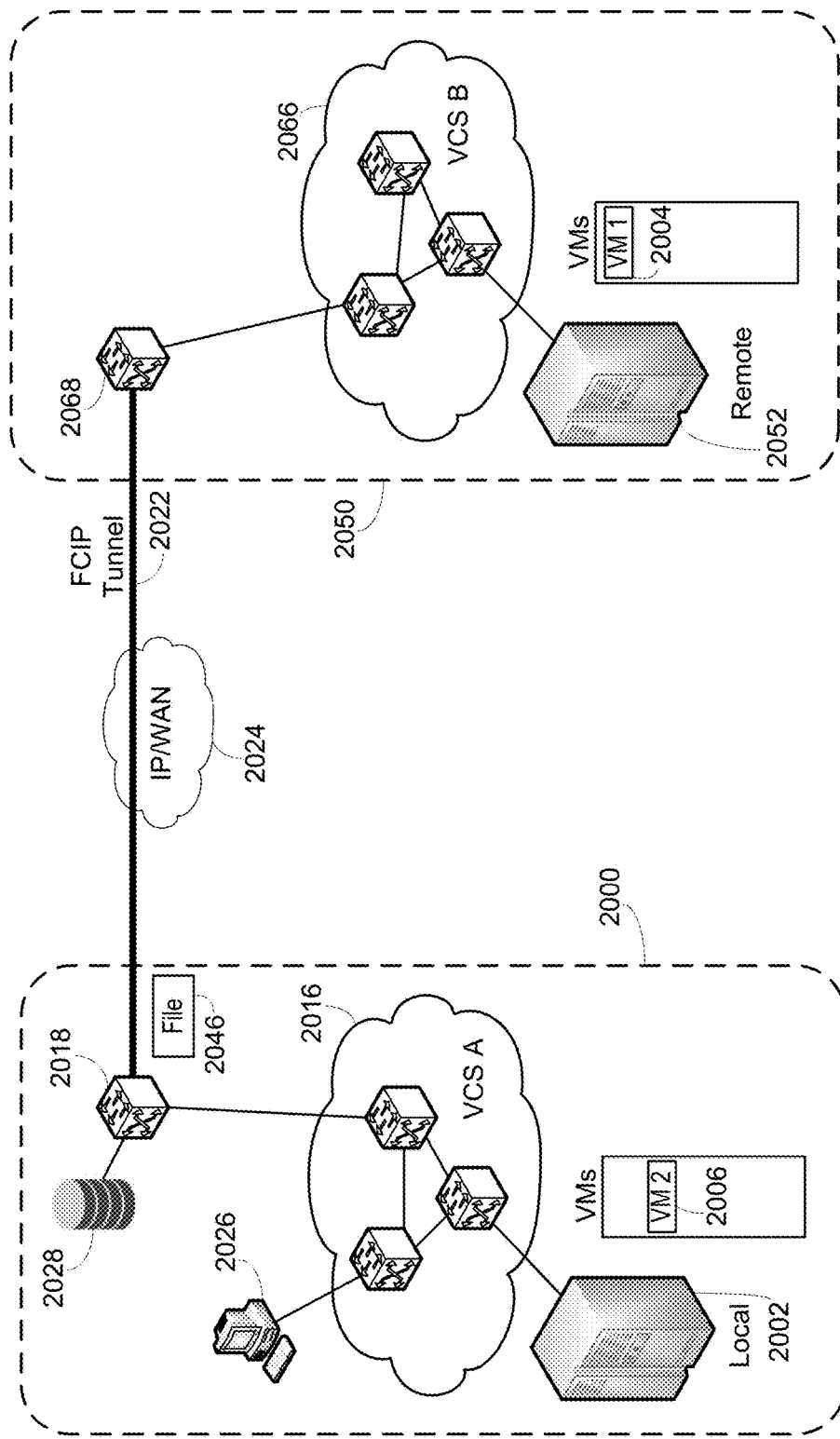
Figure 20A:
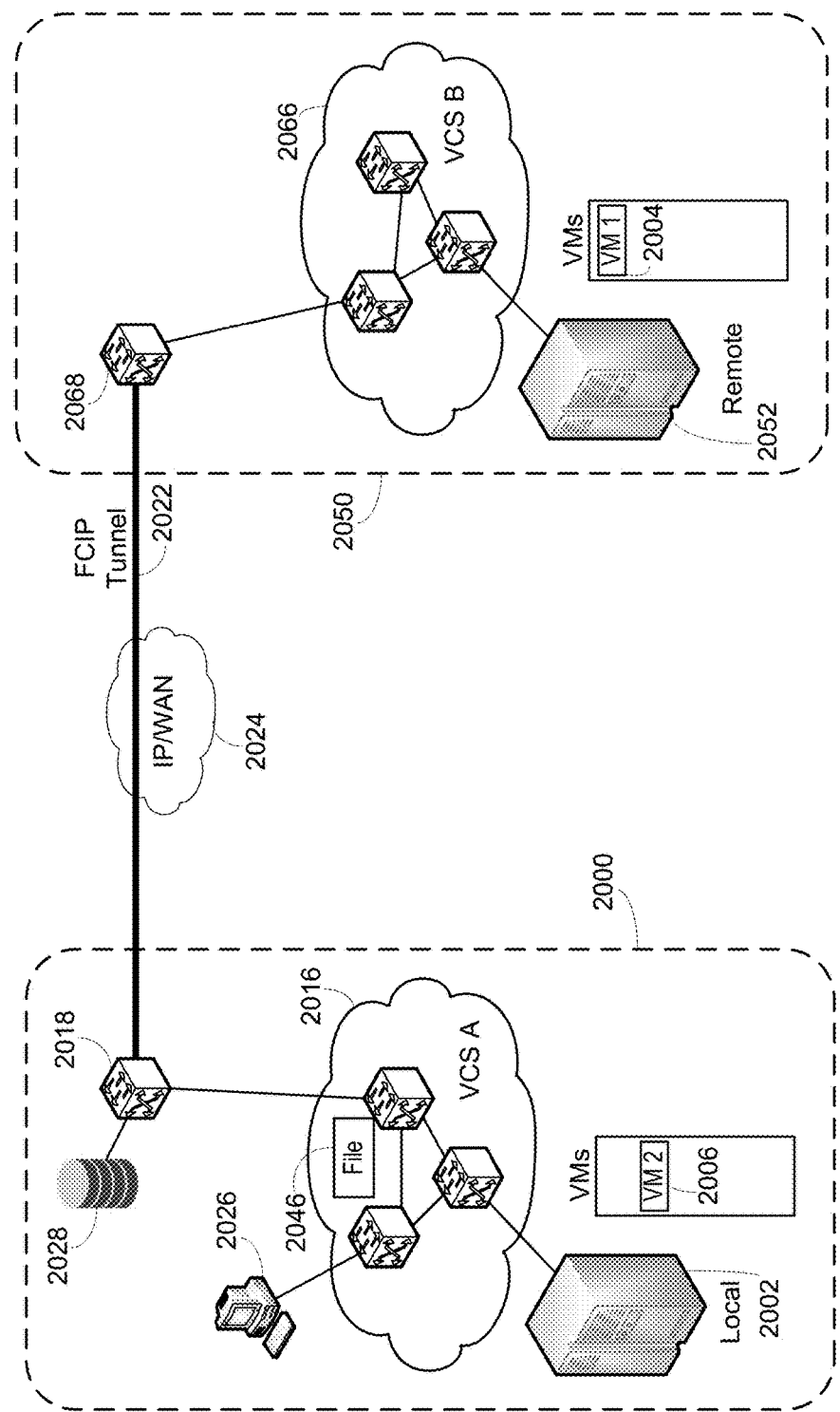
Figure 20A:
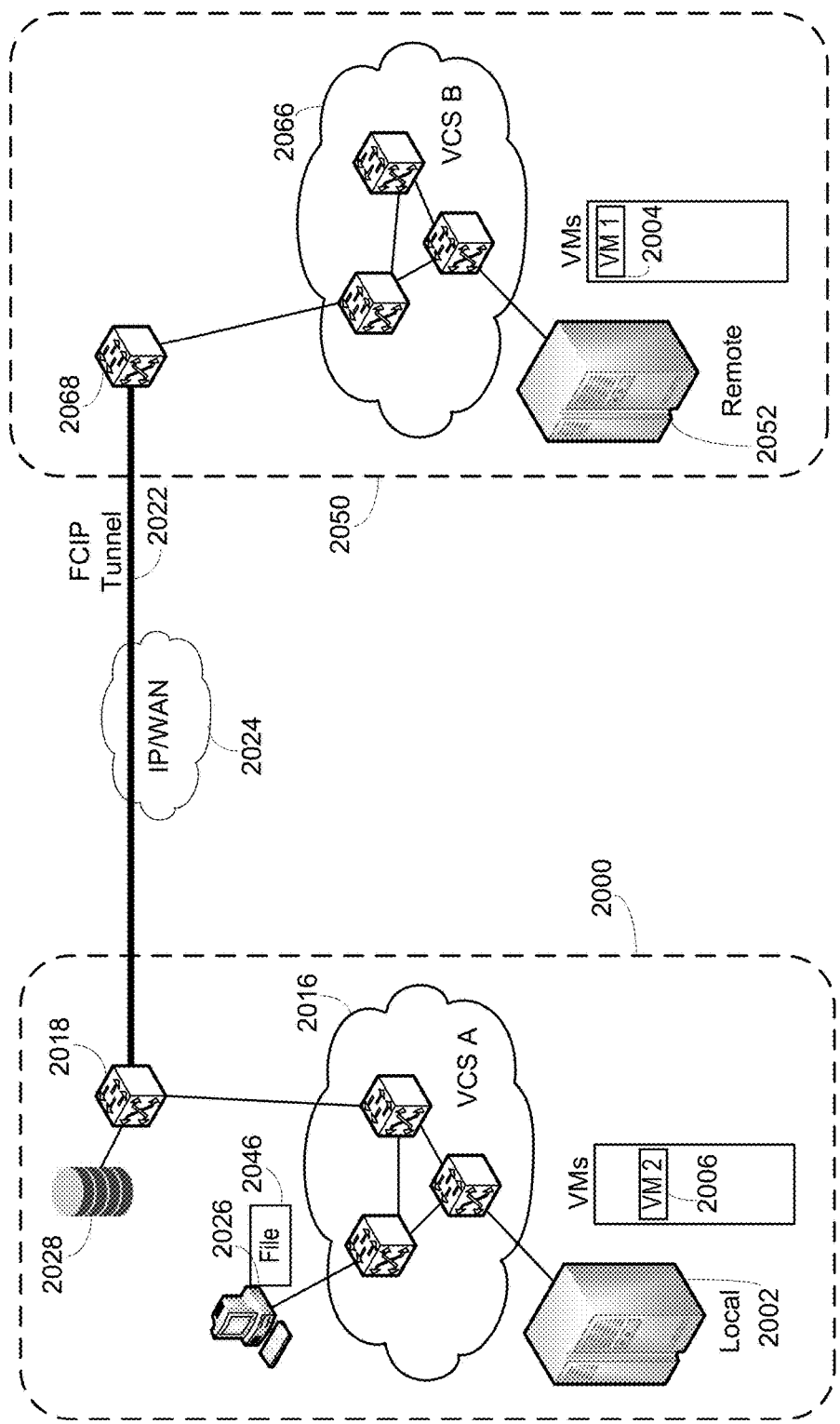

FIGS. 20A-20AG illustrate this VM move in the larger context of an executing application, in the illustrated case, one that operates to provide a file to a client. In general, like components from FIGS. 19A-19AK have been renumbered with the first two digits changing from 19 to 20. A client computer 2026 is connected to the VCS fabric 2016 and a storage unit 2028 is connected to the CNE/LDCM 2018. VM1 2004 is considered as running a file serving program in this example but other programs as normally run, such as databases and the like can be executing in VM1 2004. The client computer 2026 issues a file request 2030 to VM1 2004. The VM1 2004 issues a data request 2032 directed to the storage unit 2028. The data request 2032 travels through the VCS fabric 2016 to the storage unit 2028. The storage unit 2028 returns the data 2034 to the VM1 2004 and is incorporated into the memory of VM1 2004. Next vMotion operation of the VM1 2004 from ESX server 2002 to ESX server 2052 is started. VM1 2004 is transferred as described above.

Once VM1 2004 is operating on ESX server 2052, the ESX server 2052 issues a gratuitous ARP reply 2036 to allow all other devices to modify their ARP tables to handle the move of VM1 2004 to ESX server 2052 from ESX server 2002. The gratuitous ARP reply 2036 travels the network, including the VCS fabric 2066, the CNE/LDCMs 2018 and 2068 and the VCS fabric 2016. After allowing time for the gratuitous ARP reply 2036 to propagate and be handled, the VM1 2004 sends the request FILE 2038 to the client computer 2026. The client computer 2026 provides a FILE REQUEST 2040, this time addressed to the VM1 2004 in the ESX server 2052. In response, the VM1 2004 sends a DATA REQUEST 2042 to the storage unit 2028 to obtain the file data. The storage unit 2028 returns the DATA 2044. The VM1 2004 assembles the data into the requested file and sends the FILE 2046 to the client computer 2026.

Data migration is done by connecting the SAN fabrics using the CNE/LDCM devices. As the CNE/LDCM devices are connected by an FCIP link, the migration is handled effectively conventionally for data migrations in a SAN between two fabrics, with the HBTCP providing acceleration.

In review, a user interface is used to obtain the application credentials (IP addresses, TCP ports) and flow polices (Bandwidth and priority) from the users. Application data caching provides application granular data caching. The already acknowledge data is cached at destination node. The destination node updates the caching and storage status to the source node through control signals which are used to control the sessions to be accelerated. The session manager handles the application credentials which are used to terminate the application sessions by using the Hyper-TCP. If caching storage is over utilized (through destination node cache storage consumption control signals), the session manager filters the low priority application flows from the acceleration/optimization. Data flow control provides end to end flow control. An optimization application allocates the maximum consumable memory storage based the bandwidth police and WAN latency and monitors the data flow over WAN by monitoring the storage usage. As the application fetches the data from Hyper-TCP through a socket layer, the transfer is controlled upon congestion. The destination device consumption rate is determined by monitoring the egress data flow. This device consumption rate is passed on to other side which is used to control the ingress data from the source device.

Addressing the requirements set forth above, the CNE/LDCM as described provides:

1) Ability to migrate non routable applications: Using CNE, the overlay/tunnel network interconnects the data centers and provides the Layer-2 services for both SAN and LAN.

2) The server migration is time sensitive and bursty in nature and demands a minimum of 1 Gbps of bandwidth: The data compaction engine reduces the data up to 90% and OC3 WAN connectivity can fulfill the bandwidth need.

3) Need for encryption as critical data is unsecured while moving across the WAN: The IPSec encryption engine, which can scale up to 10 G with highest confidentiality in the preferred embodiment, meets this need.

4) Needs guaranteed bandwidth throughout the migration: The CVI provides up to 8 priority WAN connections with adaptive rate limiting in the preferred embodiment.

5) Latency needs to be below 5 ms: The local termination using the Hyper-TCP provides an apparent low latency network, with the high bandwidth items above increasing the actual effective bandwidth and reducing the total latency.

While the description has used a transfer of a VM from a first data center to a second data center, it is understood that the CNE/LDCM devices can also transfer a VM from the second data center to the first data center in a like manner.

The above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A network device comprising:
   at least one local network port for connection to a first local area network containing a first virtual machine to be migrated from a first server;
   at least one wide area network port for connection to a wide area network to provide the first virtual machine to a second server connected to a second local area network;
   a local termination module coupled to said at least one local network port to locally terminate a Transmission Control Protocol (TCP) session with the first server for migrating the first virtual machine and to establish a session with a remote termination module of a remote network device, the remote termination module locally terminating a TCP session with the second server;
   a data compaction engine coupled to said local termination module and configured to perform compression to reduce the size of data relating to the first virtual machine; and
   a transmission module coupled to said data compaction engine and to said at least one wide area network port for providing data relating to the first virtual machine to the wide area network, said transmission module utilizing high bandwidth TCP techniques,
   wherein the remote network device further comprises a remote data compaction engine configured to decompress received data and a remote transmission module utilizing high bandwidth TCP techniques, wherein said local termination module, said data compaction engine, said transmission module, the remote termination module, the remote data compaction engine and the remote transmission module cooperate to migrate the first virtual machine from the first server to the second server over the wide area network without migration timeouts at either of the first or second servers by establishing a session between said local termination module and the remote termination module and migrating the first virtual machine via the session.

2. The network device of claim 1, further comprising:
a reliability module coupled to and between said transmission module and said data compaction engine to receive data directed to said transmission module to improve reliability of transmissions by said transmission module.

3. The network device of claim 1, wherein said transmission module encrypts data prior to providing the data to said at least one wide area network port.

4. The network device of claim 1, wherein said network device retains data relating to the first virtual machine until an acknowledgment is provided by a remote networking device.

5. A network device comprising:
at least one local network port for connection to a second local area network containing a second server to receive a first virtual machine to be migrated from a first server connected to a first local area network;
at least one wide area network port for connection to a wide area network to receive data related to the first virtual machine for provision to the second server;
a local termination module coupled to said at least one local network port to locally terminate a Transmission Control Protocol (TCP) session with the second server for migrating the first virtual machine and to establish a session with a remote termination module of a remote network device, the remote termination module locally terminating a TCP session with the first server;
a data compaction engine coupled to said local termination module and configured to perform decompression to restore the data relating to the first virtual machine; and
a transmission module coupled to said data compaction engine and to said at least one wide area network port for receiving data relating to the first virtual machine from the wide area network and providing the received data to said data compaction engine, said transmission module utilizing high bandwidth TCP techniques,
wherein the remote network device further comprises a remote data compaction engine configured to compress received data and a remote transmission module utilizing high bandwidth TCP techniques,
wherein said local termination module, said data compaction engine, said transmission module, the remote termination module, the remote data compaction engine and the remote transmission module cooperate to migrate the first virtual machine from the first server to the second server over the wide area network without migration timeouts at either of the first or second servers by establishing a session between said local termination module and the remote termination module and migrating the first virtual machine via the session.

6. The network device of claim 5, further comprising:
a reliability module coupled to and between said transmission module and said data compaction engine to receive data from said transmission module to improve reliability of transmissions received by said transmission module.

7. The network device of claim 5, wherein said transmission module decrypts data received at said at least one wide area network port.

8. The network device of claim 5, wherein said network device retains data relating to the first virtual machine until an acknowledgment is provided by the second server and provides an acknowledgement to a remote networking device.

9. A network comprising:
a local network device; and
a remote network device,
wherein said local network device includes:
at least one local network port for connection to a first local area network containing a first virtual machine to be migrated from a first server;
at least one wide area network port for connection to a wide area network to provide the first virtual machine to a second server connected to a second local area network;
a local termination module coupled to said at least one local network port to locally terminate a Transmission Control Protocol (TCP) session with the first server for migrating the first virtual machine and to establish a session with a remote termination module of said remote network device, said remote termination module locally terminating a TCP session with the second server;
a local data compaction engine coupled to said local termination module and configured to perform compression to reduce the size of data relating to the first virtual machine; and
a local transmission module coupled to said local data compaction engine and to said at least one local wide area network port for providing data relating to the first virtual machine to the wide area network, said local transmission module utilizing high bandwidth TCP techniques,
wherein said second remote network device includes:
at least one remote network port for connection to the second local area network containing the second server to receive the first virtual machine to be migrated from the first server connected to the first local area network;
at least one remote wide area network port for connection to a wide area network to receive data related to the first virtual machine for provision to the second server;
the remote termination module coupled to said at least one remote network port to locally terminate said TCP session with the second server for migrating the first virtual machine and to establish a session with said local termination module, said local termination module locally terminating said TCP session with the first server;
a remote data compaction engine coupled to said remote termination module and configured to perform decompression to restore the data relating to the first virtual machine; and
a remote transmission module coupled to said remote data compaction engine and to said at least one remote wide area network port for receiving data relating to the first virtual machine from the wide area network and providing the received data to said remote data compaction engine, said remote transmission module utilizing high bandwidth TCP techniques, and wherein said local termination module, said local transmission module, said local data compaction engine, said remote termination module, said remote data compaction engine and said remote transmission module cooperate to migrate the first virtual machine from the first server to the second server over the wide area network without migration timeouts at either of the first or second servers by establishing a session between said local termination module and said remote termination module and migrating the first virtual machine via said session.

10. The network of claim 9, further comprising:
a local reliability module coupled to and between said local transmission module and said local data compaction engine to receive data directed to said transmission module to improve reliability of transmissions by said transmission module; and
a remote reliability module coupled to and between said remote transmission module and said remote data compaction engine to receive data from said remote transmission module to improve reliability of transmissions by said transmission module,
wherein said local and remote reliability modules cooperate.

11. The network of claim 9, wherein said local transmission module encrypts data prior to providing the data to said at least one local wide area network port, and
wherein said remote transmission module decrypts data received at said at least one remote wide area network port.

12. The network of claim 9, wherein said local network device retains data relating to the first virtual machine until an acknowledgment is provided by said emote network device and
wherein said remote network device retains data relating to the first virtual machine until an acknowledgment is provided by the second server and provides an acknowledgement to said local network device.

13. A method comprising:
receiving data related to migrating a first virtual machine from a first server connected to a first local area network to a second server connected to a second local area network;
locally terminating, with a local termination module, a Transmission Control Protocol (TCP) session with the first server for migrating the first virtual machine and establishing a session with a remote termination module;
compressing data, with a local data compaction engine coupled to said local termination module configured to handle compression to reduce the size of data relating to the first virtual machine;
transmitting locally the compressed data relating to the first virtual machine to a wide area network utilizing high bandwidth TCP techniques;
locally terminating, with the remote termination module, the TCP session with the second server for migrating the first virtual machine and a session with the local termination module;
receiving remotely compressed data relating to the first virtual machine from the wide area network utilizing high bandwidth TCP techniques; and
decompressing data, with a remote data compaction engine coupled to said remote termination module configured to handle decompression of received compressed data relating to the first virtual machine;
providing the received decompressed data relating to the first virtual machine to the second server,
wherein locally terminating with the local and remote termination modules, compressing data with the local data compaction engine, transmitting to the wide area network, receiving from the wide area network and decompressing data with the remote data compaction engine all cooperate to migrate the first virtual machine from the first server to the second server over the wide area network without migration timeouts at either of the first or second servers by establishing a session between the local termination module and the remote termination module and migrating the first virtual machine via said session.

14. The method of claim 13, further comprising:
improving reliability of providing locally to the wide area network and receiving remotely from the wide area network.

15. The method of claim 13, further comprising:
encrypting locally data prior to providing the data to the wide area network, and
decrypting remotely data received from the wide area network.

16. The method of claim 13, further comprising:
retaining locally data relating to the first virtual machine until an acknowledgment is received and
retaining remotely data relating to the first virtual machine until an acknowledgment is provided by the second server and providing an acknowledgement.

* * * * *